(12) United States Patent
Powell

(10) Patent No.: US 7,734,552 B2
(45) Date of Patent: *Jun. 8, 2010

(54) FACILITATING ELECTRONIC EXCHANGE OF PROPRIETARY INFORMATION

(76) Inventor: Michael D. Powell, 16470 Englewood Ave., Los Gatos, CA (US) 95032

(*) Notice: Subject to any disclaimer, the term of this patent is extended or adjusted under 35 U.S.C. 154(b) by 81 days.

This patent is subject to a terminal disclaimer.

(21) Appl. No.: 11/926,626

(22) Filed: Oct. 29, 2007

(65) Prior Publication Data

US 2009/0292727 A1 Nov. 26, 2009

Related U.S. Application Data

(63) Continuation of application No. 11/379,926, filed on Apr. 24, 2006, which is a continuation of application No. 11/379,935, filed on Apr. 24, 2006, which is a continuation of application No. 11/379,930, filed on Apr. 24, 2006, which is a continuation of application No. 10/854,653, filed on May 25, 2004, now Pat. No. 7,043,454, which is a continuation of application No. 09/747,748, filed on Dec. 22, 2000.

(60) Provisional application No. 60/173,170, filed on Dec. 27, 1999.

(51) Int. Cl.
*G06F 21/00* (2006.01)
(52) U.S. Cl. .............. 705/59; 705/50; 705/51; 705/37; 705/80; 713/166
(58) Field of Classification Search ............. 705/59, 705/37, 50–51, 80; 713/166
See application file for complete search history.

(56) References Cited

U.S. PATENT DOCUMENTS 5,050,213 A * 9/1991 Shear ..................... 705/53

(Continued)

FOREIGN PATENT DOCUMENTS

EP 813133 A2 12/1997

OTHER PUBLICATIONS

Clyde, S.; Jianping Zhang; Chih-Chung Yao;, "An object-oriented implementation of an adaptive classification of job openings," Artificial Intelligence for Applications, 1995. Proceedings., 11th Conference on, vol., No., pp. 9-16, Feb. 20-23, 1995 URL: http://ieeexplore.ieee.org/stamp/stamp.jsp?tp=&arnumber=378795&isnumber=8623.*

(Continued)

*Primary Examiner*—Andrew J. Fischer
*Assistant Examiner*—Monica Mandel
(74) *Attorney, Agent, or Firm*—Aka Chan LLP

(57) ABSTRACT

A method and apparatus effectuates bilateral commerce in ideas. An originator and user-driven on-line commercial network system is designed to facilitate idea submission, purchase, and licensing, and is easily adapted to business-to-business transfers of innovation as well as consumer-to-business transfers of innovation. The invention allows originators of ideas to communicate nondisclosing synopses of ideas globally to potential users, for users conveniently to search for relevant ideas and for users potentially to bind an originator to a limited duration license granting user the exclusive right to access and consider confidentially the originator's fully disclosed idea. The invention also allows users to communicate confidentially or nonconfidentially unsolved problems or needs globally to potential originators, for originators conveniently to search for relevant unsolved problems or needs, and for originators to submit and communicate confidentially proposed solutions to the soliciting user.

7 Claims, 34 Drawing Sheets

U.S. PATENT DOCUMENTS

| | | | |
|---|---|---|---|
| 5,164,897 A | | 11/1992 | Clark et al. |
| 5,539,906 A | * | 7/1996 | Abraham et al. ............... 707/9 |
| 5,553,143 A | | 9/1996 | Ross et al. |
| 5,664,115 A | | 9/1997 | Fraser |
| 5,758,324 A | | 5/1998 | Hartman et al. |
| 5,794,207 A | | 8/1998 | Walker et al. |
| 5,832,497 A | | 11/1998 | Taylor |
| 5,862,223 A | * | 1/1999 | Walker et al. ............... 705/50 |
| 5,884,270 A | | 3/1999 | Walker et al. |
| 5,884,272 A | | 3/1999 | Walker et al. |
| 5,905,860 A | * | 5/1999 | Olsen et al. ............... 726/27 |
| 5,920,861 A | * | 7/1999 | Hall et al. ............... 707/9 |
| 5,956,714 A | * | 9/1999 | Condon ............... 707/8 |
| 5,978,768 A | | 11/1999 | McGovern et al. |
| 6,006,332 A | * | 12/1999 | Rabne et al. ............... 726/6 |
| 6,038,597 A | | 3/2000 | Van Wyngarden |
| 6,061,789 A | | 5/2000 | Hauser et al. |
| 6,064,656 A | * | 5/2000 | Angal et al. ............... 370/254 |
| 6,067,528 A | | 5/2000 | Breed et al. |
| 6,085,186 A | | 7/2000 | Christianson et al. |
| 6,185,573 B1 | | 2/2001 | Angelucci et al. |
| 6,219,652 B1 | * | 4/2001 | Carter et al. ............... 705/59 |
| 6,223,165 B1 | | 4/2001 | Laffer |
| 6,268,789 B1 | * | 7/2001 | Diamant et al. ............... 340/5.74 |
| 6,311,164 B1 | | 10/2001 | Ogden |
| 6,327,652 B1 | * | 12/2001 | England et al. ............... 713/2 |
| 6,370,510 B1 | | 4/2002 | McGovern et al. |
| 6,385,594 B1 | | 5/2002 | Lebda et al. |
| 6,547,134 B2 | | 4/2003 | Ogilvie |
| 6,611,816 B2 | | 8/2003 | Lebda et al. |
| 7,047,242 B1 | * | 5/2006 | Ponte ............... 707/10 |
| 7,502,748 B1 | * | 3/2009 | Baldwin et al. ............... 705/9 |
| 2001/0052108 A1 | * | 12/2001 | Bowman-Amuah ............... 717/1 |
| 2002/0010768 A1 | * | 1/2002 | Marks et al. ............... 709/223 |

OTHER PUBLICATIONS

NSF Grant Proposal Guide (NSF 00-2), National Science Foundation, Oct. 1999.

NSF Grant Proposal Guide (NSF 99-2), National Science Foundation, Oct. 1998.

Kirby, Willia, "The Future of Electronic Proposal Submission", http://www.ncura.edu/data/newsroom/newsletters/pdf/apr97/4.html, Apr. 1997.

Kennedy, Joyce Lain et al., "Electronic Resume Revolution—Creating a Winning Resume for the New World of Job Seeking," Second Edition, John Wiley & Sons, Canada, 237 pages (MON002099-2335), 1995.

Kennedy, Joyce Lain et al., "Electronic Job Search Revolution—How to Win with the New Technology That's Reshaping Today's Job Market," Second Edition, John Wiley & Sons, Canada, 198 pages. (MON002336-2533), 1995.

Riley, Margaret et al., "The Guide to Internet Job Searching," Job and Career Information Services Committee of the Adult Lifelong Learning Section, VGM Career Horizons, Illinois, 227 pages (MON002730-2956), 1996.

The Monster Board, Monster Recuiter's Center, www.monster.com, 65 pages (MON003352-MON003416), 1998 (accessed Jul. 25, 2008).

* cited by examiner

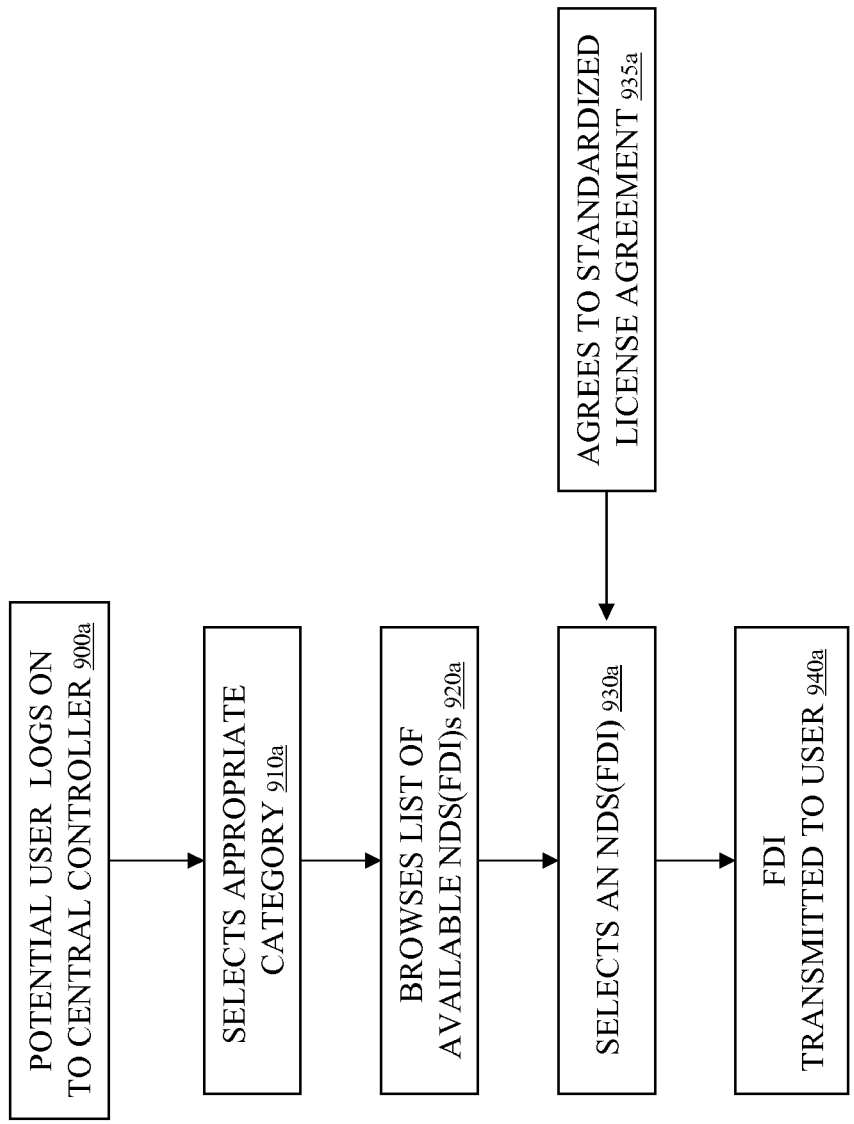

FACILITATING ELECTRONIC EXCHANGE OF PROPRIETARY INFORMATION

CROSS-REFERENCE TO RELATED APPLICATIONS

This patent application is a continuation of U.S. patent application Ser. Nos. 11/379,926, 11/379,930, and 11/379,935, all filed Apr. 24, 2006, which are continuations of U.S. patent application Ser. No. 10/854,653, filed May 24, 2004, which is a continuation of U.S. patent application Ser. No. 09/747,748, filed Dec. 22, 2000, which claims the benefit of U.S. provisional patent application 60/173,170, filed Dec. 27, 1999, which are incorporated by reference along with all other references cited in this application.

BACKGROUND OF THE INVENTION

The method and apparatus of the present invention relate to electronic contract applications using electronic networks.

Innovation in the past two decades has been unprecedented. Innovation is important in facilitating economic growth, enhancing standards of living, spreading creativity, and the arts. Today, the Internet is the fastest growing communications tool in the history of the world; tomorrow, the Internet will be the primary communications tool for the entire world. Full-time instantaneous access to every waking person: this is the future. With the Internet, ideas may be communicated between parties more quickly.

With the ease of the communication of ideas today and in the future through the Internet or other similar communications networks and mediums, there are also shortcomings. Innovators worry that their ideas might be misappropriated or nonconfidentially disclosed. People who require innovations do not have a place to solicit other's ideas or confidentially list their requirements. These are just some of the many shortcomings of communicating ideas over a medium such as the Internet.

Furthermore, the deficiencies in the prior art include, but are not limited to, lack of standardized commercial and contractual relationships; lack of industry and trade practices applicable across a multitude of industry segments; lack of clear submission criteria; lack of binding, universally applicable confidential disclosure means; lack of efficient and accessible enforcement means; inability to identify accurately likely users capable of implementing the idea or innovation; uncertainty in legal obligations between originator and user; the inability to identify relevant ideas prior to gaining access to a fully disclosed idea; and inability to identify relevant ideas prior to gaining access to a fully disclosed idea.

Current user-driven innovation transfer protocols are likewise limited in application. Companies of all sizes and in all industries face the same problem-how to access effectively and efficiently externally and internally generated innovation without the attendant unmanageable exposure to potential liability for alleged misappropriation. Users desiring access to externally (i.e., innovation generated by nonemployees) and internally (innovation generated by employees and consultants) generated innovation face significant barriers, transaction costs, and legal liability.

With respect to externally generated ideas, users often lack the resources and expertise required to filter and screen efficiently external, unsolicited idea submissions. Users fear that originators who have submitted ideas to them may later claim that the user's implementation of similar concepts or ideas are substantially similar to, based on, or are derivatives of those ideas disclosed to the user by the originator. Users fear that a user's independently created innovation may be subject to legal claims of originators who previously have submitted similar ideas to the user. The key to facilitating submission of innovation originated outside the organization is creating an innovation transfer tool that effectively and efficiently manages the flow of innovation and the legal relationship between originator and user.

With respect to internally generated ideas, originators often lack sufficient compensatory incentives to disclose potentially valuable ideas. Existing proprietary innovation transfer protocols for the transfer of internally generated innovation typically consist of little more than a suggestion box in which employee originators are asked to submit ideas (e.g., cost savings methods, new business methods, product or service improvements, business opportunities, advertising slogans, etc.) for use by the employer user. Typically, employer users will implement a nonbinding policy whereby the employer user indicates that, while it shall not be under any legal obligation to compensate the employee originator for the use or implementation of the employee originator's idea, the employer user will gratuitously compensate the employee originator for submitted ideas that impart significant value to the employer user. The gratuitous compensation is generally subject to an upper-limit and is determined in the sole discretion of the employer user. As a result, such idea submission programs and innovation transfer protocols fail to provide adequate incentive for employee originators to develop and disclose potentially valuable ideas and are necessarily unilateral and nonbinding. The present invention addresses the deficiencies in the prior art by empowering employee originators with the ability to negotiate at arms length with employer users as to the "reasonable compensation" to be paid for the employer user's use of the idea. The present invention allows for and facilitates bilateral commerce in employee-originator developed ideas.

The deficiencies in the prior art include the inability of smaller businesses and individuals to communicate globally to potential originators confidential RFPs; the inability of originators to search efficiently and effectively for relevant RFPs; the inability of smaller organizations or individuals to identify efficiently and effectively willing originators and to obtain and access proposals and potential solutions; and the inability of originators to communicate efficiently and effectively proposed solutions globally and confidentially to smaller organizations and individuals.

Therefore, there is a need to utilize the power of the Internet and to allow for the implementation of a unique business model to manage effectively and efficiently a marketplace for raw ideas-in short, to manage innovation. There is need to allow novice and expert innovators alike to present confidentially or nonconfidentially their ideas, innovations and inventions directly or globally to individuals and companies capable of implementing the innovation and possessing the resources needed to exploit the opportunity.

As can be seen, a method and apparatus are needed to provide an electronic marketplace of ideas and confidential ideas over a network or system like the Internet.

BRIEF SUMMARY OF THE INVENTION

The present invention is a method and apparatus for effectuating bilateral commerce in ideas. The present invention is both an originator- and user-driven on-line commercial network system designed to facilitate idea submission, purchase, and licensing and is easily adapted to business-to-business (B2B) transfers of innovation as well as consumer-to-business (C2B) transfers of innovation. The invention allows originators of ideas to communicate nondisclosing synopses of ideas directly or globally to potential users, for users conveniently to search for relevant ideas and for users potentially to bind an originator to a license granting the user the right to access and consider confidentially the originator's fully disclosed idea. The invention also allows users to communicate confidentially or nonconfidentially unsolved problems or needs globally to potential originators, for originators conveniently to search for relevant unsolved problems or needs and for originators to submit and communicate confidentially proposed solutions to the soliciting user.

In one embodiment, the apparatus of the present invention includes a controller that receives ideas from originators. The controller classifies the ideas according to topic, industry, intended user, or other characteristic or input variable and makes a nondisclosing synopsis (summary or description) of the ideas available individually and/or globally to one or more potential users. Potential users have the option to review all nondisclosing synopses or define relevant search criteria that is utilized by the controller's search engine to search the fully disclosed idea database and display relevant nondisclosing synopses with a corresponding relevancy rank. Potential users may access the fully disclosed idea that corresponds to the chosen nondisclosing synopsis and thereby bind both the user and the originator to a license agreement granting the user the right to access and consider the fully disclosed idea on the terms contained in the license. The relevancy rank allows potential users to access only relevant fully disclosed ideas and rank or prioritize the nondisclosing synopses that seem to meet the potential user's criteria. In this manner, users do not have to access those fully disclosed ideas for which the user has no desire to review and consider, thus reducing any potential exposure to liability for misappropriation with respect to fully disclosed ideas not accessed by the user.

In an alternative embodiment, the user is not granted access to the fully disclosed idea unless and until the originator grants the identifiable user access. In this embodiment, the user, upon attempting to access the fully disclosed idea, is informed by the system that authorization from the corresponding originator is required. The user is then requested by the system to input identifying and other required information. The corresponding originator is notified by the central controller that a user desires access to the fully disclosed idea. The notification contains the relevant identifying and other information about the user. If the originator does not wish this particular user to access the fully disclosed idea, the user is informed by the central controller that access has been denied. If the originator approves of the user, the user is notified by the central controller that access has been granted.

In one embodiment, the apparatus of the present invention includes a controller that receives ideas from originators. The controller classifies the ideas according to topic, industry, intended user or other characteristic or input variable and makes a nondisclosing synopsis (summary or description) of the ideas available globally to potential users. Potential users then have the option to access the fully disclosed ideas and thereby bind both the user and the originator to a license granting the user the right to access and consider the fully disclosed idea according to the terms of the license agreement. Users desiring to commercially exploit or otherwise utilize the originator's fully disclosed idea will negotiate directly with the originator for an exclusive or nonexclusive license, option, preemptive right or assignment of the idea utilizing current chat, voice-telephony or other electronically or web-enabled communication means.

In another embodiment, the apparatus of the present invention includes a controller that receives detailed descriptions of users' unmet needs or unsolved problems. The controller classifies the unmet needs or unsolved problems according to topic, industry, intended originator, or other characteristic or input variable and makes a nondisclosing synopsis (summary or description) of the unmet needs or unsolved problems available directly or globally to potential users. Potential originators have the option to access the fully disclosed unmet needs or unsolved problems and thereby bind both the user and the originator to a license granting the originator the right to access and consider the fully disclosed unmet need or unsolved problem according to the terms of the license agreement. Originators desiring to propose solutions to the soliciting users' unmet needs or unsolved problems will submit to the central controller or directly to the soliciting users, proposed solutions to the users' unmet needs or unsolved problems. Such proposed solutions are submitted and communicated to the soliciting users in the same manner described above for originators submitting ideas. Soliciting users then access the originator's proposed solution in the same manner described above for users accessing ideas of originators. Users desiring to implement or otherwise use an originator's proposed solution will negotiate directly with the originator to determine the terms of use and/or implementation utilizing current chat, voice-telephony or other electronically or web-enabled communication means.

The method and apparatus of the present invention have applications on the Internet as well as conventional communications systems such as voice telephony and facsimile.

In one originator-driven embodiment of this invention, communications between originators and users are conducted using an electronic network and central controller. An originator who desires to post, license or sell an idea accesses the central controller located on a remote server; The originator submits electronically the fully disclosed idea ("FDI"), creates a nondisclosing synopsis of the idea ("NDS(FDI)"), and specifies the subject matter of the idea that he or she desires to be posted and/or the intended user whom the originator believes to have a particular interest in and/or use for the originator's FDI.

For example, a typical FDI might be an original screenplay for a feature-length comedy. The specified subject matter would be "motion picture" and a potential intended user would be Universal Studios. The originator of the screenplay would submit to the central controller the entire screenplay in text format or as an electronic file attachment such as a Microsoft Word document file. The originator would then, with the assistance of standardized submission guidelines, electronic submission forms, helpful on-line hints and current artificial intelligence technology, create a nondisclosing synopsis of the screenplay comprising a log line or brief summary of its key components, intended to disclose only enough of the screenplay's substance as is necessary to entice potential users (e.g., studio executives or motion picture producers). This nondisclosing synopsis may be in text form, video, audio, interactive hypertext or other media capable of electronic transmission. The originator may, but is not required to, input or communicate to the central controller additional information such as the originator's identity, originator's qualifications and credits, reserve price or other conditions the originator may require. For example, the originator may be an experienced and well-known screenwriter and may wish to disclose originator's identity and film credits. Originator may also designate a minimum reserve price, which in the movie industry may be the minimum option price for the script or screenplay.

Originator then attaches an originator identification (such as user name and password) to the FDI and transmits the FDI, NDS(FDI) and other disclosed information to the central controller. Under the present invention, the FDI, NDS(FDI) and other information may be transmitted via numerous means including a world-wide-web interface, electronic mail, voice mail, facsimile, courier or postal mail. Prior to accepting the FDI, NDS(FDI) and other information, central controller communicates the terms of a standardized submission agreement to the originator. If the originator refuses the terms of the submission agreement, the FDI, NDS(FDI), and other information is returned to the originator and no further action is taken by central controller. If the originator agrees to the terms of the submission agreement, central controller assigns an originator identification number unique to the specified originator and a unique tracking number to that originator's FDI. The FDI is communicated to and retained in a secure FDI database. Before communicating the NDS(FDI) and other information to potential users, central controller authenticates the originator's identification number against an originator database. The central controller then assigns a unique tracking number to the NDS(FDI) and other information which corresponds to the FDI tracking number and globally displays the NDS(FDI) and other information in a manner that is available to be viewed by any interested potential users.

In an alternative embodiment, the NDS(FDI) and other information is displayed solely to one or more intended users. NDS(FDI)s may be displayed by subject, industry or other category to make it easier for potential users to identify relevant NDS(FDI)s. Thus, a user could log onto a web site, for example, and see a listing of NDS(FDI) subject, industry or other categories. The user could then choose a particular category and have the ability to browse available NDS(FDI)s that correspond to such category. In an alternative embodiment, users can use artificial intelligence protocols and search engines to identify relevant NDS(FDI)s. In one embodiment, users may be required to provide qualifications in order to view the NDS(FDI)s in a given category.

If, after reviewing a particular NDS(FDI), a potential user wishes to access the corresponding FDI, that user communicates this intent to the central controller. Upon receipt by central controller of user's response, central controller communicates to user the terms of access as provided in an on-line license agreement granting user the right to review and consider the FDI. If user refuses the terms of the license agreement, access to the FDI is denied by central controller. If user agrees to the terms of the license agreement, central controller time-stamps user's response and authenticates user's identity and user's qualifications to determine if user's qualifications meet any conditions imposed by the originator as to which users may obtain access to the FDI. The system then verifies that the NDS(FDI) is still "active" and that the FDI is capable of being accessed. If user meets all conditions, central controller communicates the FDI to user and changes status of the corresponding FDI to "licensed." Central controller assigns a unique tracking number to user's response and stores it in a user response database. In one embodiment subsequent users will be able to access a "licensed" FDI. In another embodiment the user that licensed the FDI is granted an unlimited period of time in which to review and consider the FDI. Central controller then communicates a license confirmation to the originator and the user.

In one embodiment, the originator may specify that access to an FDI be limited to one user at a time. In this embodiment, the accessing user is given a limited period of time to review and consider the FDI (e.g., 48 hours). In the event that the accessing user decides not to license, purchase or otherwise acquire the rights to the FDI, the accessing user is denied further access and the FDI is made available to a subsequent user for exclusive review and consideration.

If a user desires to obtain the right to use the FDI or otherwise an option, license, preemptive right, or assignment of the FDI, that user proposes terms of an FDI transfer agreement and communicates the offer to central controller. Central controller receives proposed FDI transfer agreement and assigns a unique tracking number. FDI transfer agreement status is set to "active." FDI transfer agreement is stored in FDI transfer agreement database and then transmitted to the originator for review and consideration. If originator does not bind user by accepting the proposed terms of the FDI transfer agreement, FDI transfer agreement is transmitted back to user and status of the FDI transfer agreement changes to "completed." User may then submit subsequent proposed FDI transfer agreements using the same procedure as outlined above. If originator binds, the originator communicates acceptance of the FDI transfer agreement to central controller and status of the FDI transfer agreement changes to "completed."

In another embodiment, the terms of an FDI transfer agreement are specified by the originator and included in the FDI transmitted to the user. If user agrees to the terms of transfer and/or terms of use proposed by originator in the FDI, user communicates acceptance to central controller. Central controller time-stamps user's response and authenticates user's identity and qualifications. The central controller then assigns a tracking number to user's response, and user's response is stored in an FDI transfer agreement database. At this point, user and originator are parties to legally binding agreement.

In another embodiment, the central controller automatically manages the payment system between user and originator. Various methods of payments may be utilized by the invention, including credit cards, personal checks, electronic funds transfer, debit cards, digital cash, etc. The payment system may also involve the use of an escrow account associated with the user wherein funds advanced by the user to cover the FDI transfer price agreed to in the FDI transfer agreement can be kept pending delivery of FDI and performance of any obligations by originator as provided in the FDI transfer agreement.

The present invention is therefore a highly effective and efficient bilateral originator-driven commerce system. It improves the ability of originators to reach users desiring access to and use of originators' FDIs and improves users' ability to identify relevant FDIs.

The present invention has further user-driven applications in the form of the posting of unmet needs and unsolved problems. Current needs posting protocols are limited in application and usefulness.

Successful implementation of existing needs posting protocols requires complete, up-front disclosure of the unmet need or unsolved problem. The present invention allows for and facilitates the posting of a nondisclosing synopsis of the unmet need or unsolved problem as well as posting of a nondisclosing synopsis of the proposed solution.

In one user-driven embodiment of this invention, a user who desires to post a request for proposal comprising a fully disclosed unmet need or unsolved problem ("RFP") accesses the central controller located on a remote server. The user electronically submits the RFP, creates a nondisclosing synopsis of the RFP ("NDS(RFP)") and specifies the subject matter of the RFP desired to be posted and/or the intended originator whom the user believes is capable of proposing solutions to the user's RFP. For example, a typical RFP might be a request for method for formation of crystalline metal oxides at low temperatures. The specified subject matter would be chemical process and a potential intended originator would be the University of New Mexico.

The present invention is therefore a highly effective and efficient bilateral user-driven commerce system that improves the ability of users to reach originators capable of satisfying users' unmet needs and unsolved problems and improves originators' ability to identify relevant RFPs and submit FDIs comprising a solution to users' RFPs.

The present invention can also be practiced in off-line embodiments rather than electronic mail or web-based servers. Originators and users may communicate with central controller via telephone, facsimile, courier, postal mail or other off-line communications tools. For example, an originator may use a courier to submit FDIs and NDS(FDI)s to central controller which then compiles a list of available NDS(FDI)s for distribution via courier to potential users. Users interested in a relevant NDS(FDI) and desiring access to a corresponding FDI may communicate a request to central controller which, after communicating the license agreement to user and receiving user's acceptance of the license agreement terms, delivers the FDI to user via courier.

In another on-line embodiment, cryptographic protocols are used to authenticate the identity of originators and/or users and verify the integrity of originator and user communications with the central controller. Using cryptography and biometrics, the central controller can make it significantly more difficult for unauthorized persons to tamper with the system by passing themselves off as legitimate originators and users or intercepting and/or eavesdropping on system communications.

What the present invention accomplishes, which no previous system has done before, is to create an effective and efficient marketplace for confidential information.

The applicant is unaware of the existence of any commercially viable bilateral user- and originator-driven commercial systems that incorporate the above features and address the deficiencies of the prior art. Therefore, it is one objective of the present invention to allow originators of ideas to communicate confidentially or nonconfidentially nondisclosing synopses of ideas globally to potential users, for users conveniently to search for relevant ideas and for users potentially to bind an originator to a license granting the user the right to access and consider the originator's fully disclosed idea.

The present invention allows users to communicate confidentially or nonconfidentially nondisclosing synopses of RFPs globally to potential originators, for originators conveniently to search for relevant RFPs and for originators potentially to bind a user to a license granting the user the right to access and consider the user's fully disclosed RFP.

The present invention allows employee and nonemployee originators to communicate confidentially or nonconfidentially nondisclosing synopses of ideas directly to relevant and intended users and to enable such users conveniently to search for and access both internally and externally generated relevant ideas and for users potentially to bind an originator to a license granting the user the right to access and consider the originator's fully disclosed idea.

The present invention allows for effective and efficient idea transfer management to be utilized by originators and users alike.

The present invention substantially reduces transaction and search costs associated with idea transfer transactions to enable more innovation to emerge in the marketplace.

The present invention provides an effective and efficient arbitration and tracking means to mitigate potential liability associated with idea transfer transactions.

The present invention provides a negotiating means to allow the originator and user to negotiate the terms of the extended option, purchase, assignment or license of a fully disclosed idea.

In an embodiment, the invention is a method of using a computer to conduct a transaction between a user and an originator. A basic description and a corresponding detailed description of the user's unmet need or unsolved problem are input into the computer. The originator is permitted to access the basic description of the user's unmet needs or unsolved problems. For the basic description, the originator is provided an option to access the corresponding detailed description by agreeing to an on-line license agreement. The originator inputs into the computer an indication of agreement the on-line license agreement. The originator is provided with access via the computer to the corresponding detailed description. The on-line license agreement may have be a limited duration, exclusive license. After the originator has indicated agreement to the on-line license agreement, other potential originators are disallowed from accessing the basic description and corresponding description for the duration of the license agreement. The corresponding detailed description may be stored in the computer in encrypted form. The originator is provided with an access key to decrypt the corresponding detailed description after agreeing to the license agreement.

In another embodiment, the invention is a method of using a computer to conduct a transaction between an originator and a user. A basic description and a corresponding detailed description of the originator's proposal are input into the computer. The user is permitted to access the basic description of the originator's proposal. For the basic description, the user is provided an option to access the corresponding detailed description by agreeing to an on-line license agreement. The user inputs into the computer an indication of agreement to the on-line license agreement. And, the originator is provided with access via the computer to the corresponding detailed description. The originator's proposal is submitted in response to the user's unmet need or unsolved problem inputted and accessed using the computer. The on-line license agreement may be a limited duration, exclusive license. After the user has indicated agreement to the on-line license agreement, other potential users are disallowed from accessing the basic description and corresponding description for the duration of the license agreement. The corresponding detailed description may be stored in the computer in encrypted form. The user is provided with an access key to decrypt the corresponding description after agreeing to the license agreement.

In another embodiment, the invention is an apparatus to facilitate transactions between a user and an originator. A computer includes a processor and storage device. A computer program causes the computer to store using the storage device a basic description and a corresponding detailed description of the user's unmet needs or unsolved problems. The computer program causes the computer to allow the originator to access the basic description of the user's unmet needs or unsolved problems. The computer program causes the computer to allow the originator to access the corresponding detailed description by agreeing to an on-line license agreement.

In another embodiment, the invention is an apparatus to facilitate transactions between a user and an originator. A computer including a processor and storage devices. A computer program causes the computer to store using the storage device a basic description and a corresponding detailed description of the originator's proposal. The computer program causes the computer to allow the user to access the basic description of the originator's proposal. The computer program causes the computer to allow the user to access the corresponding detailed description by agreeing to an on-line license agreement.

These and other features and embodiments of the present invention will be apparent to those skilled in the art from the following detailed description of the invention, the accompanying drawings and the claims. The present invention provides efficient idea and intellectual asset submission, storage, distribution, screening, tracking and scoring. The present invention facilitates identification of relevant ideas prior to viewing an FDI to reduce the likelihood of a user accessing irrelevant ideas or accessing ideas already under development, previously considered or independently developed by the accessing user.

BRIEF DESCRIPTION OF THE DRAWINGS

FIG. 9a depicts an embodiment showing a user selecting an NDS(FDI), accepting the terms of a license agreement and accessing the associated FDI.

FIGS. 10b and 11b depict an embodiment showing the binding of an originator to the license agreement upon selecting an NDS(RFP) for further review as required to access the corresponding RFP.

FIGS. 14a through 17a depict a user authentication procedure using conventional cryptographic protocols.

FIGS. 14b through 17b depict an originator authentication procedure using conventional cryptographic protocols.

DETAILED DESCRIPTION OF THE INVENTION

Figure 1A:
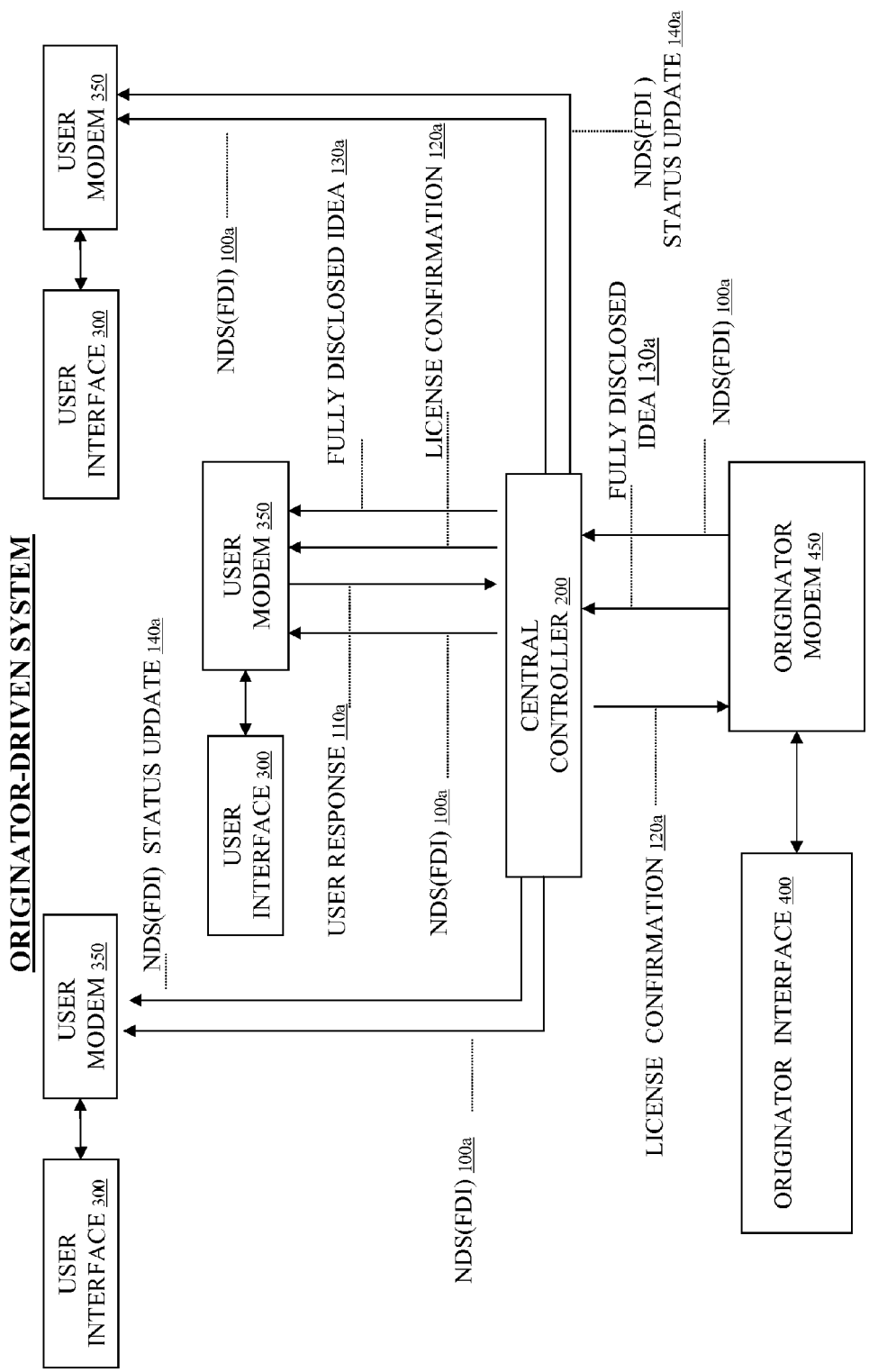
FIG. 1a illustrates an originator-driven embodiment of the present invention.
Figure 1B:
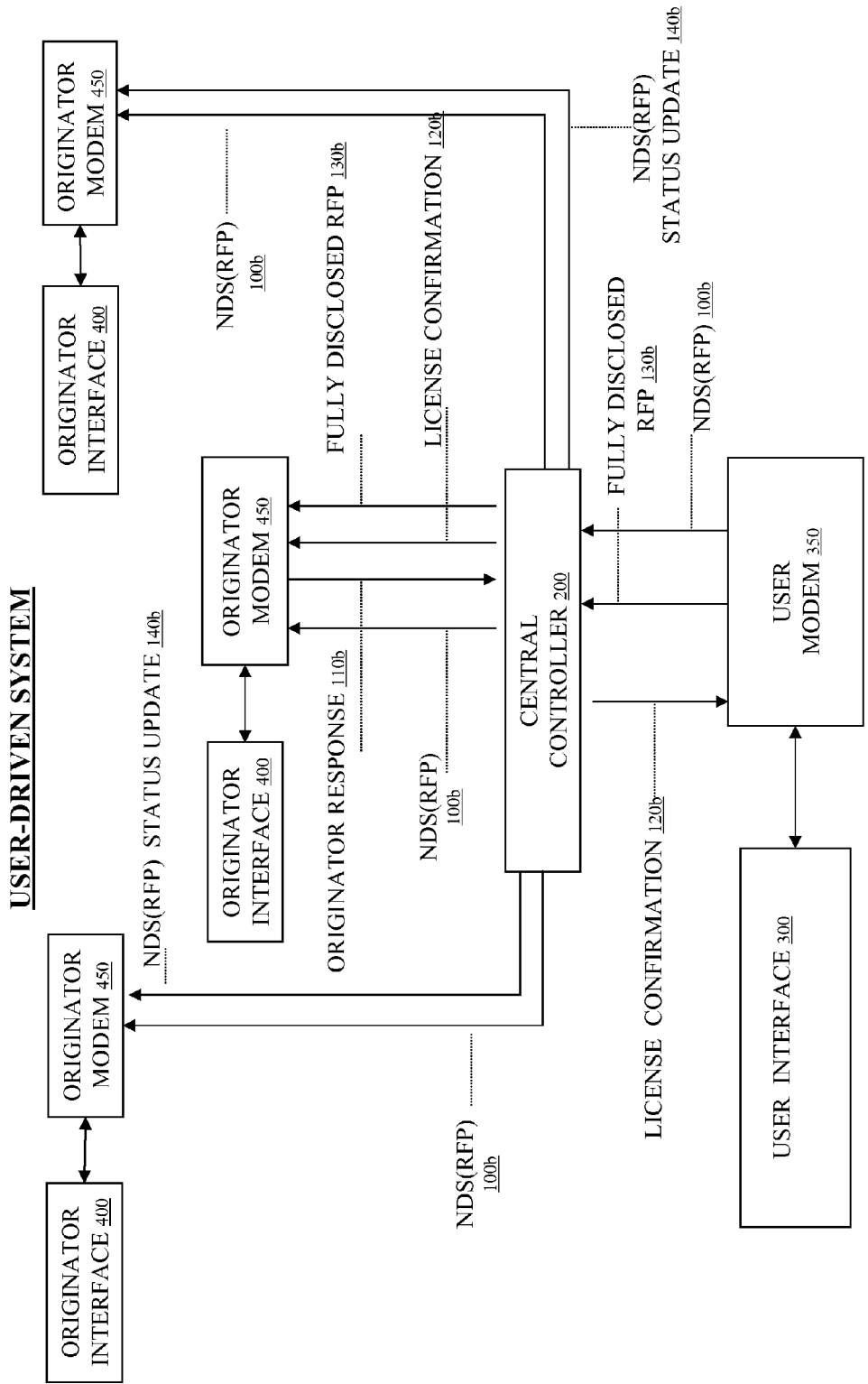
FIG. 1b illustrates a user-driven embodiment of the present invention.

The present invention is a method and apparatus for effectuating bilateral commerce in ideas. The present invention is both an originator- and user-driven on-line commercial network system designed to facilitate idea submission, purchase and licensing and is easily adapted to business-to-business transfers of innovation as well as consumer-to-business transfers of innovation. The invention allows originators of ideas to communicate nondisclosing synopses of ideas directly or globally to potential users, for users conveniently to search for relevant ideas and for users potentially to bind an originator to a license granting the user the right to access and consider confidentially the originator's fully disclosed idea. The invention also allows users to communicate confidentially or nonconfidentially unsolved problems or needs globally to potential originators, for originators conveniently to search for relevant unsolved problems or needs and for originators to submit and communicate confidentially proposed solutions to the soliciting user.

By creating an Internet-based marketplace for ideas and confidential information, the present invention will allow companies of all sizes and in all industries to identify and directly access internally and externally generated innovation in a manner that (i) enables consideration of only relevant innovation, (ii) yields greater return on investment, and (iii) reduces search and transfer transaction costs The present invention recognizes and embraces the power of the Internet and will allow for the implementation of a unique business model to manage effectively and efficiently a marketplace for raw ideas-in short, to manage innovation. The present invention's web-enabled innovation transfer management protocol will allow novice and expert innovators alike to present confidentially or nonconfidentially their ideas, innovations and inventions directly or globally to individuals and companies capable of implementing the innovation and possessing the resources needed to exploit the opportunity. By creating an Internet-based marketplace for ideas and confidential information, the present invention will allow companies of all sizes and in all industries to identify and directly access internally and externally generated innovation in a manner that (i) enables consideration of only relevant innovation, (ii) yields greater return on investment, and (iii) reduces search and transfer transaction costs.

It has been said that ideas are to the Information Age what iron ore and other raw materials were to the Industrial Age-only you can't put a fence around ideas. Well, now you can. The present invention offers innovators the fence needed to protect their raw ideas.

The present invention allows what no previous commercial system has ever achieved-instantaneous access to the collective innovation of the global community. While the present invention allows for seamless, business-to-business and consumer-to-business transfers of fully developed innovation, the truly amazing and far-reaching component of the innovation transfer management protocol is that by lowering transaction costs associated with innovation transfer transactions, the system will enable even the smallest seed of innovative effort to be directed to a relevant user. Individuals and businesses that do not currently have incentive to incur the expense of gaining access to users of their innovation (i.e., cost of gaining access is too high and likelihood of success is too low), will now have the opportunity to present the innovation to potential users by incurring only nominal expense. Individuals and consumers will use the system to post and pitch ideas, inventions, product improvements, advertising slogans, sitcom episode treatments, movie concepts and treatments, toy design concepts, book ideas and manuscripts, game concepts, etc. Small to medium-sized businesses will use the system to post and pitch unimplemented innovation (i.e., opportunities they are unable to pursue but that have value for another user), to gain access to innovation and also to post descriptions of unmet needs and unsolved problems (Request for Proposal—"RFP") as a low-cost alternative to management and advertising consulting. Larger businesses will use the system to post and pitch unimplemented innovation, to gain access to new innovation, to reduce reliance on internal research and development, to post RFPs and to establish internal and external innovation transfer tools.

Undeveloped ideas are generally not protectible under Patent, Copyright or Trademark law. Undeveloped ideas are not patentable because they have yet to be reduced to practice, and ideas, whether developed or undeveloped, are not legally copyrightable or trademarkable. Copyright protection is directed towards the expression of the idea and not the idea itself. Trademark protection simply allows the owner of a mark used to identify the owner's goods or services to prevent others from using the same or confusingly similar mark to identify the source of similar goods or services. While ideas are generally protected under Trade Secret Law, the ideas lose protectibility upon disclosure, unless disclosed for limited purposes and to a limited number of persons and only if subject to a confidentiality and nondisclosure agreement. Furthermore, trade secret protection will not be available once the idea is brought to market or otherwise placed within the public domain. In general, a trade secret is anything and everything useful or advantageous in business activity but not generally known or easily ascertainable by others in the trade. Therefore, undisclosed, novel ideas not otherwise within the public domain are protectible under Trade Secret Law. Ideas within the public domain are never capable of protection under Trade Secret Law.

Developed ideas (e.g., reduced to practice) may not be patentable if they are not novel and/or are obvious extensions of the prior art. Nonnovel and obvious developed ideas may still be protectible under Trade Secret Law (provided they are not within the public domain), but such protection is necessarily subject to the same limitations as is protection for undeveloped ideas. Namely, once disclosed, such ideas often lose their protection.

Limited protection is available, however, for all ideas (whether in the public domain, disclosed or undisclosed) under a developing area of law commonly referred to as the Law of Undeveloped Ideas. Such protection is limited because the protection is applicable only as between contracting parties. This body of law enforces contractual obligations to pay the originator of a creative idea for its use. He who takes the benefit must take the burden. The benefit in the case of idea disclosure is access to the originator's ideas; the burden is that if the user decides to implement the originator's idea, the user must pay for such use.

The Law of Undeveloped Ideas is somewhat of a misnomer, as the legal principles are applicable to developed and undeveloped ideas. The Law of Undeveloped Ideas is a miscellaneous accumulation of state common-law decisions addressing a claimed right to compensation for a defendant's unauthorized use of the plaintiff's idea. California, in part due to the prevalence of the entertainment industry, is leading the development of the principles under the Law of Undeveloped Ideas.

It is common practice in the motion picture, radio, television and other industries for originators to conceive and submit ideas for sale before developing a concrete literary composition or reducing the invention to practice. For example, it is customary for screenwriters or other creators to submit stories, central themes, treatments and dramatic cores to producers and studios with the accepted understanding that such submissions are for a limited and confidential purpose and that use will not be made thereof unless there is appropriate payment by the producer or studio.

Another common example is evident in the toy industry. It is common practice in the toy industry for toy developers to "pitch" their ideas and concepts to toy marketing companies prior to reduction to practice. If the toy company likes the idea and anticipates commercial application, it will pay an advance to the developer either (i) to secure immediately the exclusive marketing rights to products embodying the concept or idea, or (ii) to option the concept or idea and provide funds to the originator to develop a "proof of concept" or prototype. The scope of the idea is intentionally broad to cover all variations and derivative products resulting from or inspired by the original idea. The toy company is paying the originator for the first opportunity to bring the idea to market and obtain exclusive marketing rights to the initial product and derivatives thereof. In exchange for this "first mover" opportunity, the toy company agrees to pay a royalty on all products sold deriving from the original idea.

Under California law, an originator can prevail in an action to recover compensation for use of an idea if (i) before or after disclosure the originator has obtained from the user an express promise to pay for use of the idea, or (ii) the circumstances preceding and attending the disclosure of the idea indicate an implied promise whereby the originator has clearly conditioned his offer to disclose the idea upon an obligation to pay for it if it is used by the user, and the user, knowing the condition before the idea is disclosed by the originator, voluntarily accepts and uses the idea.

Under California law, there is no requirement that the idea be "novel" or "reduced to a concrete form." Even though an idea may be common or open to public knowledge, its disclosure is sufficient consideration for the promise to pay for its use upon disclosure. The concepts of "novelty" and "concreteness" speak to the value of the idea and not its protectibility under contract law. A proven idea is necessarily more valuable than an unproven idea; however, the disclosure of either can be consideration for a contract to pay for its use. The Law of Undeveloped Ideas seeks to protect originators who, in attempting to market, exploit or sell their ideas, must disclose them to potential users. It encourages the development and exploitation of those items of lesser or different invention than might be accorded protection under the patent laws, but which items still have an important part to play in the technological, artistic and scientific advancement of the human race. Essentially, Trade Secret Law and the Law of Undeveloped Ideas promote the sharing of knowledge and innovation, and the efficient operation of industry; these laws permit the originator to reap the rewards of his/her/its labor by contracting with a company possessing the necessary resources to develop and exploit it. While trade secret protection is generally lost upon nonconfidential disclosure, the Law of Undeveloped Ideas will enforce contractual obligations between an originator and a user even after the idea is made known to the public at large. This is because the user was given a particular competitive advantage in being the first to consider and exploit the originator's idea.

Individuals and companies frequently stumble upon ideas, innovations and business opportunities that have a positive net present value; the problem is that these individuals and companies lack adequate resources and/or core competencies to exploit the opportunities. The opportunity may be in an industry segment with which the individual or business is not familiar, or the originator may lack adequate capital, business experience, entrepreneurial ambition or market position to successfully develop, implement and exploit the idea, concept or innovation. In addition, larger firms often pass on positive net present value innovations for a myriad of reasons, including (i) development is outside the company's core competencies; (ii) development and implementation of a new concept does not fit with the company's strategic plan; (iii) inadequate current resources; (iv) higher priority opportunities; and (v) lack of leadership and passion. Thus, the originator frequently tries to interest larger or better-positioned companies in developing and exploiting his or her ideas in an arrangement that enables all parties to share equitably in any successes attributable to the idea. Contact and communication between an originator and a user, however, is costly and may raise potential problems and significant legal risks for each party.

For example, (i) an employee may disclose an inventive idea for a new product to his employer, who then begins to manufacture and sell the new product but refuses to pay the employee for the idea; (ii) an individual may submit an advertising slogan or campaign concept to a retail store or manufacturer, expecting compensation upon use, but receives nothing; (iii) a writer presents a plan for a television series or a plot summary for an episode of a current sitcom to a television producer who turns it down but then incorporates the idea in a later series without paying the originator; or (iv) an applicant for employment with a company in the course of interviewing, discloses a new business method, and later finds out that the company has implemented the new method, but the company refuses to hire the applicant/originator or pay for the information.

Companies of all sizes and in all industries face the same problem—how to access effectively and efficiently externally and internally generated innovation without unmanageable exposure to potential liability. Current processes for idea and innovation submission, if available at all, are cumbersome, costly to administer and unpredictable. Furthermore, because current idea submission protocols impose nonconfidential submission criteria and ineffective enforcement mechanisms, innovators lack adequate compensatory incentives to submit valuable ideas to relevant users. Companies face the problem of identifying users of their products or services who may have valuable suggestions regarding improvements, new products or services, more efficient distribution or sales methods, etc. Current methods include consumer focus groups, consumer surveys, consumer response cards and other costly and ineffective processes. Even if a company is able to identify innovative consumers, they lack an effective means of encouraging disclosure of the innovation and managing the transfer of the innovation.

There are many different innovation transfer protocols in use today, whether implemented via the Internet (bulletin boards, subscriber communities, e-mail, etc.) or via more traditional media (in-person pitch, agent representation, paper submission, telephonic disclosure, etc.). Generally, existing innovation transfer protocols require an idea originator to bear the transaction costs of identifying and accessing potential users. Originators often develop a potentially valuable invention or idea that could be the seed of a Valuable business opportunity, product, advertising slogan, motion picture, television series, service, etc. The originator would like to be compensated for any use of the idea. Although the originator may have inchoate intellectual property rights (e.g., patent, copyright, trade secret or other statutory property rights), the originator may wish to interest others in the idea to help exploit the opportunity. The originator may attempt to contact one or more companies or individuals that the originator believes may be interested in the originator's idea, often choosing a recognized leader in the field of the idea.

In addition to overcoming the initial barrier of identifying and accessing potential users, originators are faced with the problem of trying to disclose the idea to potential users without losing their trade secret and other rights or having the idea misappropriated by a user to whom the originator has disclosed the idea. Once an originator identifies a potential user of the idea, the originator must contact the potential user to determine if the user accepts unsolicited ideas. Many users refuse to accept unsolicited ideas for fear of later claims of misappropriation. Those that do accept unsolicited idea submissions generally impose a nonconfidential disclosure requirement that significantly decreases the originator's ability to enforce any payment obligation on the user.

Currently, originators cannot effectively disclose or submit ideas to users either because they lack adequate resources to identify potential users or sophistication and experience to "pitch" the idea to potential users, or they lack effective access to the user or to a submission process. In addition, many companies refuse to accept unsolicited ideas or honor confidential disclosures. The only current alternatives are to (i) submit the idea nonconfidentially to a potential user and hope for some compensation or (ii) do nothing and let the idea remain undisclosed and the innovation unrealized. Even seasoned originators (e.g., established writers and inventors) face significant transaction costs inherent in searching for and communicating with potential users, often settling for submission to fewer users than desired.

Thus, as one skilled in the art will recognize, there is and has been a long-felt need for a centralized originator- and user-driven system for bilateral electronic commerce in ideas and electronic idea submission capable of being utilized by novice and expert originators alike to communicate confidentially their ideas globally to potential users which addresses the deficiencies in the prior art. The present invention addresses the deficiencies in the prior art and enables a robust marketplace for confidential information and innovation.

The term "FDI" is used herein to mean, without limitation, an originator's fully disclosed idea.

The term "idea" or "ideas" is used herein to mean, without limitation, a potentially valuable invention, concept, idea, innovation, epiphany, thought, slogan, development, accident, creation, solution, discovery, suggestion, or any other act of cognition or imagination, whether generally known or novel and nonobvious, whose application has a positive net present value to, or is capable of use by or is potentially useful to some identifiable user.

The term "NDS(FDI)" is used herein to mean, without limitation, a nondisclosing synopsis of an originator's fully disclosed idea.

The term "NDS(RFP)" is used herein to mean, without limitation, a nondisclosing synopsis of a user's fully disclosed RFP.

The term "originator" is used herein to mean, without limitation, an individual or entity that originates an idea or a solution to an unmet need or unsolved problem.

The term "preemptive right" is used herein to mean, without limitation, a right of first refusal, right of first opportunity or any other legally enforceable preemptive right.

The term "RFP" is used herein to mean, without limitation, a request for proposal comprising a fully disclosed unmet need or unsolved problem.

The term "user" is used herein to mean, without limitation, an individual or entity capable of implementing an idea or in search of an idea, including an individual or entity with an unmet need or unsolved problem.

The method and apparatus of an originator-driven embodiment of the present invention will now be discussed with reference to FIGS. 1a, 2, 3, and 4. In one embodiment, the present invention includes a central controller 200, user interface 300, originator interface 400, and associated databases. The present invention receives FDIs 130a from originators, facilitates the creation by the originator of a nondisclosing synopsis of the FDI 130a, or an NDS(FDI) 100a, makes the NDS(FDI) 100a available for viewing by potential users, and allows users conveniently to search for relevant ideas and for users potentially to bind an originator to a license granting the user the right to access and consider the originator's fully disclosed idea. The use of a license ensures that the originator's FDI 130a is disclosed confidentially to potential users thereby protecting the originator from misappropriation. The license agreement may consist of a license agreement generated by the system, or the submitting originator may submit the originator's FDI subject to a license or nondisclosure agreement developed by the submitting originator. The user may then pass on the idea or initiate an offer to obtain a license, option, preemptive right, or assignment of the FDI 130a. The system utilizes current chat and voice telephony technology and payment protocols to facilitate the negotiation of the terms of an FDI transfer agreement and the transfer of the FDI 130a, or the grant of the right to use the FDI 130a, to the user.

The method and apparatus of a user-driven embodiment of the present invention will now be discussed with reference to FIGS. 1b, 2, 3, and 4. In one embodiment, the present invention includes a central controller 200, user interface 300, originator interface 400, and associated databases. The present invention receives RFPs 130b from users, facilitates the creation by the originator of a nondisclosing synopsis of the RFP 130b, or an NDS(RFP) 100b, makes the NDS(RFP) 100b available for viewing by potential originators, and allows originators conveniently to search for relevant RFPs 130b and for originators potentially to bind a user to a license granting the originator the exclusive right to access and consider the user's fully disclosed RFP 130b. The use of a license ensures that the user's RFP 130b is confidentially disclosed to potential originators thereby protecting the user from unwanted publication or disclosure. The license agreement may consist of a standardized, industry-specific license agreement generated by the system, or the submitting user may submit the user's RFP subject to a license or nondisclosure agreement developed by the soliciting user. The originator may then pass on the RFP 130a or submit a proposed solution to the soliciting user's RFP 130b, which proposed solution itself comprises an FDI 130a and may be submitted to the soliciting user in the same manner as described for the originator-driven embodiment.

System Architecture

The system architecture of the first embodiment of the method and apparatus of the present invention is illustrated with reference to FIGS. 1a through 4. As shown in FIG. 1a, the apparatus consists of three "nodes" comprising the user interface 300, originator interface 400, and central controller 200. Each node is connected via an Internet connection using any one of many available means of network communication. User interface 300 and originator interface 400 are input and output means for communications with central controller 200.

Using the above components, the present invention provides (i) a method and apparatus to post nondisclosing synopses of ideas (i.e., NDS(FDI)s 100a), make them available to potential users, and allow users to bind the originators to a limited duration license allowing user access to the fully disclosed idea (i.e., FDI 130a); and (ii) a method and apparatus to post nondisclosing synopses of requests for proposals (i.e., NDS(RFP)s 100b), make them available to potential originators, and allow originators to bind the user to a license allowing originator access to the fully disclosed RFP 130b.

Figure 2:
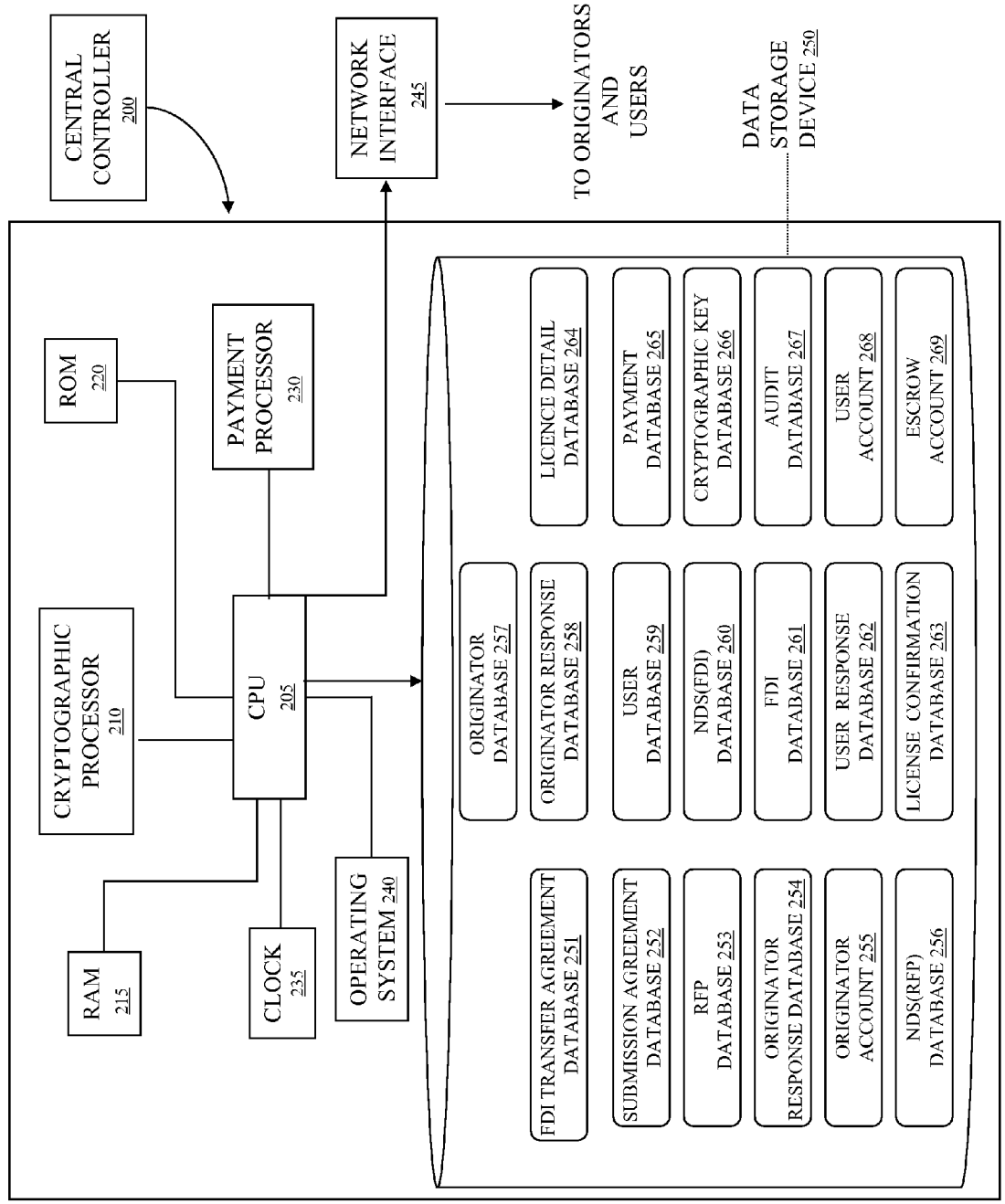
FIG. 2 shows one embodiment of the central controller.

As shown in FIG. 2. Central controller 200 includes central processor ("CPU") 205, cryptographic processor 210, RAM 215, ROM 220, payment processor 230, clock 235, operating system 240, network interface 245, and data storage device 250.

A personal computer or computer workstation with sufficient memory and processing capability may be used as central controller 200. In one embodiment it operates a web server, (i) receiving FDIs 130a and transmitting NDS(FDI)s 100a generated by originators; and (ii) receiving fully disclosed RFPs 130b and transmitting NDS(RFP)s 100b generated by users. Central controller 200 is capable of high volume transaction processing, performing a significant number of mathematical calculations in processing communications and database searches. A microprocessor such as the Pentium II, commonly manufactured by Intel, Inc., may be used for CPU 205. Equivalent processors are commonly available.

A microcontroller, commonly manufactured by Motorola, may be used for cryptographic processor 210. Equivalent processors may also be used. This microcontroller performs 128-bit SSL encryption and RSA private key operation. Cryptographic processor 210 may also be configured as part of CPU 205. Other specialized cryptographic processors are commonly known and commercially available.

Referring to FIG. 2, payment processor 230 comprises one or more conventional microprocessors, supporting the transfer and exchange of payments, charges, or debits, attendant to the method of the apparatus. Payment processor 230 may also be configured as part of CPU 205 or other device external to the system described herein. Processing of credit card, digital cash or other payment means transactions by payment processor 230 may be supported with commonly known and commercially available software. The server software transmits credit card or other account information electronically over the Internet to servers external to the system described herein where account verification and processing is handled.

Data storage device 250 may include hard disk magnetic or optical storage units, as well as CD-ROM drives or flash memory. Data storage device 250 contains databases used in the processing of transactions in the present invention, including FDI transfer agreement database 251, submission agreement database 252, RFP database 253, originator response database 254, originator account 255, NDS(RFP) database 256, originator database 257, originator response database 258, user database 259, NDS(FDI) database 260, FDI database 261, user response database 262, license confirmation database 263, license detail database 264, payment database 265, cryptographic key database 266, audit database 267, user account database 268, and escrow account database 269. In one embodiment database software manufactured by Oracle Corporation is used to create and manage these databases. Other equivalent database software programs are commonly known and commercially available.

Originator database 257 maintains data on originators with input fields such as name, contact information, type of originator, address, deposit, cash or credit account number, telephone number, identification number, taxpayer identification number, electronic mail address, credit history, past system usage and history, status and qualifications, public/private key information, etc. This information is obtained when an originator first submits an idea and registers with the system, and thereafter as the originator generates a unique transactional history by using the system for subsequent postings. Originator database 257 also contains the tracking number of each FDI 130a and NDS(FDI) 100a submitted by the originator, and the tracking number of each user response and each FDI transfer agreement proposed by the user.

User database 259 maintains data on users with input fields such as name, contact information, type of user, address, deposit, cash or credit account number, telephone number, identification number, taxpayer identification number, electronic mail address, credit history, past system usage and history, status and qualifications, public/private key information, etc.

FDI database 261 tracks and stores all FDIs 130a with fields such as tracking number, originator identification number, date, time, subject, industry category, intended user category, expiration date, conditions, etc. This database is valuable in the event of disputes between originators and users regarding access to FDIs 130a and independent creation of FDIs 130a, because details of the license and access history can be produced.

NDS(FDI) database 260 tracks and stores all NDS(FDI)s 100a with fields identical to FDI database 261. The structure of this database is identical to FDI database 261.

FDI transfer agreement database 251 tracks and stores all proposed and executed FDI transfer agreements 1850a.

RFP database 253 tracks and stores all RFPs 130b. The structure of this database is identical to FDI database 261.

NDS(RFP) database 256 tracks and stores all NDS(RFP)s 100b with fields identical to RFP database 253. The structure of this database is identical to RFP database 253.

User response database 262 tracks and stores all user responses 110a with input fields such as user name, user identification number, date, time, user response tracking number, and associated FDI and NDS(FDI) tracking numbers.

Originator response database 254 or 258 tracks and stores all originator responses 110b with input fields such as originator name, originator identification number, date, time, originator response tracking number, and associated RFP and NDS(RFP) tracking numbers.

License confirmation database 263 tracks and stores messages sent to originator and user confirming completed, binding license transactions with input fields including originator name, originator identification number, user name, user identification number, license confirmation tracking number, and associated FDI and NDS(FDI) tracking number.

License detail database 264 contains standardized, industry-specific limited duration licenses providing language binding user to confidentiality and/or other obligations for acceptance by user prior to obtaining access to an FDI 130a.

Submission agreement database 252 contains standardized, industry-specific submission agreements providing idea submission criteria for acceptance by originator prior to submitting an FDI 130a.

Payment database 265 tracks all payments made by users with input fields such as user name, user identification number, amount of payment, and associated FDI and NDS(FDI) tracking numbers. This database may also store deposit, cash or credit account information of users.

Cryptographic key database 266 facilitates cryptographic functions, storing symmetric and asymmetric keys. These keys are used by cryptographic processor 210 for encrypting and decrypting NDS(FDI)s 100a, NDS(RFP)s 100b, RFPs 130b, and FDIs 130a, user responses 110a, license confirmations 120a, FDI transfer agreements and originator responses 110b.

Audit database 267 tracks and stores transactional information related to posting of NDS(FDI)s 100a and NDS(RFP)s 100b accessing of FDIs 130a and RFPs 130b allowing it to be retrieved for subsequent analysis.

User account 268 tracks and stores all information pertaining to the user's account with input fields such as user's name, deposit, cash or credit account numbers, and debit or credit transactions.

Originator account 255 tracks and stores all information pertaining to the originator's account with input fields such as user's name, deposit, cash or credit account numbers, and debit or credit transactions. User payments for FDIs 100a may be sent to this account.

Escrow account 269 is an account that temporarily holds user funds before they are placed in originator account 255.

Network interface 245 is the gateway to communicate with originators and users through respective originator interface 400 and user interface 300. Conventional internal or external modems may serve as network interface 245. In one embodiment, network interface 245 is connected with the Internet and/or any of the commercial on-line service providers allowing originators and users access from a wide range of on-line connections. Several commercially available electronic mail servers include the above functionality and are designed to link people and information over enterprise networks and the Internet. The system is platform independent and utilizes open standards based on Internet protocols. Users and originators can exchange messages with enclosures such as files, graphics, video and audio. The system supports multiple languages. Alternatively, the network interface 245 may be configured as a voice mail interface, voice telephony interface, web site, bulletin board service or electronic mail address.

Those skilled in the art will realize that the functionality of the present invention can be distributed over a plurality of computers utilizing an unlimited number of controllers and interface devices to yield a more dynamic, robust and flexible system.

Figure 3:
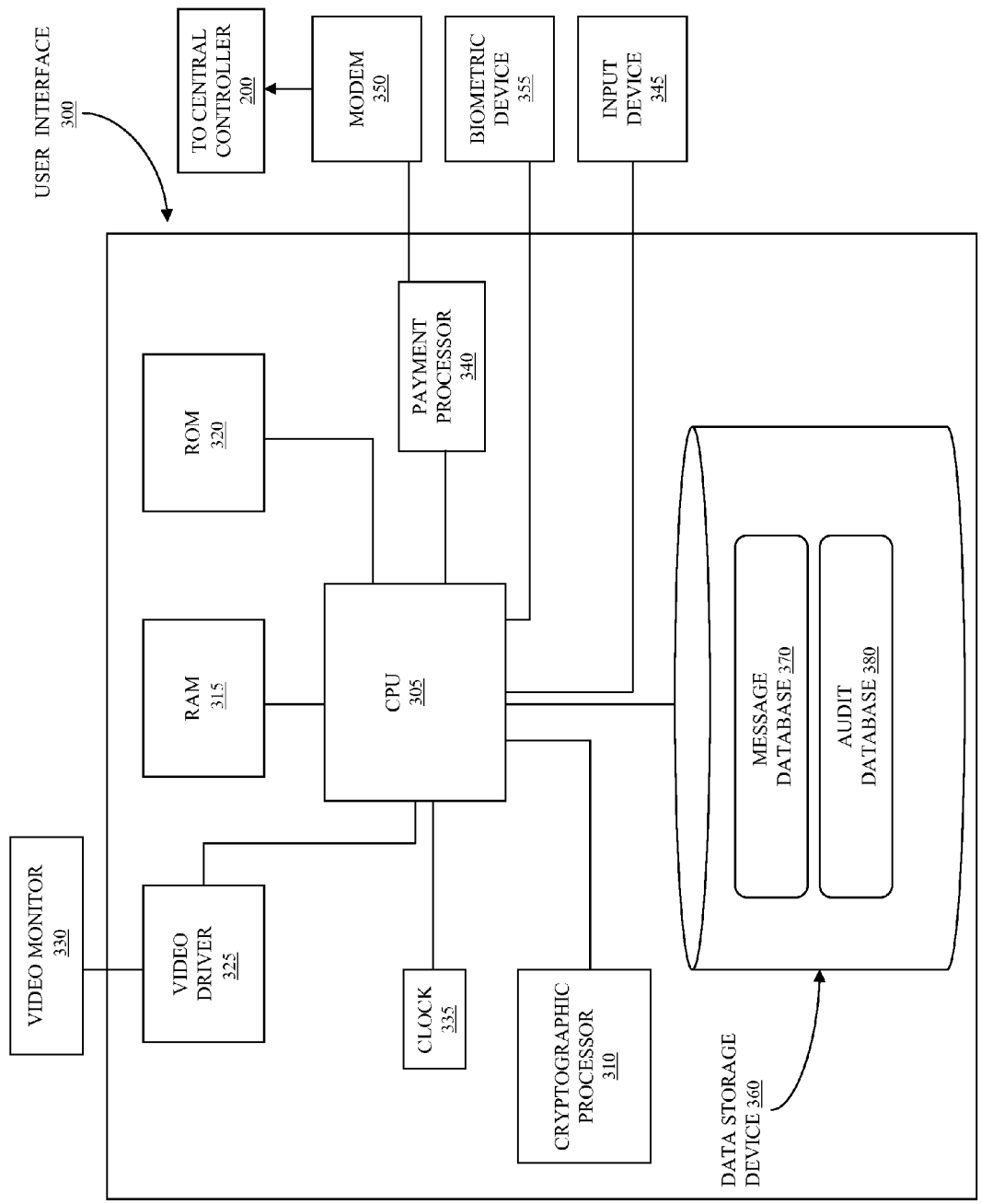
FIG. 3 shows one embodiment of the user interface.
Figure 4:
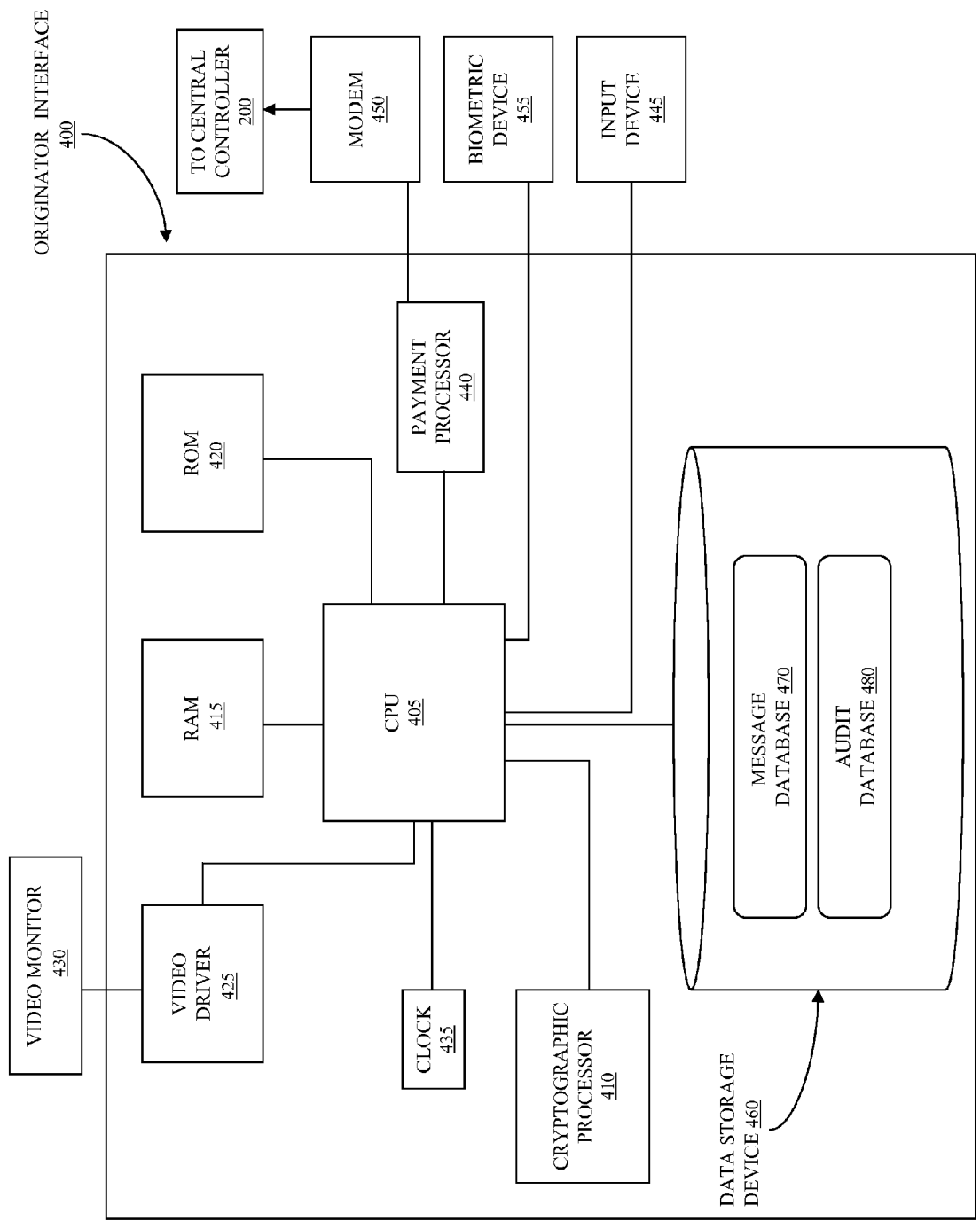
FIG. 4 shows one embodiment of the originator interface.

FIGS. 3 and 4 describe user interface 300 and originator interface 400, respectively. Both interfaces may comprise conventional personal computers having an input device, such as keyboard, mouse or conventional voice recognition capabilities; a display device, such as a video monitor; a processing device such as a CPU; and a network interface such as a modem. These devices interface with central controller 200. Alternatively, user interface.300 and originator interface 400 may also be a personal digital assistant such as those manufactured by Palm and Handspring, voice mail systems, or other electronic or voice communications systems.

Referring to FIG. 3, user interface 300, includes central processor (CPU) 305, RAM 315, ROM 320, clock 335, video driver 325, video monitor 330, communication port 340, input device 345, modem 350, and data storage device 360. Cryptographic processor 335 and biometric device 355 may be added for stronger authentication. A conventional microprocessor, such as those manufactured by Intel and AMD, may be used for CPU 305. Clock 335 is a conventional chip-based clock used to timestamp various transmissions and communications. Modem 350 is a conventional dial-up modem, cellular modem, cable modem, or DSL modem. Data storage device 360 is a conventional magnetic hard disk storage unit.

Referring to FIG. 4, user interface 400, includes central processor (CPU) 405, RAM 415, ROM 420, clock 435, video driver 425, video monitor 430, communication port 440, input device 445, modem 450, and data storage device 460. Cryptographic processor 435 and biometric device 455 may be added for stronger authentication. A conventional microprocessor, such as those manufactured by Intel and AMD, may be used for CPU 405. Clock 435 is a conventional chip-based clock used to timestamp various transactions and communications. Modem 450 is a conventional dial-up modem, cellular modem, cable modem, or DSL modem. Data storage device 460 is a conventional magnetic hard disk storage unit.

Commercial software applications such as e-mail applications manufactured by Qualcomm and Microsoft may be used to enable communications required by user interface 300 and originator interface 400. Additionally, web browser software manufactured by Netscape and Microsoft may be used when central controller 200 is configured as a web server. No proprietary software is required.

On-line Embodiment

Figure 5A:
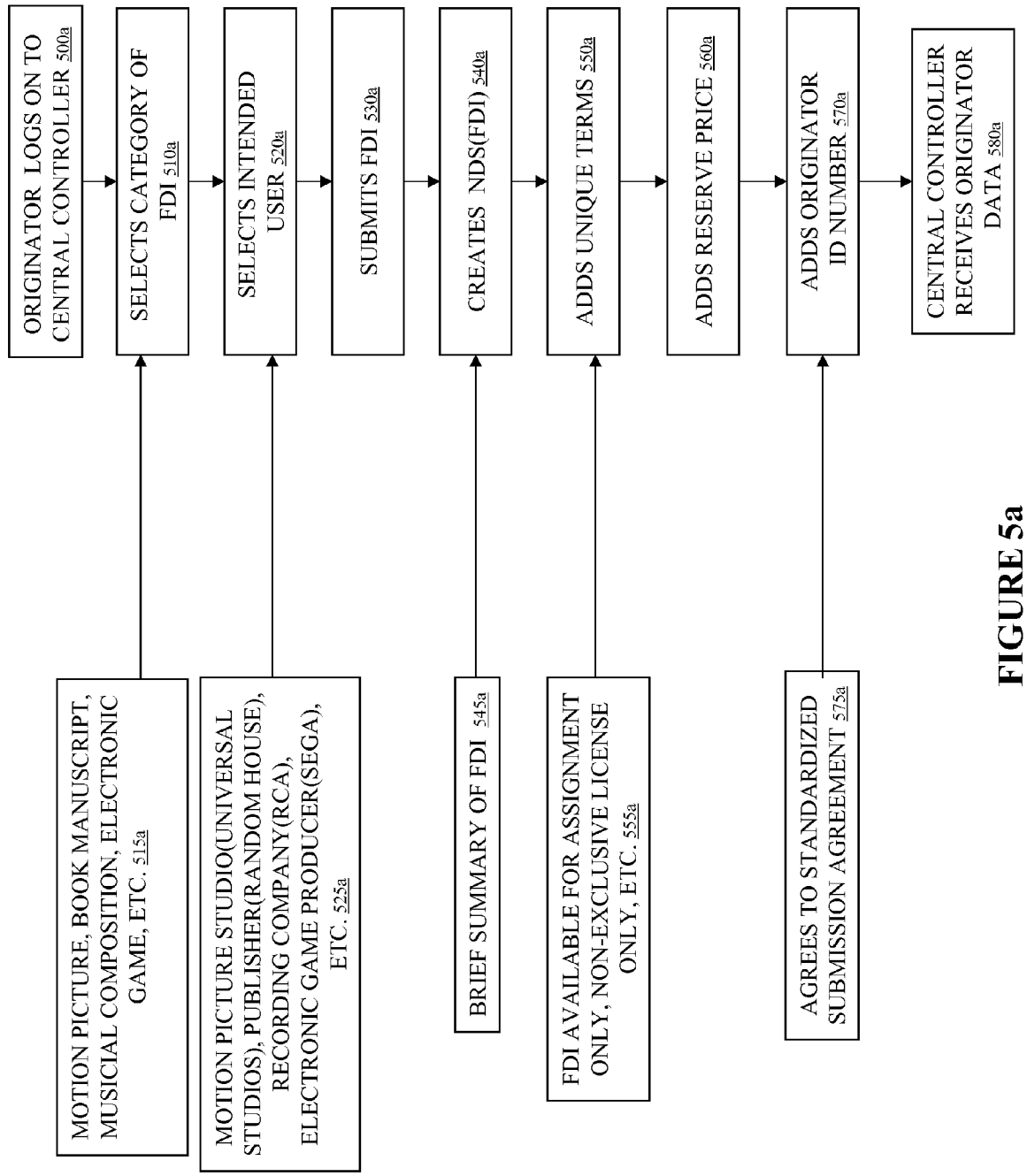
FIG. 5a depicts an originator-driven embodiment showing the submission of a fully disclosed idea, the creation of a nondisclosing synopsis, and use of a submission agreement.

In one originator-driven embodiment of the present invention, communication between originators and users occurs via the Internet or other electronic network, with central controller 200 acting as a web server. The originator logs on to the central controller 200, submits an FDI 130a and creates an NDS(FDI) 100a, agrees to terms of the relevant on-line submission agreement, and then disconnects from the network. NDS(FDI) 100a is made available to potential users by posting NDS(FDI) 100a on the web page of central controller 200. Periodic maintenance is performed by central controller 200 to ensure that active NDS(FDI)s 100a have not been licensed or expired. If a user decides to access the corresponding FDI, user response 110a is transmitted 30 electronically to central controller 200, which contacts originator that the FDI 130a has been licensed. With reference to FIG. 5a, there is described the process by which an originator submits FDI 130a and creates corresponding NDS(FDI) 100a. At step 500a the originator logs on to central controller 200 using originator modem 450 of originator interface 400, establishing a communication link. In one embodiment, central controller 200 has a page on the World Wide Web, allowing originator to provide information or attach electronic files (containing text, audio, video or other media) through the interface of conventional web browser software such as Netscape Navigator, manufactured by Netscape, Inc., or Microsoft Explorer, manufactured by Microsoft Corporation. At step 510a, originator selects the relevant category of the FDI 130a by selecting from a list of possible categories. As shown in box 515a, categories might include motion picture, book manuscript, musical composition, electronic game, etc. At step 520a, originator selects one or more, if any, intended users of the FDI 130a by selecting from a list of possible users or by manually inputting an intended user not identified on the list. As shown in box 525a, intended users will be grouped according to industry sector and might include motion picture studios, publishers, recording companies, electronic game producers, etc. After the category and/or intended user is selected, an electronic submission means is displayed on video monitor 430 of originator interface 400. This electronic submission means allows originator manually to input text comprising the FDI 130a or to attach an electronic file comprising the FDI 130a, for the purpose of submitting the FDI 130a to central controller 200.

At step 530a, originator enters the FDI 130a in the manner described above. A screenwriter, for example, might enter text or a text file comprising an original screenplay, which constitutes the originator's FDI 130a; or a musician might enter an audio file comprising an audible recording of an original musical composition, which constitutes originator's FDI 130a. At step 540a, originator creates and enters, in the same manner as for the FDI 130a, the corresponding NDS (FDI) 100a. As shown in box 545a, the NDS(FDI) 100a constitutes a brief, nondisclosing summary of the FDI 130a.

At step 550a, originator adds unique terms, if any, with respect to the accessing, licensing, purchasing, etc., of the FDI 130a. As shown in box 555a, the originator may specify that an FDI 130a is available for assignment only, for a nonexclusive license only, etc. Originator's unique terms may also include an expiration date or may restrict access to the FDI 130a to one potential user at a time, if desired. At step 560a, originator adds a reserve or minimum price, if desired. At step 570a, originator adds a name or unique ID number to the corresponding FDI 130a. The ID number is received from the central controller 200 when the originator registers for the service, or is chosen by the originator and then registered with the central controller 200. Box 575a shows that the originator must agree to the terms of an on-line submission agreement, if any, in order to post his/her/its FDI 130a and/or NDS(FDI) 100a. Central controller 200 maintains a database of originator ID numbers in originator database 257, and issues or allows only unique numbers.

Once the above elements have been created, the originator transmits them to central controller 200 at step 580a by clicking on the "send" button located on the screen in which the data is entered.

Instead of a World Wide Web-based interface, originators may also transmit FDI 130a and NDS(FDI) 100a data via electronic mail, voice mail, facsimile or postal mail transmissions.

Figure 5B:
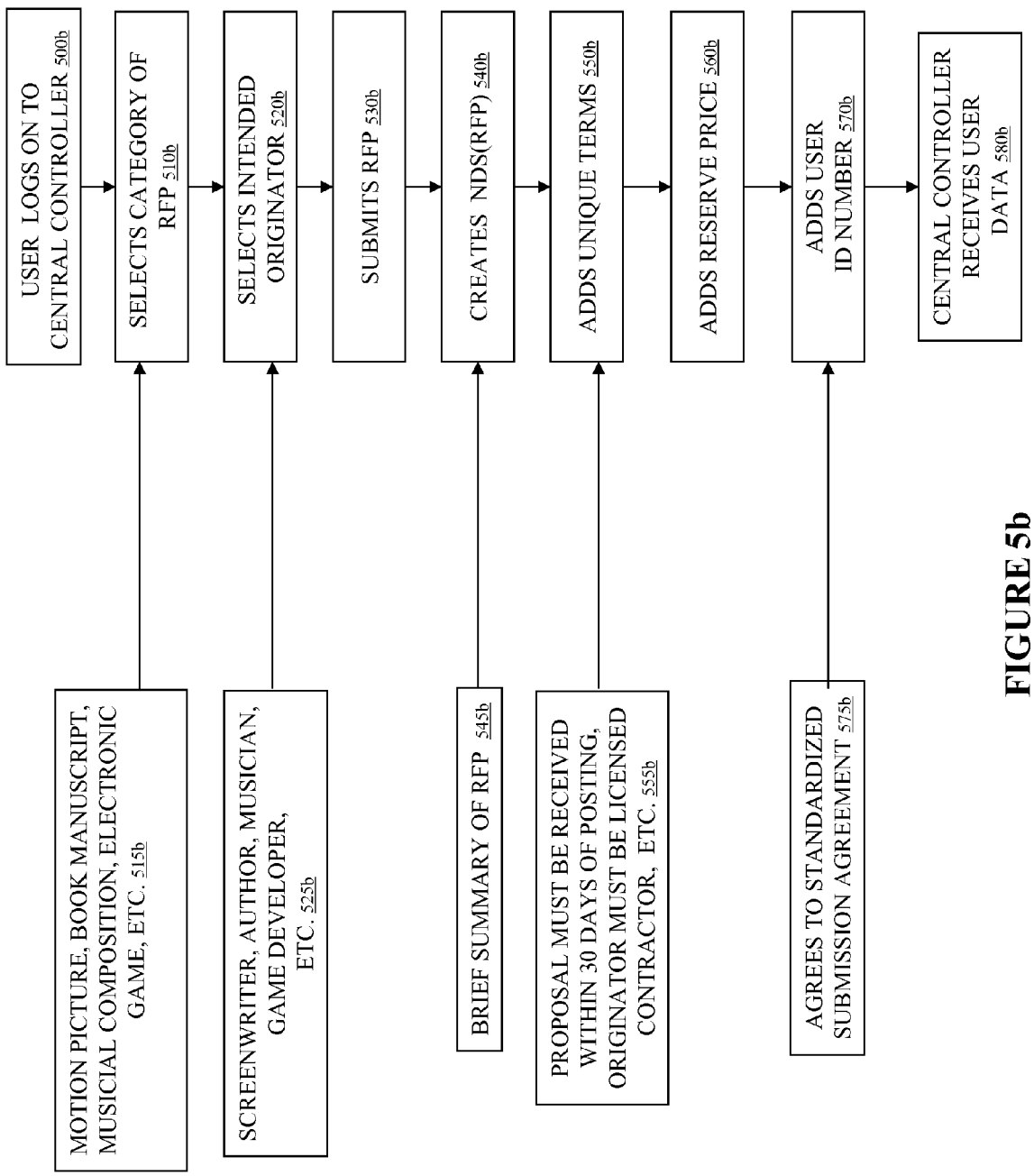
FIG. 5b depicts a user-driven embodiment showing the submission of a fully disclosed request for proposal, the creation of a nondisclosing synopsis, and use of a submission agreement.

FIG. 5b illustrates the user-driven process by which a user submits RFP 130b and creates a corresponding NDS(RFP) 100b. The process is the same as that described above for the originator-driven system illustrated in FIG. 5a.

Figure 6A:
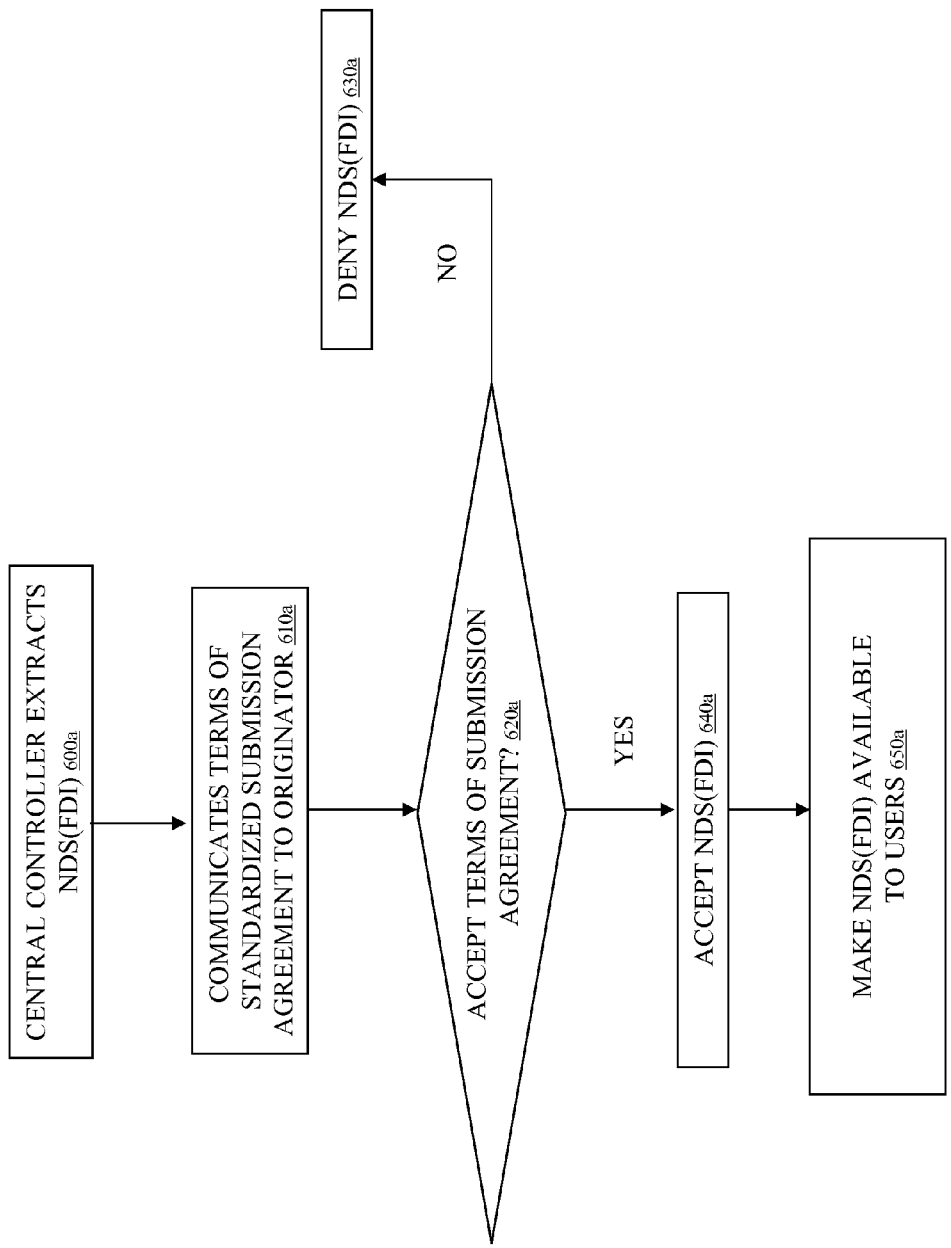
FIG. 6a depicts an embodiment showing acceptance of an NDS(FDI) by the central controller.

Referring now to FIG. 6a, NDS(FDI) 100a is received by central controller 200 at step 600a and, at step 610a, central controller 200 communicates terms of the submission agreement to originator. At step 620a, originator communicates acceptance of the terms of the submission agreement and NDS(FDI) 100a is accepted by central controller 200 at step 640a and made available to potential users at step 650a. If originator does not communicate acceptance of the terms of the submission agreement, central controller 200 denies acceptance of NDS(FDI) 100a at step 630a and communicates such denial to originator. In an alternative embodiment, originator is required to pay a submission fee after agreeing to terms of the submission agreement. The payment can be made on-line by credit card using standard SSL encryption and commercially available payment transaction methods, such as provided by CyberSource and CommerceOne.

Figure 6B:
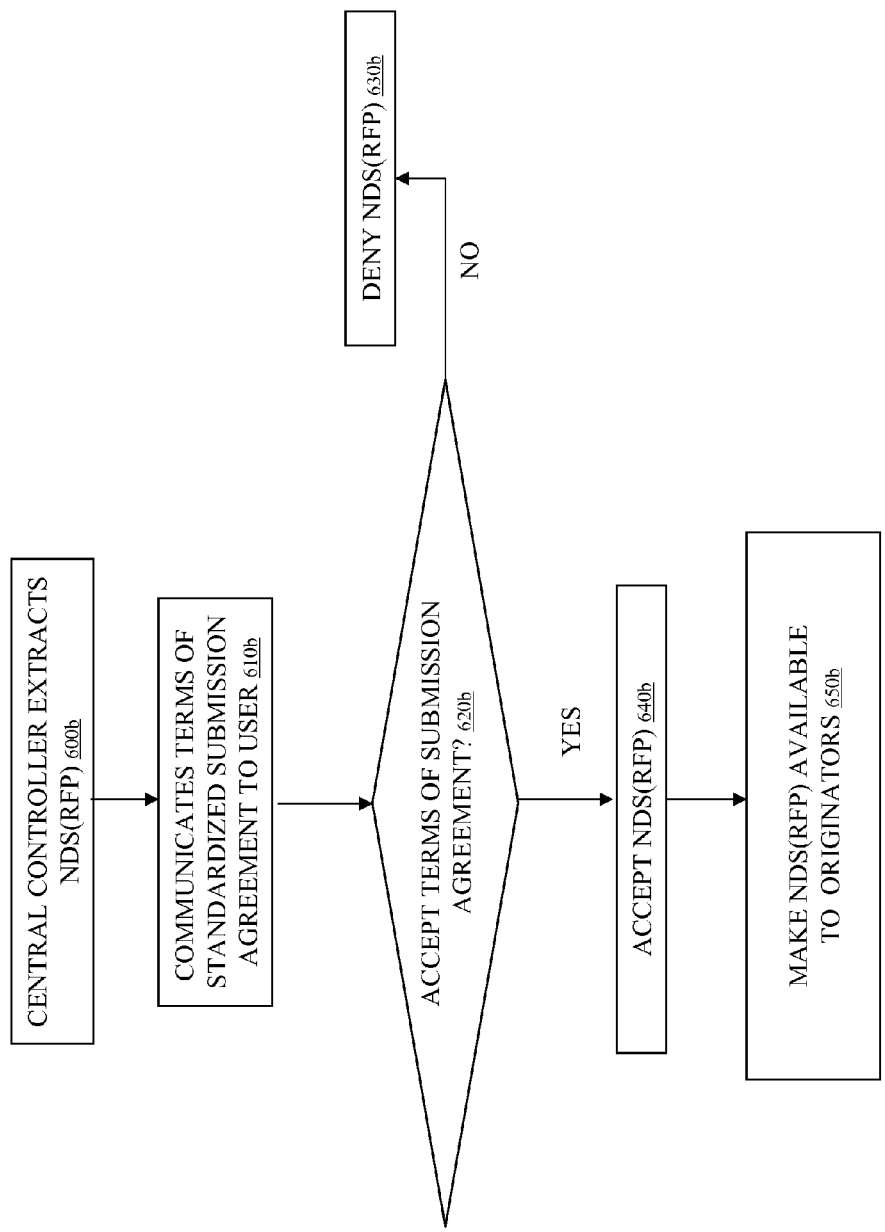
FIG. 6b depicts an embodiment showing acceptance of an NDS(RFP) by the central controller.

FIG. 6b illustrates the corresponding user-driven process for submitting RFPs 130b. The process proceeds in the same manner described above for the originator-driven embodiment.

Figure 7A:
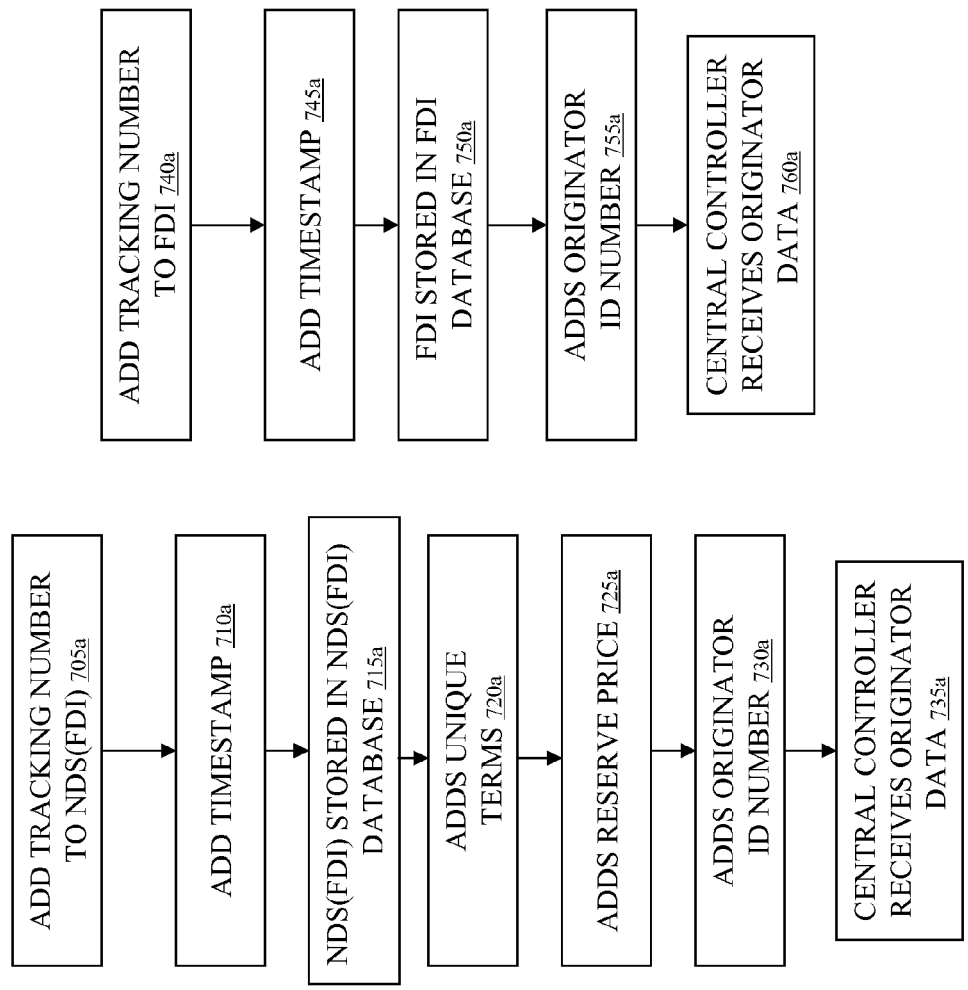
FIG. 7a depicts an embodiment showing the activation of an NDS(FDI).

Referring to FIG. 7a, there is illustrated an embodiment in which NDS(FDI) 100a and FDI 130a are activated and made available to potential users. At step 705a, a unique tracking number is added to NDS(FDI) 100a. At step 740a, a unique tracking number is assigned to FDI 130a. Central controller 200 timestamps NDS(FDI) 100a at step 710a and FDI 130a at step 745a, and then stores NDS(FDI) 100a in NDS(FDI) database 260 and FDI 130a in FDI database 261. The NDS (FDI) database 260 and FDI database 261 contain a record for each NDS(FDI) 100a and FDI 130a, respectively, which include fields such as category of FDI, status, originator's contact information, reserve price, expiration date, date received, unique terms, originator ID number, etc. The status field has values of "active," "expired" or "licensed." A status of active means the FDI 130a is available to potential users and may be licensed. A status of expired means that FDI 130a can no longer be accessed or licensed by potential users. A status of "licensed" means the FDI 130a is currently being accessed by a potential user and the corresponding originator has elected to restrict access to one user at a time.

At step 725a, central controller 200 adds any unique terms designated by originator. At step 725a, central controller 200 adds a reserve price, if any. At step 730a and 755a, central controller 200 adds originator ID number to NDS(FDI) 100a and FDI 130a, respectively.

After being stored at step 715a and 750a, NDS(FDI) 100a and FDI 130a, respectively, may go through a series of processing steps. Alternatively, these processing steps may be performed by central controller 200 at steps 735a and 760a, respectively. If necessary, central controller 200 may perform a language translation step using commercially available translation software. Central controller 200 may also perform a spelling check and grammar check using commercially available software. The NDS(FDI) 100a and FDI 130a may also be processed for clarity or completeness and the system may communicate suggestions to the submitting originator on how to improve the clarity and completeness of the corresponding NDS(FDI) 100a or FDI 130a. For instance, if the FDI 130a is a movie script in the horror genre, the central controller 200, after performing the processing steps outlined above, may communicate to the submitting originator that the screenplay is missing key information or that "horror" films are not particularly marketable at the present time.

In one embodiment, central controller 200 extracts the category of the FDI 130a, which category may include industry sector (toys, video games, software, network communications, etc.) or segment of FDI (e.g., script, business plan, musical composition, etc.), and posts the FDI 130a in the appropriate category area on a website. This would allow central controller 200 to display NDS(FDI) 100a of the corresponding FDI 130a only to the most relevant and appropriate users. In a World Wide Web environment, central controller 200 has a web page for each possible category and/or combination of categories. Thus, each user looking for screenplays (e.g., Hollywood agents or studio executives) would be able to view on the screenplay web page all NDS (FDI)s 100a corresponding to screenplay submissions. Or a potential user looking for particular business plans (e.g., venture capitalist) would be able to view all NDS(FDI)s 100a corresponding to business plans or could view a narrower subset by viewing all NDS(FDI)s 100a corresponding to business plans for companies involved in wireless applications software. Alternatively, a potential user may communicate specific criteria to central controller 200, and central controller 200 will electronically mail all NDS(FDI)s 100a meeting the user's predetermined criteria or will electronically mail a URL link to a web page containing all NDS (FDI)s 100a meeting a user's predetermined criteria. For example, a particular venture capitalist may wish to be notified of all NDS(FDI)s 100a constituting business plans for software companies.

In an embodiment in which NDS(FDI)s 100a are being transmitted to the user, user interface may comprise a computer with a modem, a cellular telephone, a fax machine, a PDA with wireless modem, or beepers and pagers. For example, a venture capitalist could instruct central controller 200 to beep him or her whenever NDS(FDI) 100a comprising a business plan for a company developing wireless applications is received by central controller 200. Details of the particular business opportunity could be transmitted to user's beeper LCD screen or to user's PDA, or user may be instructed to log on to central controller 200 to receive further details.

Figure 7B:
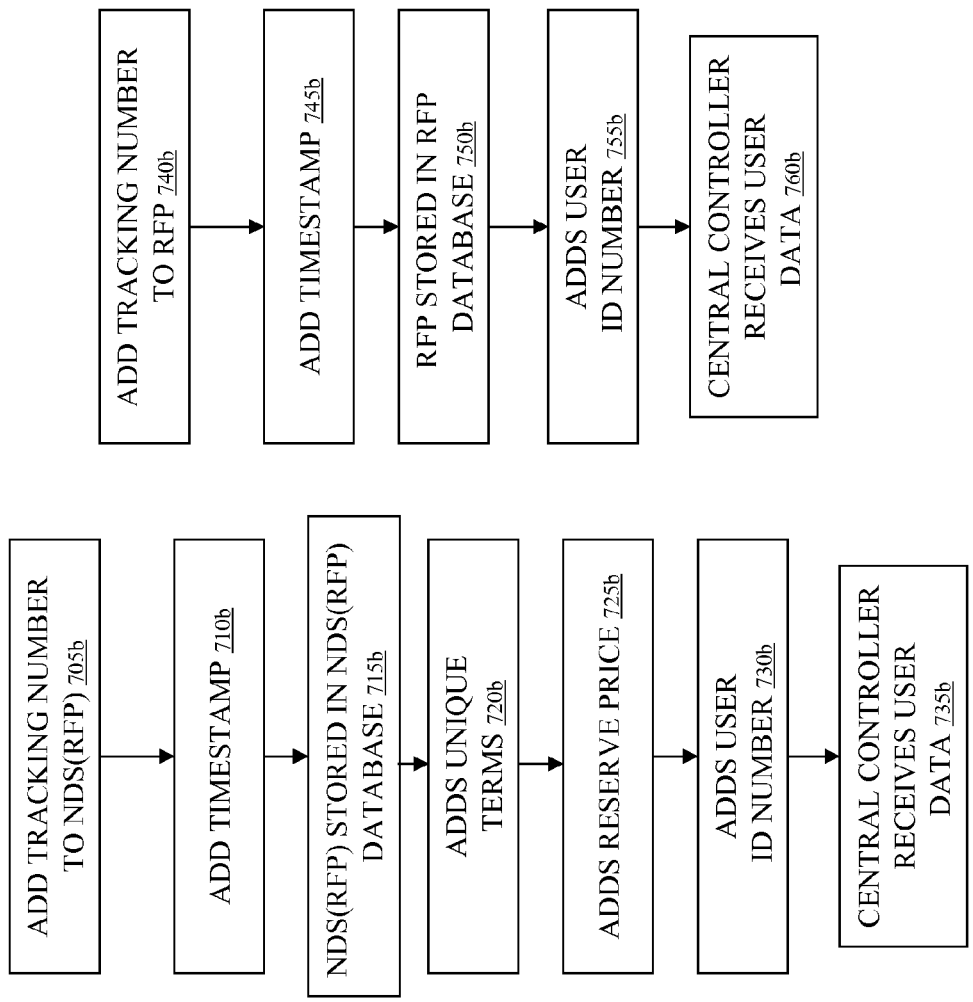
FIG. 7b depicts an embodiment showing the activation of an NDS(RFP).

FIG. 7b illustrates the corresponding user-driven embodiment whereby NDS(RFP) 100b and RFP 130b are activated and made available to potential originators. The process is the same as that described above for the originator-driven system.

Figure 8A:
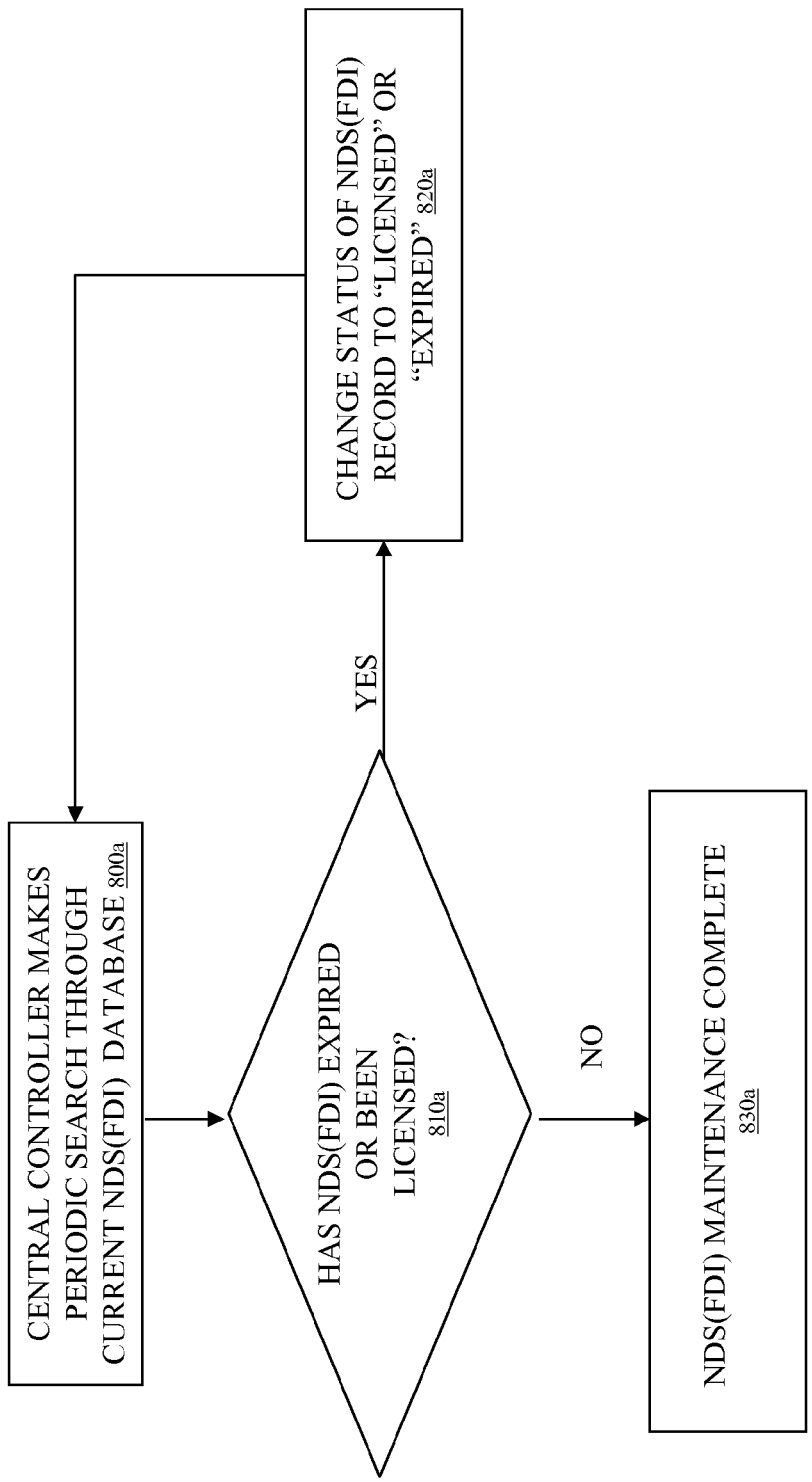
FIG. 8a depicts an embodiment of the maintenance of active NDS(FDI)s.

Referring to FIG. 8a, there is illustrated a procedure for the maintenance of NDS(FDI)s 100a. At step 800a, central controller 200 searches NDS(FDI) database 260. At step 810a, the status field of each NDS(FDI) 100a and corresponding FDI 130a is reviewed and analyzed. If the corresponding FDI 130a has expired, status of corresponding NDS(FDI) 100a is changed to "expired" at step 820a. If the corresponding FDI 130a is currently licensed, status of corresponding NDS(FDI) 100a is changed to "licensed" at step 820a. The process is complete at step 830a when all "active" NDS(FDI)s 100a database records have been examined.

Figure 8B:
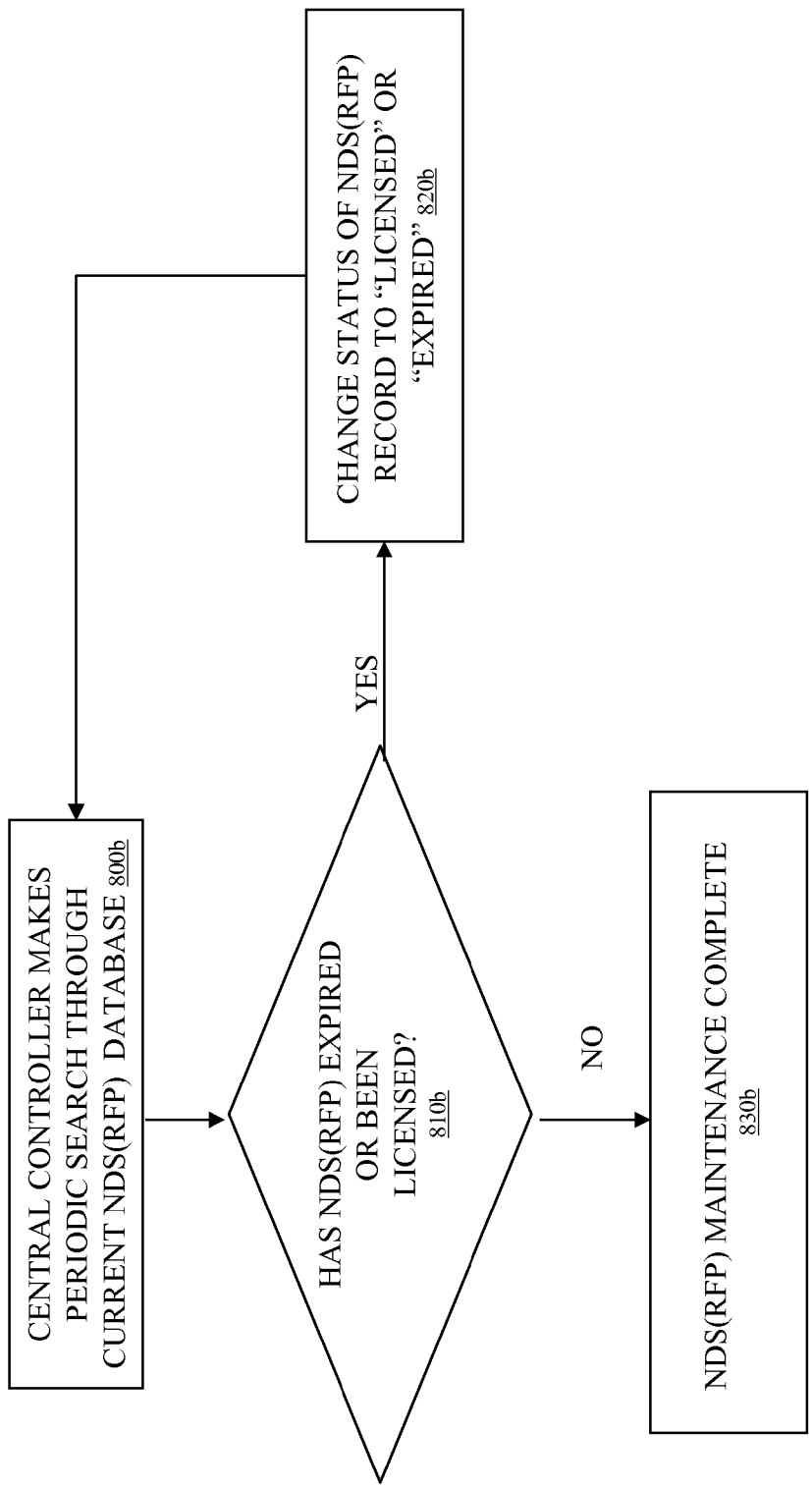
FIG. 8b depicts an embodiment of the maintenance of active NDS(RFP)s.

FIG. 8b illustrates the corresponding user-driven embodiment for maintenance of NDS(RFP)s 100b. The process is the same as that described above for the originator-driven system.

FIG. 9a illustrates the process by which a potential user selects a particular NDS(FDI) 100a corresponding to an FDI 130a to which the user desires access. At step 900a, user logs on to central controller 200 using modem 350 of user interface 300. At step 910a, the potential user selects an appropriate category. For example, a venture capitalist looking for business plans relating to wireless application development companies may search the wireless application business plan category in hopes of finding an NDS(FDI) 100a meeting the venture capitalist's development or investment criteria. Alternatively, a commercially available search engine may be used to retrieve from NDS(FDI) database 260, all NDS(FDI)s 100a meeting the venture capitalist's development or investment criteria. At step 920a, the potential user browses the list of available (i.e., "active") NDS(FDI)s 100a in a particular category or combination of categories. Once the potential user identifies a particular NDS(FDI) 100a which the user feels is relevant, user selects that particular NDS(FDI) 100a at step 930a The potential user is then asked by central controller 200 to agree to the terms of a license agreement at step 935a. The license agreement may be industry specific and/or standardized, in which case the generic terms are stored in the license detail database 264. Originator may make appropriate modifications to the standard terms. In an alternative embodiment, the potential user is allowed to access the corresponding FDI 130a without having to agree to the terms of a license agreement. If the user agrees to the license agreement, the corresponding FDI 130a is transmitted to user at step 940a. In another embodiment, the NDS(FDI) 100a may be transmitted directly to the user via electronic mail, facsimile, telephone, pager, etc.

Figure 9B:
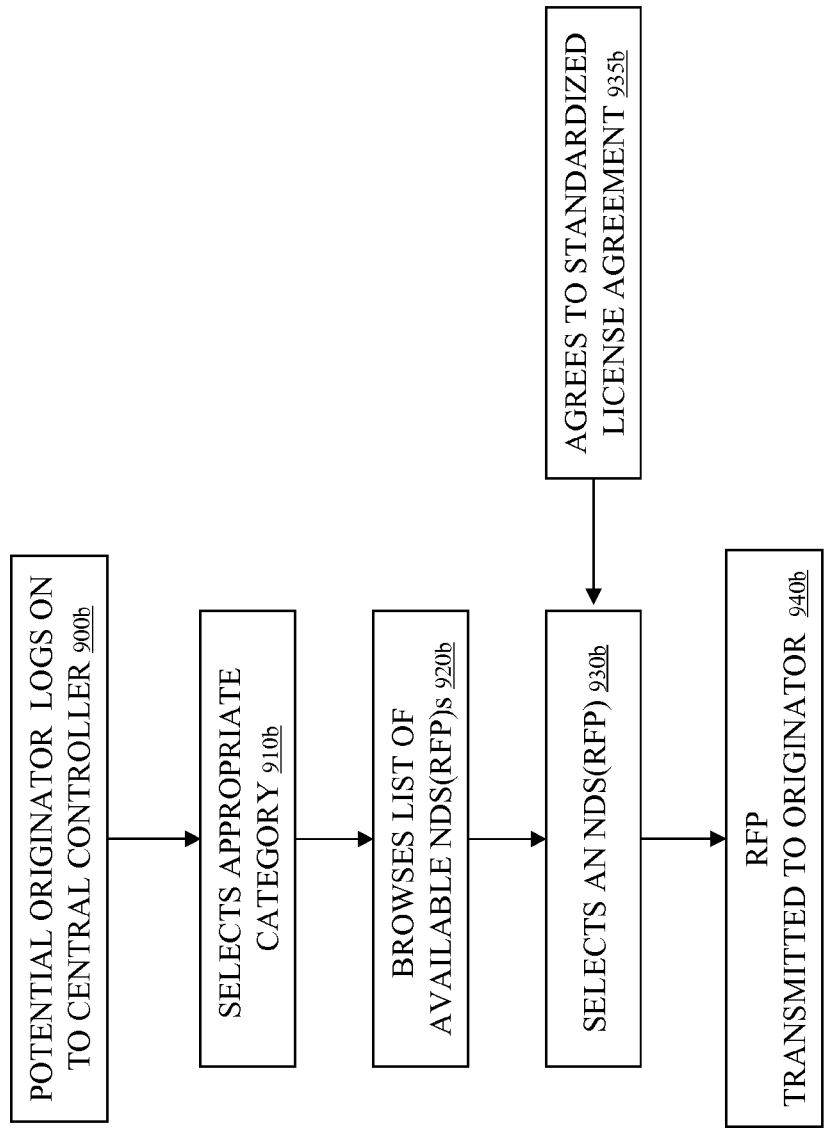
FIG. 9b depicts an embodiment showing an originator selecting an NDS(RFP), accepting the terms of a license agreement and accessing the associated RFP.

FIG. 9b illustrates the user-driven embodiment and the process by which an originator searches for and selects a particular NDS(RFP) 100b corresponding to an RFP 100b to which originator desires access in order to conduct further review. The process is the same as that described above for the originator-driven system.

Figure 10A:
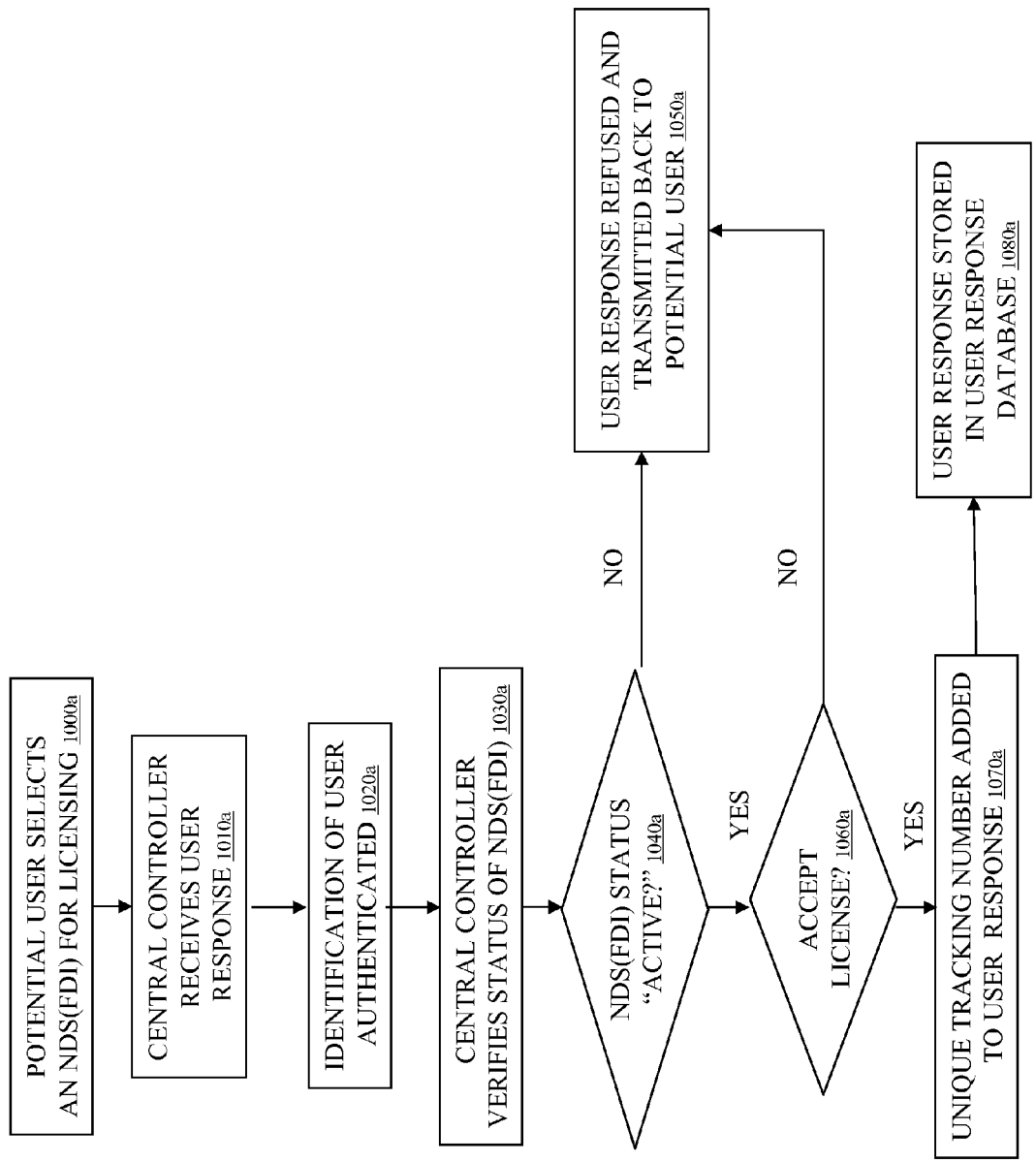
FIGS. 10a and 11a depict an embodiment showing the binding of a user to the license agreement upon selecting an NDS(FDI) for further review as required to access the corresponding FDI.
Figure 1O:
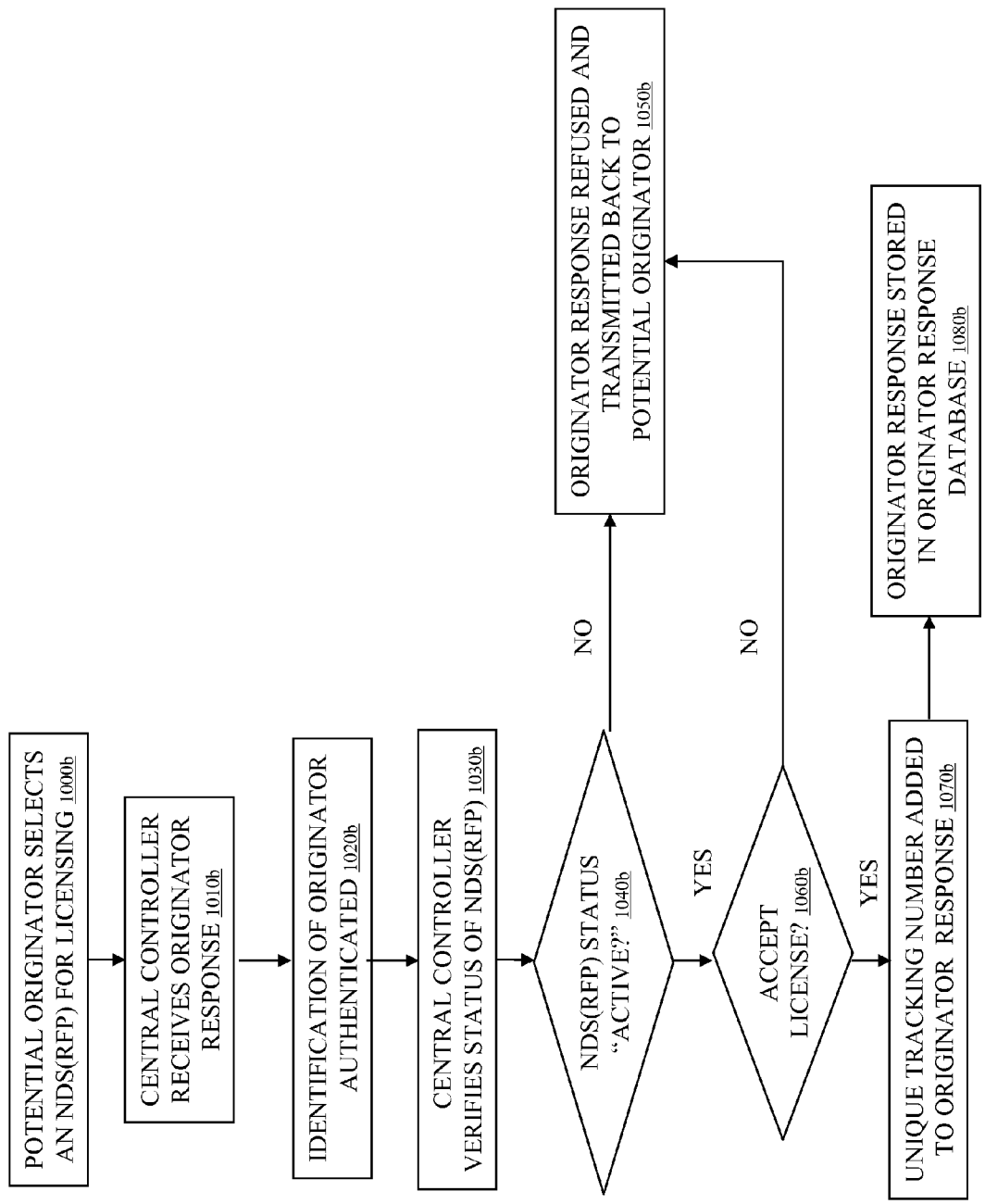
Figure 11A:
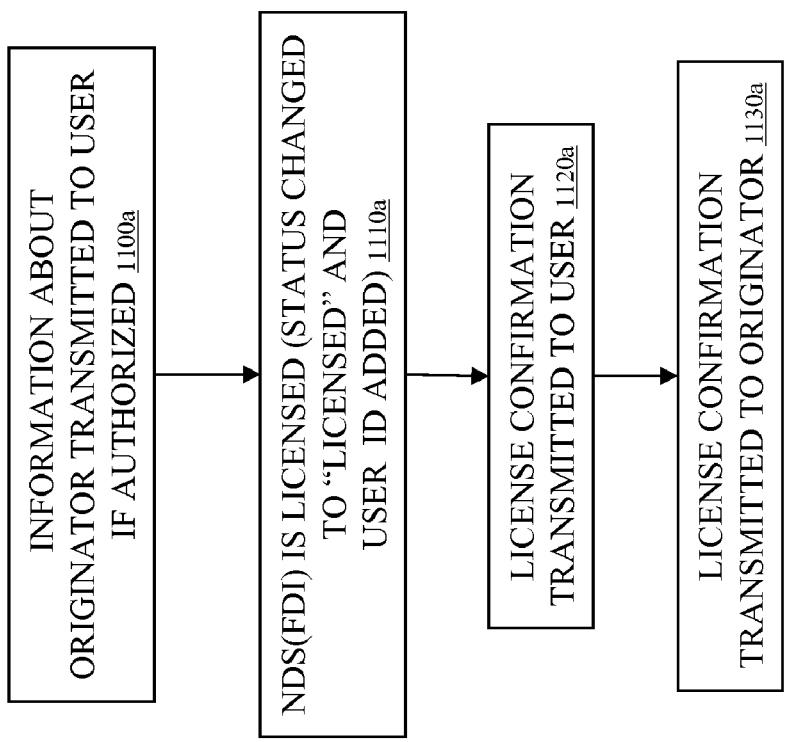

FIGS. 10a and 11a illustrate the process by which NDS (FDI) 100a and the corresponding FDI 130a is licensed by a user. At step 1000a, the potential user selects a particular NDS(FDI) 100a for which user would like to access the corresponding FDI 130a. In the on-line embodiment, user's intention to access the corresponding FDI 130a is communicated to central controller 200 by simply clicking on the desired NDS(FDI) 100a. This action constitutes user's response 110a and the user's identity is authenticated at step 1030a If necessary, timestamp allows central controller 200 to determine the first user desiring to license the corresponding FDI 130a. This is important if the originator of the FDI 130a has indicated that only one user may have access to the FDI 130a at a time.

Authentication of user's identity involves central controller 200 extracting the user ID from user response 110a and looking up user's identity in user database 259. Information in the user database 259 may provide verification that user meets conditions imposed by the originator and the necessary contact information to bind user to the license agreement.

Central controller 200 verifies the status of the NDS(FDI) 100a and corresponding FDI 130a at step 1030a to ensure the NDS(FDI) 100a is "active" and available for licensing. If status of NDS(FDI) 100a is "expired" or "licensed," user response 110a is refused and central controller 200 communicates to user the particular NDS(FDI) 100a and corresponding FDI 130a is not available for access or licensing at step 1050a. If status of NDS(FDI) 100a is "active," user is asked by central controller 200 to agree to the terms of the license agreement at step 1060a. If user does not agree to the license agreement, central controller 200 communicates to user at step 1050a that access to the corresponding FDI 130a is denied. If user agrees to the license agreement at step 1060a, central controller 200 adds a unique tracking number to user's response 110a at step 1070a. Central controller 200 then stores user response 110a in user response database 262 at step 1080a.

In another embodiment, the user transmits user response 110a directly to originator at step 1010a. The originator may then send user response 110a to central controller 200 for verification and authentication, or originator may choose to accept user response 100a without verification and authentication.

FIG. 11a illustrates the process for confirming that the license agreement has been agreed to by the user. If authorized by originator, information about the identity and qualifications of the originator is transmitted to user at step 1100a. At step 1110a, central controller 200 changes status of the NDS(FDI) 100a to "licensed" and user ID, the unique tracking number for the NDS(FDI) 100a and corresponding FDI 130a are added to the license agreement. The complete and binding license agreement is then stored in the license confirmation database 263, and the license confirmation is transmitted to user at step 1120a and to originator at step 1130a. If the originator has so designated, access to the corresponding FDI 130a by subsequent users will be denied.

In another embodiment, the originator may allow multiple users to access an FDI 130a pursuant to a license agreement. In this case, NDS(FDI) 100a may maintain its status of "active" indefinitely or until a certain number of users have responded. For example, an originator may designate that the FDI 130a (e.g., franchise business opportunity) is available for licensing by up to 5 users in a particular geographic region. Once 5 users have licensed the FDI 130a, the status of the corresponding NDS(FDI) 100a is changed to "licensed" or "expired." Another option is to open the FDI 130a to any number of users.

Figure 11B:
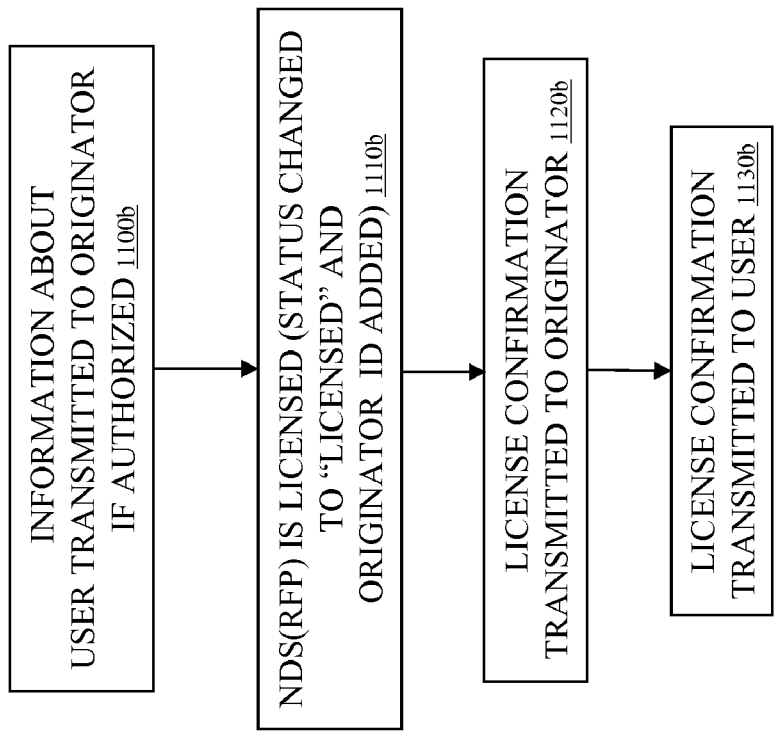

FIGS. 10b and 11b describe the process by which NDS (RFP) 110b and the corresponding RFP 130b are licensed by an originator in the user-driven embodiment of the present invention. The process is the same as that described above for the originator-driven system.

Figure 12A:
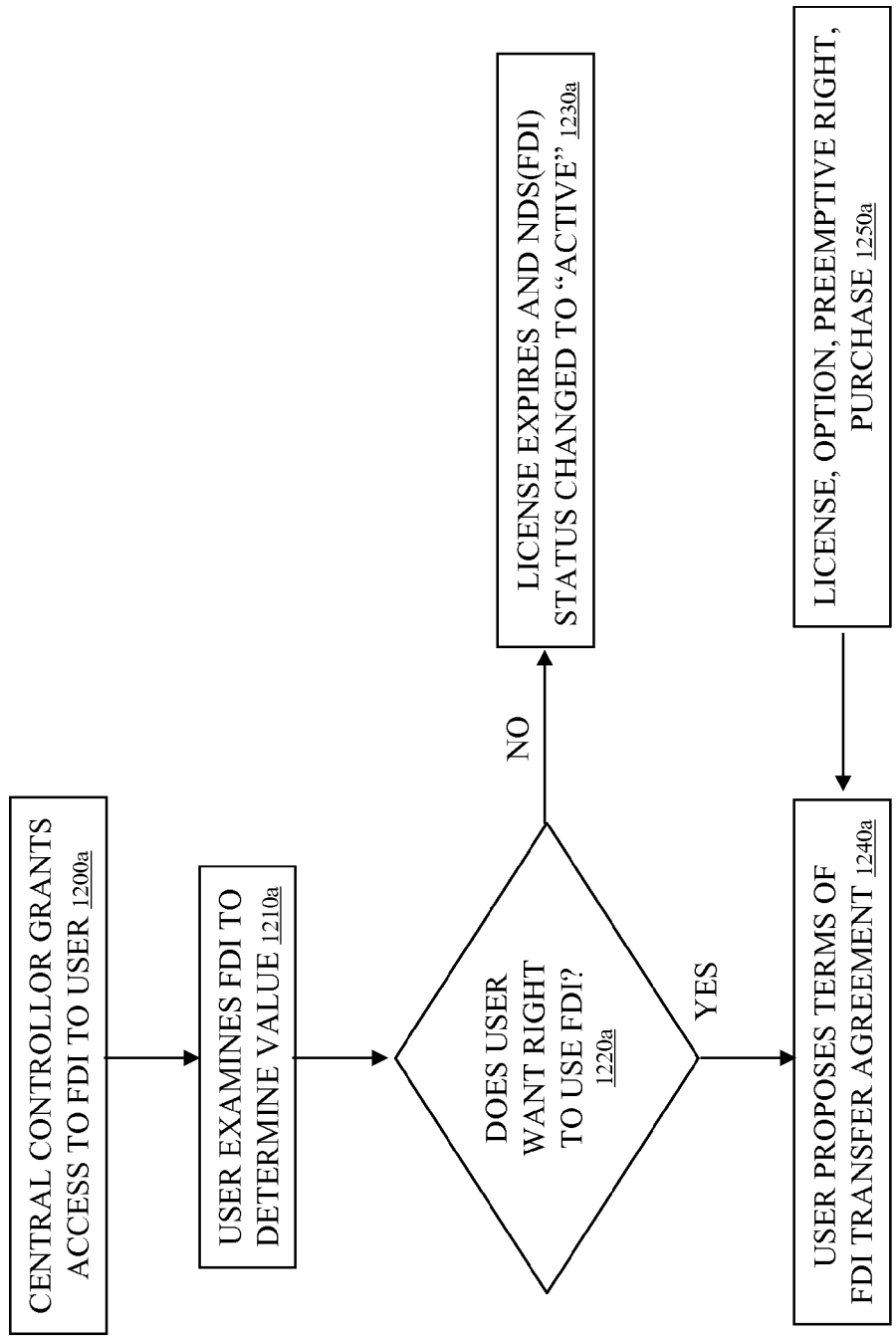
FIG. 12a depicts a procedure for transferring the right to use the FDI to user.

FIG. 12a illustrates the process by which a user communicates user's desire to obtain the right to use the FDI 130a. At step 1200a, central controller 200 grants user access to the FDI 130a for user's review and consideration. User examines FDI 130a at step 1210a to determine the value of the FDI 130a and assess whether or not user desires to obtain rights to use the FDI 130a If user is not interested in obtaining the right to use the FDI 130a, user communicates user's decision to central controller 200 at step 1220a The license agreement, pursuant to which user was granted access to the FDI 130a, expires by its own terms and central controller 200 changes status of NDS(FDI) 100a from "licensed" to "active" at step 1230a. FDI 130a is now available for access and licensing by another potential user. Alternatively, if access to the FDI 130a has not been restricted to one user at a time, user's decision not to obtain the right to use the FDI 130a is communicated to central controller 200 and stored in user response database 262 or communicated directly to originator at step 1230a. If user desires to obtain the right to use the FDI 130a, user's decision is communicated to central controller 200 at step 1220a, and user is asked to communicate proposed terms of FDI transfer agreement to central controller 200 at step 1240a. The FDI transfer agreement may be industry-specific or may contain standardized terms, in which case the generic terms of the FDI transfer agreement are stored in the FDI transfer agreement database 251. User may make appropriate modifications to the standard terms. This process is described under the heading FDI Transfer Agreement Embodiment below with reference to FIGS. 18a and 19a. Alternatively, user may communicate terms of FDI transfer agreement directly to originator at step 1240a.

Figure 12B:
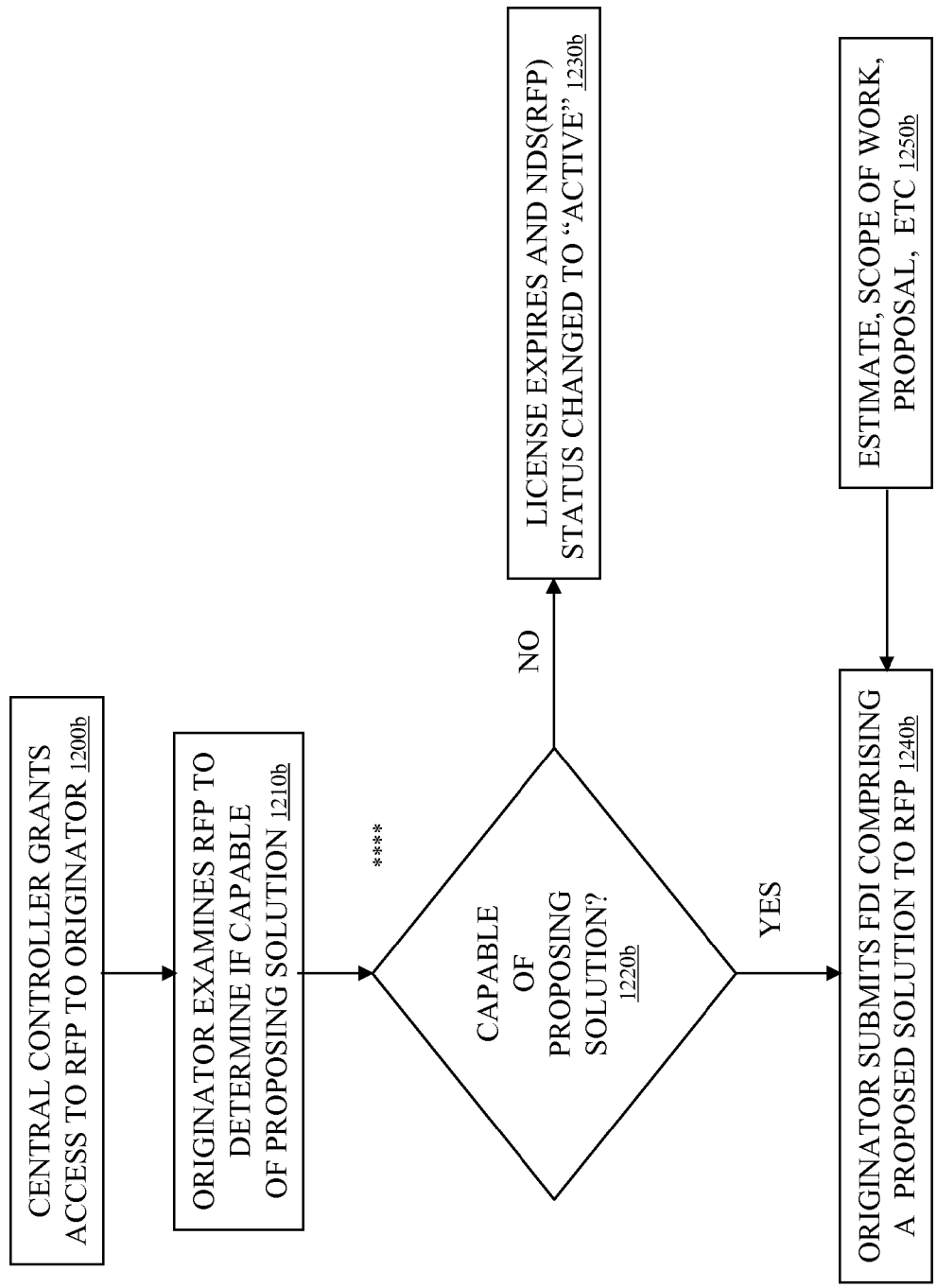
FIG. 12b depicts a procedure for proposing a solution to user's RFP to user.

FIG. 12b illustrates the process by which an originator communicates originator's desire to propose a solution to user's RFP 130b. The process is the same as that described above for the originator-driven system.

Figure 18A:
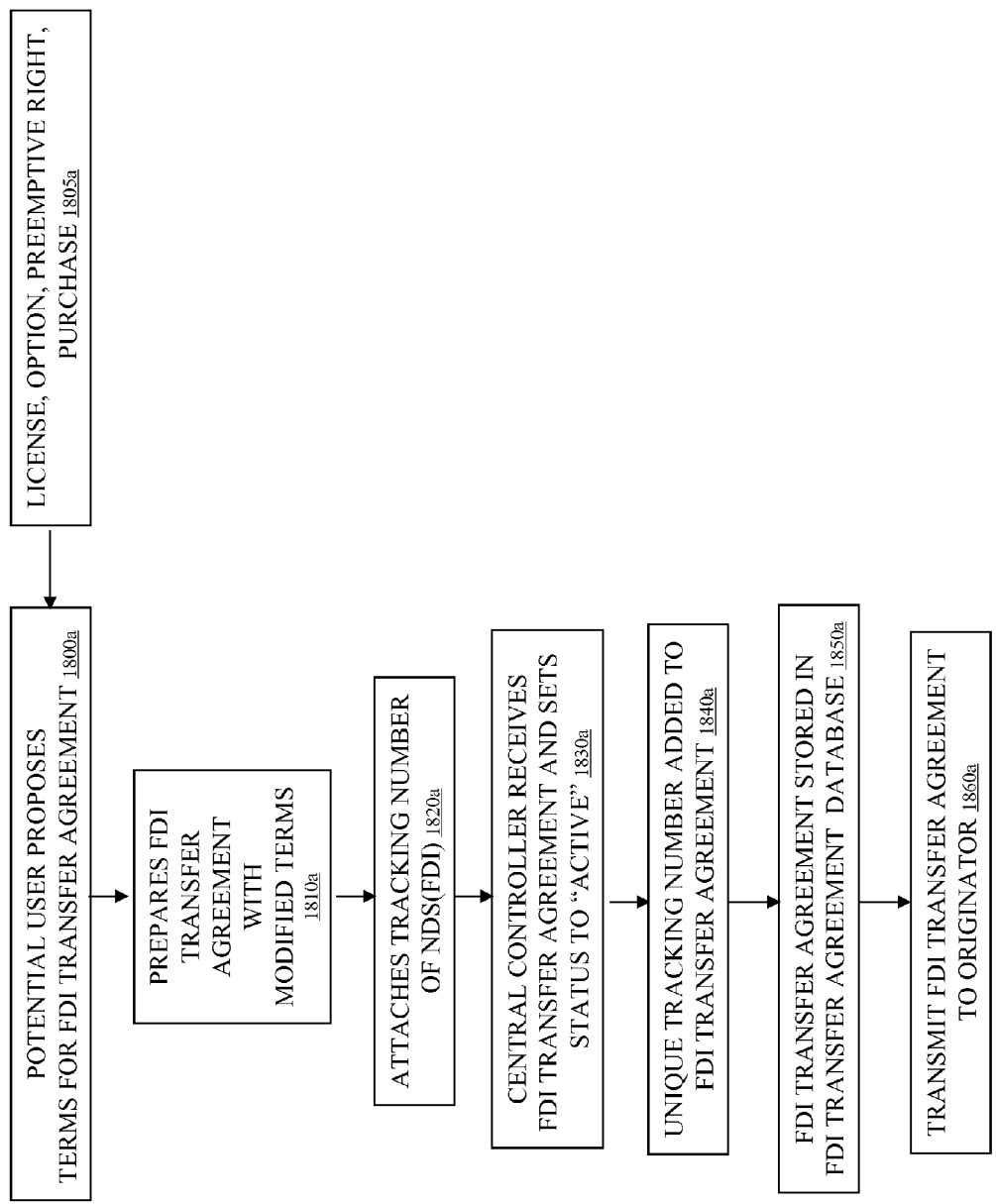
FIGS. 18a and 19 depict an embodiment for proposing terms regarding the transferring of the right to use an FDI to user and for transferring the right to use the FDI to user.
Figure 18B:
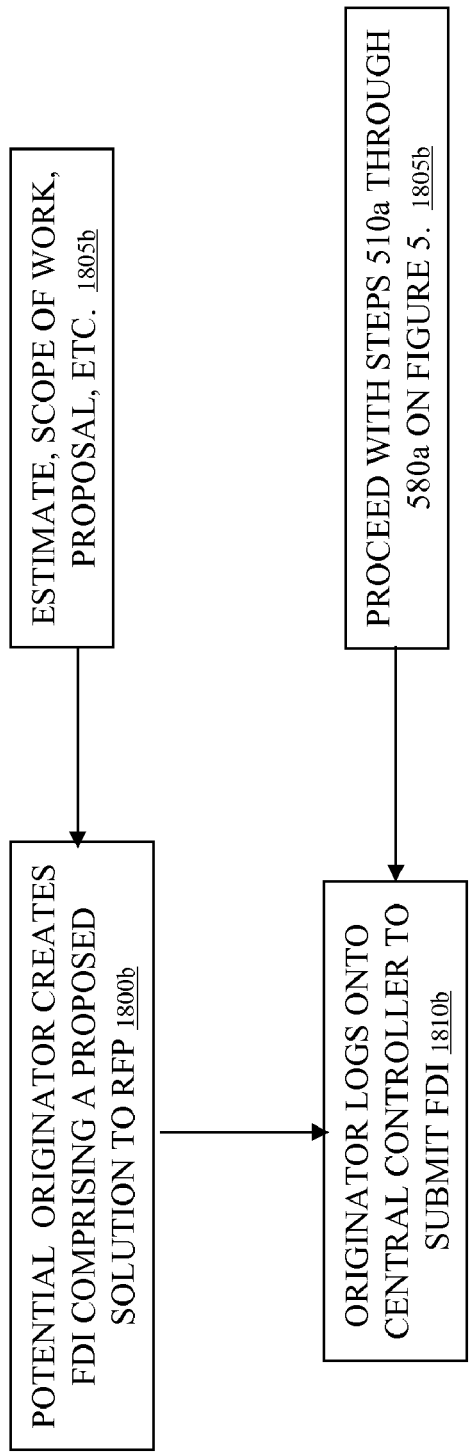
FIG. 18b depicts the method for an originator to submit a proposed solution to user's RFP, which solution comprises an FDI.

FIG. 18b describes the process by which an originator creates an FDI 130a comprising a proposed solution to soliciting user's RFP 130b. At step 1800b, originator creates the FDI 130a, which, as indicated in box 1805b, may be an estimate, scope of work, proposal or solution. At step 1810b, originator logs onto central controller 200 to submit the FDI 130a, which comprises the proposed solution to the soliciting user's RFP 130b. Box 1805b indicates that this process is identical with steps 510a through 580a described in FIG. 5a.

FDI Transfer Agreement Embodiment

In one embodiment of the present invention, users respond to FDI 130a, whether submitted independently or as a proposed solution to user's RFP 130b, by proposing the terms of an offer to option, license, purchase or otherwise transfer the right to use the FDI 130a, by submitting an FDI transfer agreement. The FDI transfer agreement is submitted in a similar manner as the NDS(FDI) 100a, except that FDI transfer agreement is directed to a specified originator, whereas NDS(FDI) 100a may have been directed to a plurality of users.

FIG. 18a depicts the development and submission of an FDI transfer agreement. At step 1800a, the potential user proposes terms for the FDI transfer agreement. As shown in box 1805*a*, potential user may attempt to acquire from originator a license, preemptive right, assignment or other right to use the originator's FDI 130*a*. At step 1810*a*, user prepares FDI transfer agreement with modified terms. At step 1820*a*, user attaches the tracking number of the corresponding FDI 130*a* to FDI transfer agreement. Central controller 200 receives FDI transfer agreement at step 1830*a*, setting the status to "active." Central controller 200 then adds a unique tracking number to FDI transfer agreement at step 1840*a*, and stores it in the FDI transfer agreement database 251 at step 1850*a*. Central controller 200 extracts the tracking number of the corresponding FDI 130a attached to FDI transfer agreement in order to find the originator to whom FDI transfer agreement is transmitted at step 1860*a*.

Figure 19:
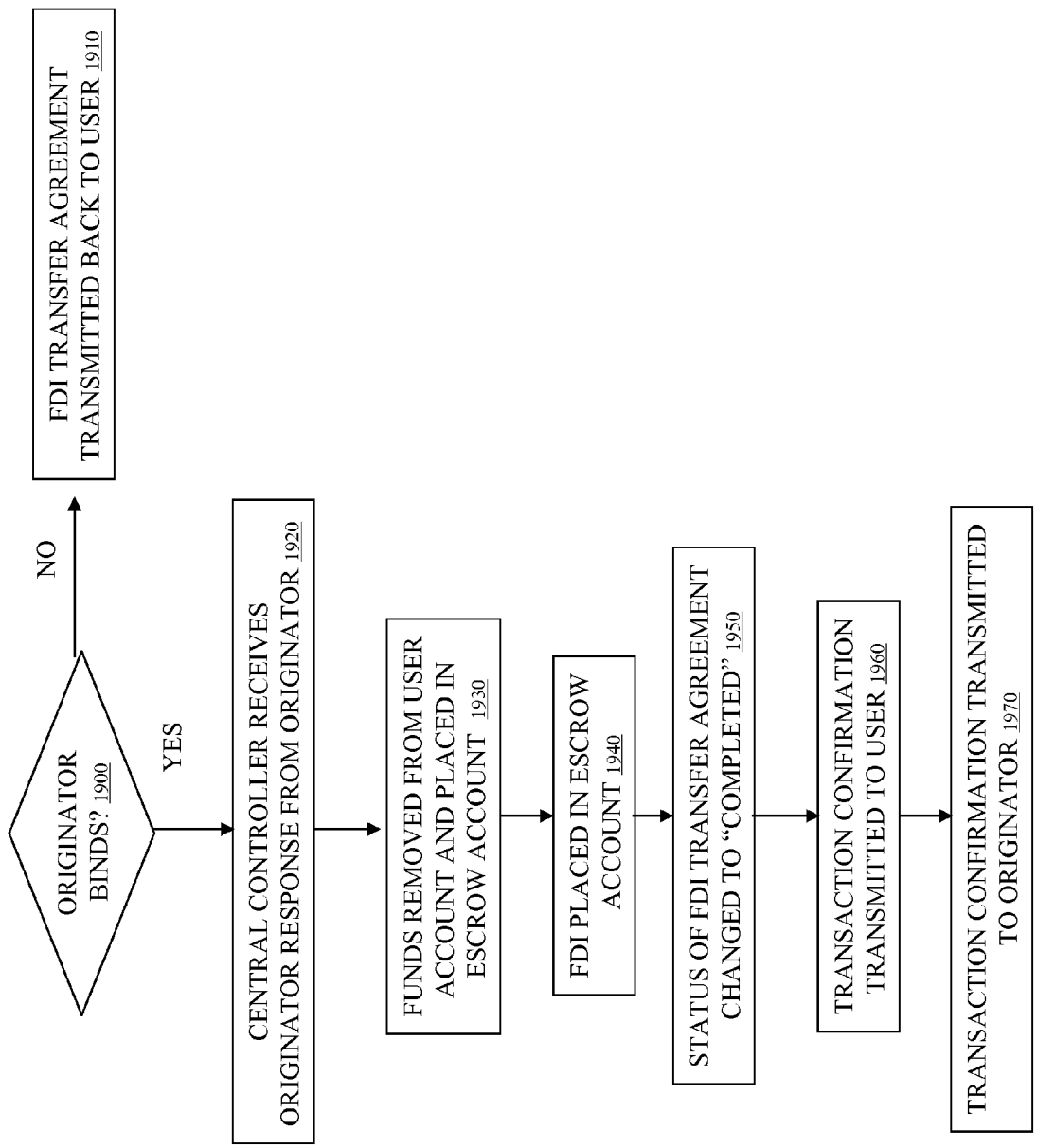

FIG. 19 shows the process by which the originator responds to FDI transfer agreement. At step 1900 originator decides whether to accept the proposed terms of the FDI transfer agreement. If originator does not accept FDI transfer agreement, it is transmitted back to user at step 1910. At this point, originator may proceed with submitting originator's own FDI transfer agreement in the same manner as described above for user. If originator accepts FDI transfer agreement, originator response 110*b* is transmitted to central controller 200 at step 1920. At step 1930, funds are removed, pursuant to the FDI transfer agreement, from user account 268 and placed in originator account 255. Alternatively, funds are removed from user account 268 and placed in escrow account 269 until originator completes transfer of FDI 130*a* to user, at which point funds are placed in originator account 255.

Payment Methods

Figure 13:
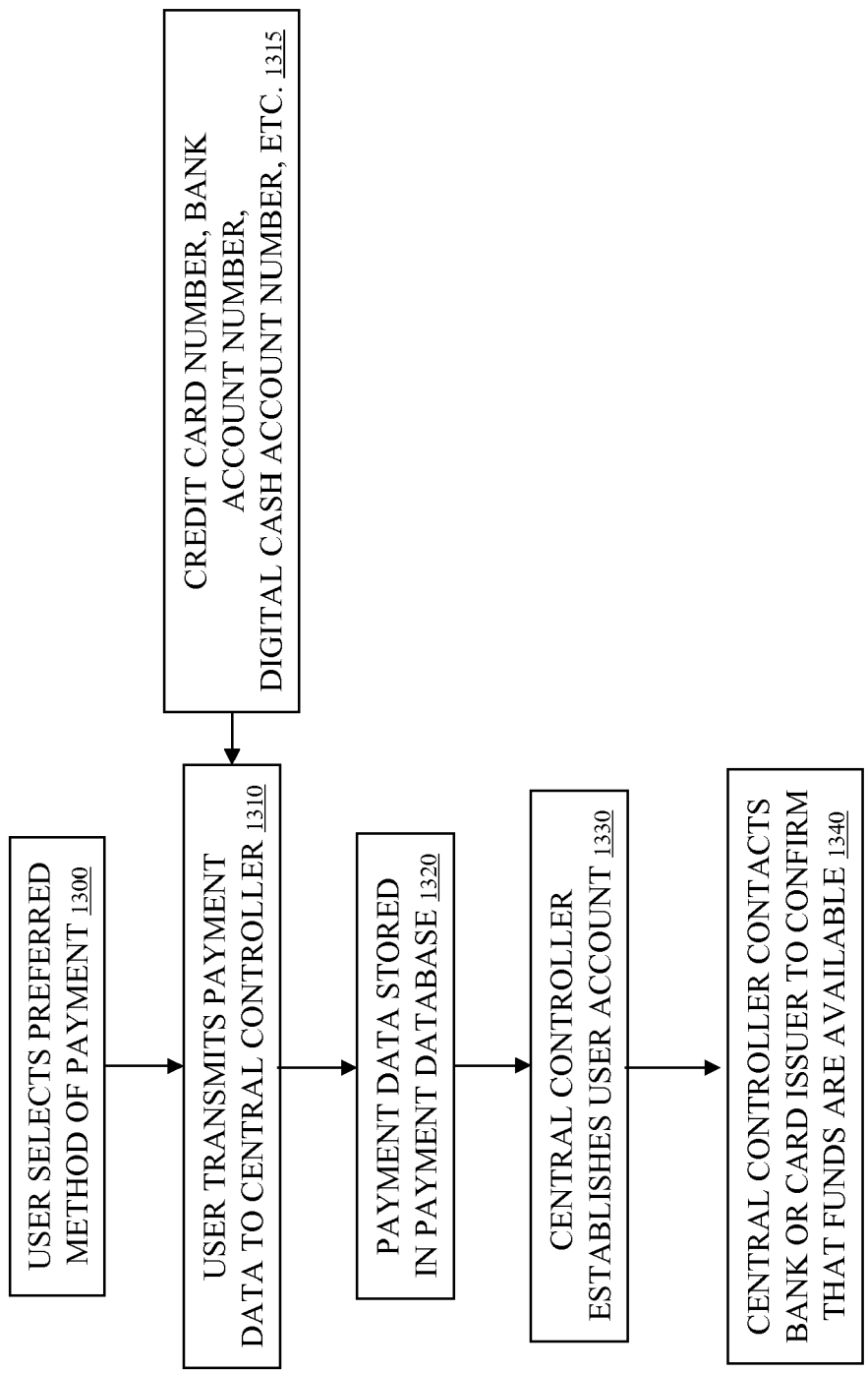
FIG. 13 depicts a payment method.

FIG. 13 illustrates a protocol in which central controller 200 establishes user account 268. At step 1300, user selects a preferred method of payment. Preferred methods might include credit card, personal check, electronic funds transfer, digital cash, etc. User transmits payment data to central controller 200 at step 1310*a*. As indicated in box 1315, such payment data might include credit card account number, bank account number or digital cash account number. These payment methods are meant to be merely illustrative, however, as there are many equivalent payment methods commonly known in the art that may also be used. At step 1320, payment data and payment preferences are stored by central controller 200 in payment database 265. At step 1330, central controller 200 establishes user account 268 which may store money transferred by the user or may serve as pointer to an account of the user outside the system. For users using credit cards, for example, user account 268 contains the credit card number, expiration date, and name of issuing institution. At step 1340, central controller 200 contacts the bank or card issuer to confirm that funds are available.

The above protocols may be similarly applied to originators allowing for creation of originator account 255. The originator account 255 is primarily used for deposits, with money flowing from users to originator. However, in one embodiment originators are required to pay a submission fee in order to post an NDS(FDI) 100*a* and corresponding FDI 130*a*, in which case central controller 200 must establish originator account 255 and receive payment data in the same manner described above for users.

There are many commercially available payment systems that will be known to those skilled in the art. Payment data and transaction confirmation may be processed on-line via the World Wide Web or conventionally via telephone, facsimile, postal mail, electronic mail, etc. Thus, payment data and transaction processing may occur outside of the system if necessary.

Escrow Embodiment

In an alternative embodiment, payment to originator by user may be delayed until the rights to the FDI 130*a* have been adequately transferred to user. Escrow account 269 allows payment to be delayed until originator agrees to the terms of the FDI transfer agreement, which at the same time ensures that user will in fact make payment. Central controller 200 establishes escrow account 269 as a temporary holding account. When originator binds user to FDI transfer agreement at step 1900 and central controller 200 receives originator response at step 1920, funds are removed from user account 268 and placed in escrow account 269 at step 1930. When rights to use FDI 130*a*, or physical embodiment of the FDI 130*a* is transmitted to user and confirmation of transfer is received by central controller 200, funds are transferred from escrow account 269 to originator account 255.

In another embodiment, the FDI transfer agreement may provide for the payment of royalty or installment payment. Central controller 200 may act as a funds clearinghouse for such transactions, so that accurate record of royalty or installment payments are maintained in user account 268 and originator account 255.

Off-line Embodiments

In one embodiment of the present invention, originators and users communicate with central controller 200 in a manner other than electronic mail or web-based server. Conventional communications means, such as telephone, facsimile, postal mail, courier or other means can also be used.

For instance, facsimile, postal mail or courier could be used to deliver a print version of available NDS(FDI)s 100*a* to potential users. Potential users desiring access to a particular FDI 130*a* could then deliver user response 110*a* to central controller 200 via postal mail or courier or deliver user response directly to the originator. Terms of the license could then be delivered to user and license confirmation 120*a* could then be delivered to originator. Originator or central controller 200 would then deliver FDI 130*a* to user pursuant to terms of the license agreement. Alternatively, any combination of the mentioned methods of communication could be used, including digitization of written material and subsequent posting of such content on the World Wide Web in the manner described for the on-line embodiment.

Cryptographic Authentication Embodiment

In the previous embodiments, authentication of originator and user involves checking the attached ID number or name and comparing it with those stored in originator database 257 and user database 259. As one skilled in the art will recognize, commercially available cryptographic protocols may be used to enhance security and ensure authentication of originator and user. These protocols can be used in connection with the on-line embodiment to ensure communications between user or originator and central controller 200 have not been interrupted and to verify their integrity. This is particularly important when dealing with FDIs 130*a* or RFPs 130*b* that constitute confidential information. The practice of using cryptographic assurance methods to ensure authenticity of senders as well as the integrity of messages is well known in the art and need not be described here in detail.

Figure 14A:
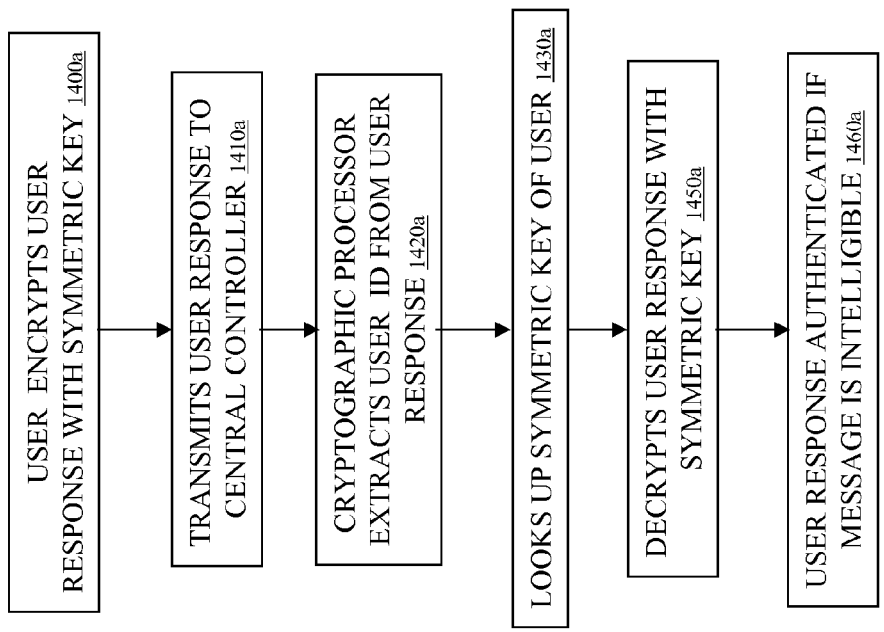

FIG. 14*a* describes a symmetric key embodiment in which the user and central controller 200 share a key. Both encryption and decryption of user response 10*a* are performed with the same key. User encrypts user response 100*a* with user's assigned symmetric key at step 1400*a*, using cryptographic processor 310 of user interface 300. The key may be stored in message database 370 or otherwise stored or memorized by user. The encrypted user response 110*a* is then transmitted to cryptographic processor 210 of central controller 200 at step 1410a. Cryptographic processor 210 extracts user ID from user response 110a at step 1420a and looks up symmetric key of user in cryptographic key database 266 at step 1430a, decrypting user response 110a with this key at step 1450a. Cryptographic key database 266 contains algorithms and keys for encrypting and decrypting and/or authenticating messages. At step 1460a, if the resulting message is intelligible, then it must have been encrypted using the same key, authenticating that the user must have been the author of the user response 110a.

Figure 14B:
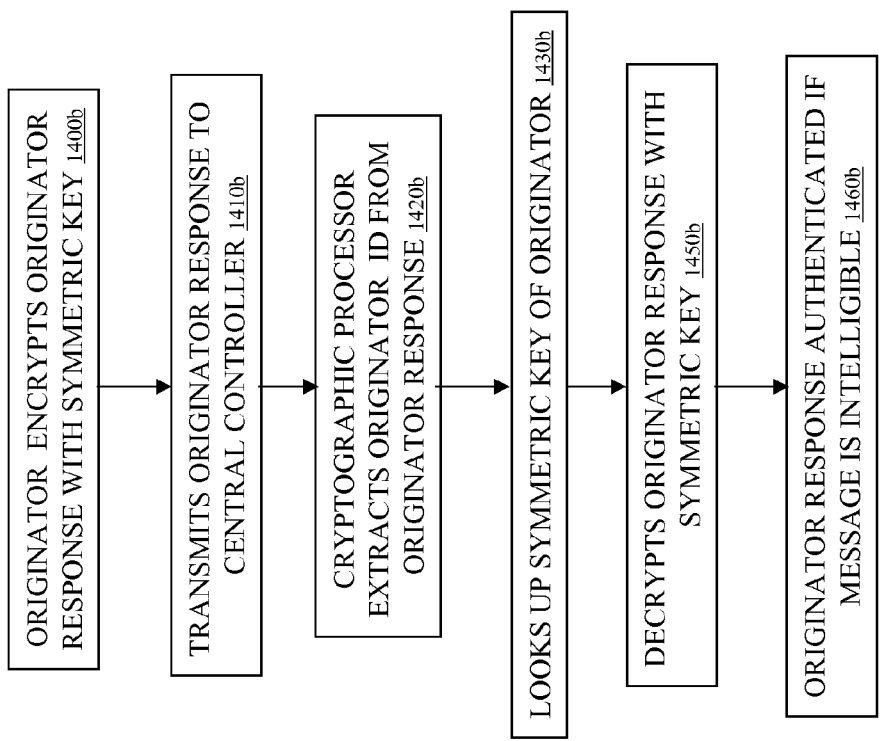

FIG. 14b describes the corresponding symmetric key embodiment as used in the user-driven embodiment of the invention. The process is the same as that described above for the originator-driven system.

Figure 15A:
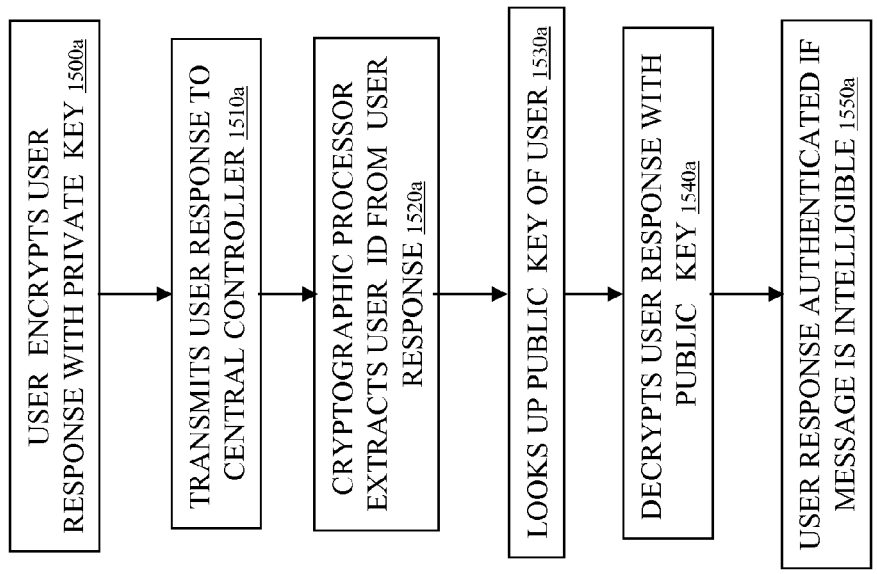

FIG. 15a describes an asymmetric key embodiment in which user response 110a is encrypted with a private key and decrypted with a public key. At step 1500a, user encrypts user response 110a with user's private key using cryptographic processor 310, transmitting user response 110a to central controller 200 at step 15110a. Cryptographic processor 210 extracts the user ID at step 1520a and looks up the user's associated public key in cryptographic key database 266 at step 1530a, decrypting user response 110a with this public key at step 1540a. As before, if user response 100a is intelligible then central controller 200 has authenticated the user at step 1550a.

Figure 15B:
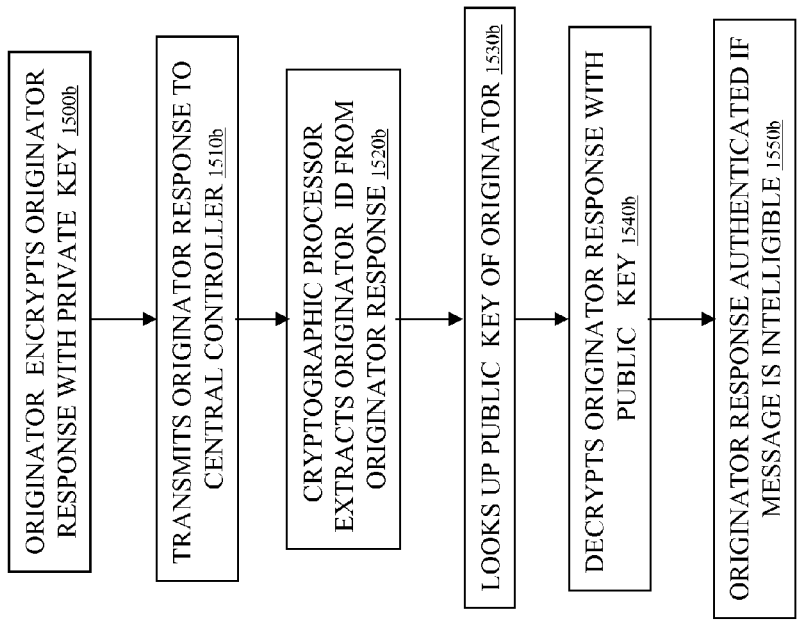

FIG. 15b describes the corresponding asymmetric key embodiment as used in the user-driven embodiment of the invention. The process is the same as that described above for the originator-driven system.

Figure 16A:
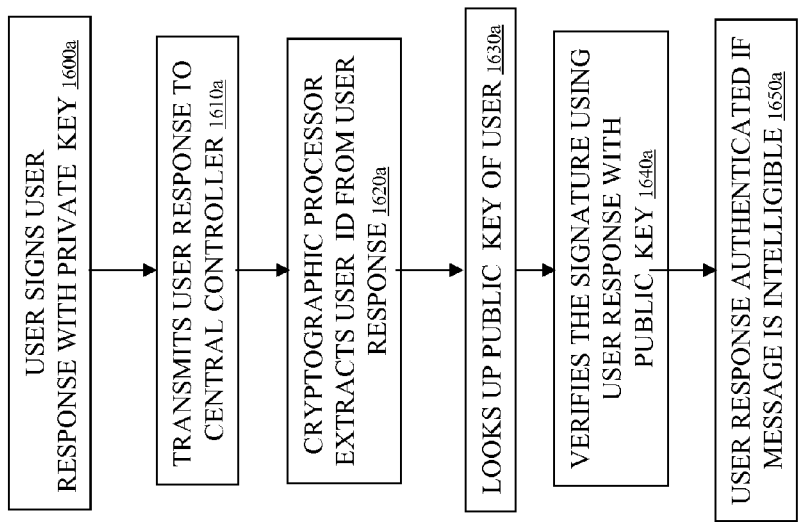

FIG. 16a shows a cryptographic technique using digital signatures to provide authentication and message integrity. As in the asymmetric protocol described above, each user has an associated public and private key. The user sings user response 110a with user's private key at step 1600a using cryptographic processor 310 and transmits user response 110a to central controller 200 at step 1610a. Central controller 200 cryptographic processor 210 extracts the user ID at step 1620a and looks up user's public key at step 1630a, verifying the signature using user's response 110a and the public key of user at step 1640a. If user response 110a is intelligible, then central controller 200 accepts user response 110a as authenticated at step 1650a.

Figure 16B:
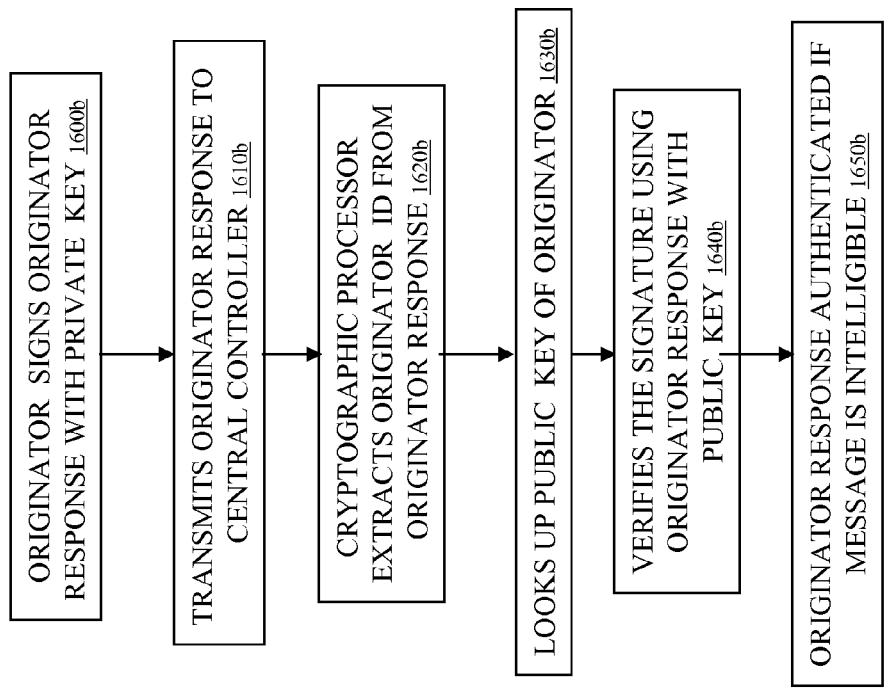

FIG. 16b describes the corresponding digital signature embodiment as used in the user-driven embodiment of the invention. The process is the same as that described above for the originator-driven system.

Figure 17A:
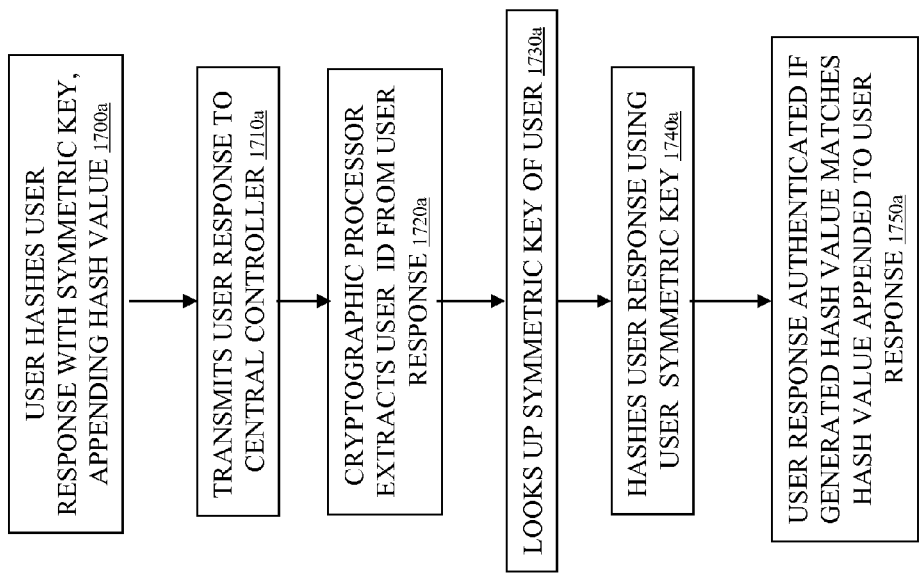

FIG. 17a describes a cryptographic technique using message authentication codes for verifying the authenticity and integrity of user response 110a. User and central controller 200 share a symmetric key, which user includes in a hash of user response 110a at step 1700a. In the hash protocol, a one-way function is applied to the digital representation of the user response 110a, generating a code that acts much like a fingerprint of user's response 110a. After transmitting user response 110a to central controller 200 at step 1710a, cryptographic processor 210 extracts user ID from user response 110a at step 1720a. Cryptographic processor 210 looks up user's symmetric key at step 1730a and hashes user response 110a with this symmetric key at step 1740a, comparing the resulting hash value with the hash value attached to user's response 110a. If the values match at step 1750a, the integrity of user response 10a is verified along with the authenticity of the user.

Figure 17B:
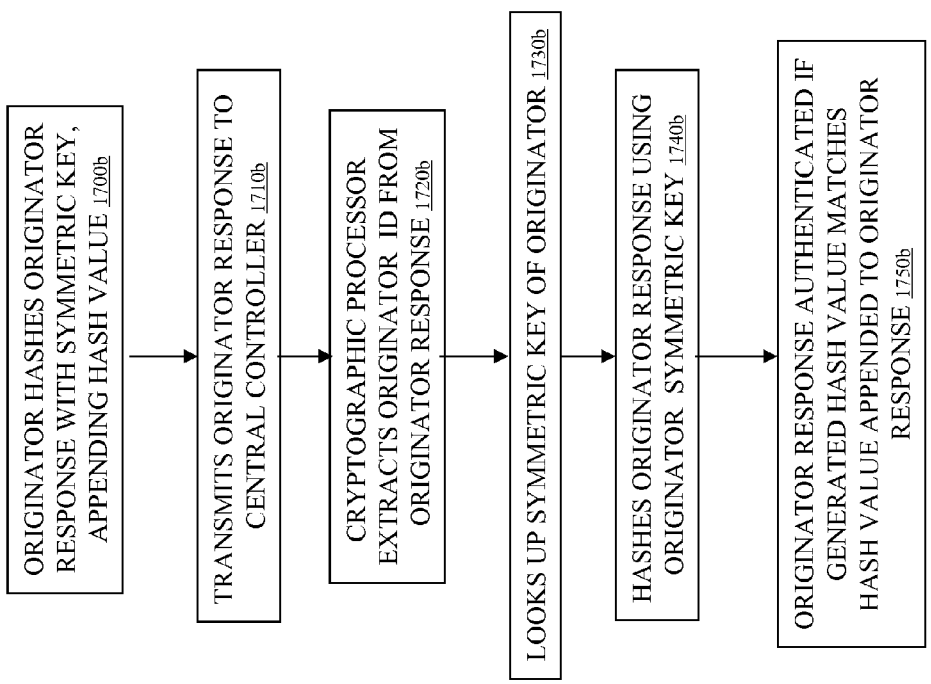

FIG. 17b describes the corresponding cryptographic technique as used in the user-driven embodiment of the invention. The process is the same as that described above for the originator-driven system.

Biometric Devices

Additional security can be built into the system by using biometric devices such as fingerprint reader, voice recognition system, retinal scanner, facial recognition system and the like. These incorporate a physical attribute into the user response 10a, which is then compared with the value stored in user database 259. Such biometric devices 355 may attach to user interface 300. Many such biometric devices 355 are commercially available and the use of such biometric devices to ensure authenticity of senders is well know in the art and need not be described in detail herein.

For example, using a fingerprint reader, user places user's finger on a lens and the resulting image is scanned, digitized, and the data is stored in memory. Each live-scan fingerprint is compared to the previously stored template, stored in data storage device 360. If the prints do not match, cryptographic processor 310 may prevent user from generating a user response 110a.

The cryptographic and biometric protocols described above may be applied to all communications between originator or user and central controller 200, including NDS(FDI)s 100a and NDS(RFP)s 110b, FDIs 130a and RFPS 130b, user response 110a, originator response 210a, FDI transfer agreement, license confirmation 120a and 120b, etc.

Anonymous Transactions Embodiment

As described herein, the present invention provides for the anonymity of both users and originators if desired. Anonymity is accomplished by eliminating all references to the names of the individuals or entities involved in all transactions. An originator, for example, would add originator's ID to an NDS (FDI) 100a or FDI 130a rather than adding originator's name, preventing a user browsing NDS(FDI)s 100a from discovering originator's identity. This may be desirable if originator is a screenwriter, for instance, with a negative credit in his portfolio. The FDI 130a would be purchased, licensed or whatever by the-user based entirely on the merit of the FDI 130a and not the originator's experience or qualifications. In a similar manner, users may wish to keep their identity anonymous. A venture capitalist may not want the originator of a business opportunity to know the identity of the venture capitalist because such knowledge would allow the originator to assess previous investments of the venture capitalist or discover the typical dollar amount invested by the venture capitalist.

In the user-driven embodiment, a user may wish to submit an RFP 130b anonymously so that originators with possible solutions can not disclose who has a particular need, which information could signal trouble to the investment community or signal weakness to a competitor. Similarly, an originator may wish to remain anonymous. A screenwriter with a bad credit may wish to propose a screenplay for development by a user that has posted an RFP 130b. The screenwriter would prefer to have the proposed FDI 130a be considered on the merit of the screenplay, not his or her one bad credit.

Many methods for ensuring anonymity will be obvious to those skilled in the art and need not be described herein. To enhance security, user and originator IDs may be encrypted with the public key of central controller 200 to prevent unauthorized use.

Figure 20:
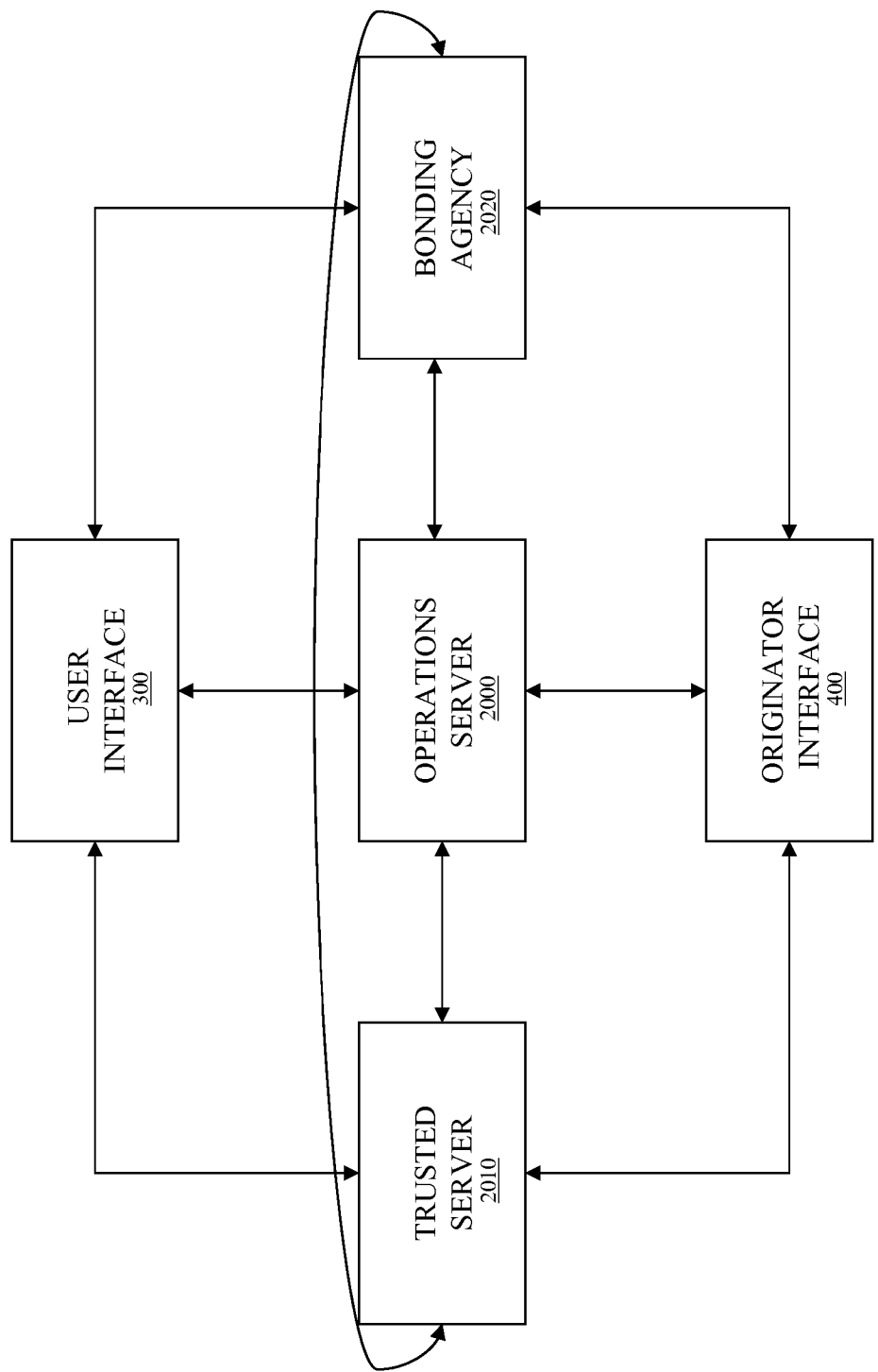
FIG. 20 depicts an embodiment showing the use of a trusted server and a bonding agency.

In one embodiment of the present invention, central controller 200 is separated into three distinct elements: operations server 2000, trusted server 2010 and bonding agency 2020. Each server performs a distinct task in the process of managing NDS(FDI) 100a, FDI 130a, NDS(RFP) 100b, RFP 130b, and other tasks. The separation makes it more difficult for attackers to compromise the system. As indicated in FIG. 20, these servers work in conjunction with user interface 300 and originator interface 400. Operations server 2000 has the task of posting NDS(FDI)s 100a or NDS(RFP)s 100b, and accepts all transactions previously authenticated by trusted server 2010. Trusted server 2010 authenticates the identity of users and originators, while bonding agency 2020 verifies the ability of users to pay and the ability of originators to deliver the FDI 130a or the rights to use the FDI 130a. There are many network configurations and software applications commercially available to manage the trusted server embodiment described herein. It will be obvious to one skilled in the art that each server type may be distributed over a number of servers.

Barter Embodiments

Not all transactions require the transfer of money from user to originator. In a barter transaction, the user may propose in the FDI transfer agreement to swap equity in user's entity or a new entity instead of cash. For instance, if user is a venture capitalist, user may propose establishing a company to exploit the business opportunity represented by originator's FDI 130a. Alternatively, a user may propose to employ originator or to perform services in exchange for the right to use originators FDI 130a.

Arbitration Protocols

The previous embodiments have described the transfer of an FDI 130a, RFP 130b or execution of an FDI transfer agreement as the end of the process. In light of the fact that the present invention deals with ideas and confidential information, disputes are inevitable. Disputes regarding misappropriation of trade secrets will be reduced when utilizing the present invention as all communications and transactions are stored in respective databases and electronic records of all such activities could be produced to help resolve disputes early on. The present invention can support dispute resolution in two ways.

First, provisions can be part of the submission and license agreements requiring that both originator and user submit to binding arbitration of all disputes, helping avoid more costly and time-consuming legal proceedings. A liquidated damages provision may also be included in the submission and license agreements to bring certainty to each party's potential exposure.

Second, central controller 200 or a third-party may be designated as arbiter for each dispute. Such disputes can be resolved utilizing on-line arbitration provided by companies such as clicknsettle.com. Most misappropriation claims will be resolved on the basis of proof of independent creation or an independent source. Such disputes are particularly suited for on-line arbitration because proof is often in the form of documentary evidence rather than witness testimony. The time and date of access to an FDI 130a by an identifiable user or access to an RFP 130b by an identifiable originator is maintained by central controller 200 and is easily reproducible for use in the arbitration process. Proof of an independent source would be particularly easy to prove if the transaction occurred using the present invention because a record of that transaction would likewise be easily reproducible. Proof of independent creation, such as copyright filings or research notes, could be communicated to central controller 200 or all transaction data could be sent to the third party arbiter outside the system.

Revenue Generation

The providers of the systems may derive revenue from originators and users in a number of ways. In one embodiment, a percentage-based commission is charged on every innovation transfer transaction consummated via the system. In another embodiment, originators pay a per-submission fee, or are charged a flat fee for any number of FDIs submitted over a given period. In another embodiment, users are charged an access fee per FDI accessed, or are charged a flat fee for any number of FDIs accessed in a given period of time. In another embodiment, users pay the provider a license fee in exchange for the right to use the present invention for exclusive submissions. In another embodiment, advertisers pay to have messages displayed to originators and users alike.

In another embodiment, content providers pay to provide relevant information to originators and users alike. Alternatively, the method and apparatus of the present invention may be employed without a payment feature.

Applications of the Invention

In order to clarify the application of the present invention, the following examples demonstrate potential needs of originators and users and demonstrate the originator-driven component of the present invention:

FDI: Motion Picture Screenplay

An originator desires to submit an original screenplay to a potential user (i.e., movie studio) for review and consideration. The originator logs onto a web site (e.g., central controller 200) and inputs identifying information and qualifications, attaches a text file comprising the fully disclosed complete screenplay, creates a nondisclosing synopsis of the screenplay, and clicks on the "submit" icon available on the web site. The originator is then asked by the system to agree to the terms of a submission agreement. Originator agrees to the terms of the submission agreement and the fully disclosed screenplay is stored in a secure database. The nondisclosing synopsis is made available to the user via the World Wide Web (WWW). If the user is interested in reviewing the entire screenplay, user clicks on the "access" icon. The user is then asked by the system to agree to the terms of a license agreement granting the user the right to review and consider the originator's screenplay. If user agrees, user is granted access to the entire screenplay for consideration pursuant to the terms of the on-line license agreement. If user is interested in further analysis and/or in purchasing the screenplay for production, user pays a negotiated sum for the rights desired.

FDI: Business Opportunity

An originator desires to submit, confidentially (i.e., pursuant to a confidentiality and nondisclosure agreement) or non-confidentially (i.e., no confidentiality and nondisclosure agreement), a business plan, executive summary or business concept to a potential user (i.e., individual or entity interested in reviewing business concepts) (e.g., venture capitalist, angel investor, strategic partner, etc.) for review and consideration. The originator logs onto a web site (e.g., central controller 200) and inputs identifying information and qualifications, attaches a text file, inputs free-form text, and/or uploads an audio or video file comprising the fully disclosed complete business plan, creates a nondisclosing synopsis of the business plan, and clicks the "submit" icon available on the web site. The originator is then asked by the system to agree to the terms of a submission agreement. Originator agrees to the terms of the submission agreement and the fully disclosed business plan is stored in a secure database. The nondisclosing synopsis is made available to an intended and identifiable user, or to a plurality of potential users, via the World Wide Web. A user may scroll through nondisclosing synopses of available business plans by category or may utilize the system's search engine to identify and rank relevant nondisclosing synopses of available business plans. If a user is interested in reviewing the entire business plan, user clicks on the "access" icon for the corresponding nondisclosing synopsis. The user is then asked by the system to agree to the terms of a license agreement granting the user the right to review and consider the originator's business plan. The license may be exclusive or nonexclusive as determined by the submitting originator. If user agrees, user is granted access to the entire business plan for consideration pursuant to the terms of the on-line license agreement. If user is interested in further analysis and/or in providing funding to the submitting originator, user contacts originator to negotiate the terms of the deal (e.g., financing, joint venture, partnership, etc.).

FDI: Application Software

An originator desires to submit, confidentially (i.e., pursuant to a confidentiality and nondisclosure agreement) or nonconfidentially (i.e., no confidentiality and nondisclosure agreement), a specification for a new software application ("spec") to a potential user (i.e., individual or entity looking for new software applications) (e.g., software or other technology company, university, venture capitalist, entrepreneur, etc.) for review and consideration. The originator logs onto a web site (e.g., central controller 200) and inputs identifying information and qualifications, attaches a text file, inputs free-form text, and/or uploads the software program comprising the fully disclosed complete spec, creates a nondisclosing synopsis of the spec, and clicks the "submit" icon available on the web site. The originator is then asked by the system to agree to the terms of a submission agreement. Originator agrees to the terms of the submission agreement and the fully disclosed spec is stored in a secure database. The nondisclosing synopsis is made available to an intended and identifiable user, or to a plurality of potential users, via the World Wide Web. A user may scroll through nondisclosing synopses of available specs by category or may utilize the system's search engine to identify and rank relevant nondisclosing synopses of available specs. If a user is interested in reviewing the entire spec, the user clicks on the "access" icon for the corresponding nondisclosing synopsis. The user is then asked by the system to agree to the terms of a license agreement granting the user the right to review and consider the originator's spec. The license may be exclusive or nonexclusive as determined by the submitting originator. If user agrees, user is granted access to the entire spec for consideration pursuant to the terms of the on-line license agreement. If user is interested in further analysis and/or in purchasing or otherwise acquiring the rights to the spec, user contacts originator to negotiate the terms of the deal (e.g., license, purchase, development, etc.).

FDI: Book Manuscript

An originator desires to submit, confidentially (i.e., pursuant to a confidentiality and nondisclosure agreement) or nonconfidentially (i.e., no confidentiality and nondisclosure agreement), a book manuscript to a potential user (i.e., individual or entity looking for new book manuscripts) (e.g., publisher, university, literary agent, movie studio, etc.) for review and consideration. The originator logs onto a web site (e.g., central controller 200) and inputs identifying information and qualifications, attaches a text file or inputs free-form text comprising the fully disclosed complete book manuscript, creates a nondisclosing synopsis of the book manuscript, and clicks the "submit" icon available on the web site. The originator is then asked by the system to agree to the terms of a submission agreement. Originator agrees to the terms of the submission agreement and the fully disclosed book manuscript is stored in a secure database. The nondisclosing synopsis is made available to an intended and identifiable user, or to a plurality of potential users, via the World Wide Web. A user may scroll through nondisclosing synopses of available book manuscripts by category or may uitilize the system's search engine to identify and rank relevant nondisclosing synopses of available book manuscripts. If a user is interested in reviewing the entire book manuscript, the user clicks on the "access" icon for the corresponding nondisclosing synopsis. The user is then asked by the system to agree to the terms of a license agreement granting the user the right to review and consider the originator's book manuscript. The license may be exclusive or nonexclusive as determined by the submitting originator. If user agrees, user is granted access to the entire book manuscript for consideration pursuant to the terms of the on-line license agreement. If user is interested in further analysis and/or in purchasing or otherwise acquiring the rights to the book manuscript, user contacts originator to negotiate the terms of the deal (e.g., publishing agreement, option, license, purchase, development, etc.).

FDI: Musical Composition

An originator desires to submit, confidentially (i.e., pursuant to a confidentiality and nondisclosure agreement) or nonconfidentially (i.e., no confidentiality and nondisclosure agreement), a musical composition to a potential user (i.e., individual or entity looking for new musical compositions) (e.g., publisher, university, music agent, movie studio, record company, etc.) for review and consideration. The originator logs onto a web site (e.g., central controller 200) and inputs identifying information and qualifications, attaches a text file, inputs free-form text, and/or uploads an audio or video file comprising the fully disclosed complete musical composition, creates a nondisclosing synopsis of the musical composition, and clicks the "submit" icon available on the web site. The originator is then asked by the system to agree to the terms of a submission agreement. Originator agrees to the terms of the submission agreement and the fully disclosed musical composition is stored in a secure database. The nondisclosing synopsis is made available to an intended and identifiable user, or to a plurality of potential users, via the World Wide Web. A user may scroll through nondisclosing synopses of available musical compositions by category or may utilize the system's search engine to identify and rank relevant nondisclosing synopses of available musical compositions. If a user is interested in reviewing the entire musical composition, user clicks on the "access" icon for the corresponding nondisclosing synopsis. The user is then asked by the system to agree to the terms of a license agreement granting the user the right to review and consider the originator's musical composition. The license may be exclusive or nonexclusive as determined by the submitting originator. If user agrees, user is granted access to the entire musical composition for consideration pursuant to the terms of the on-line license agreement. If user is interested in further analysis and/or in purchasing or otherwise acquiring the rights to the musical composition, user contacts originator to negotiate the terms of the deal (e.g., publishing agreement, option, license, purchase, development, etc.).

FDI: Toy Concept

An originator desires to submit, confidentially (i.e., pursuant to a confidentiality and nondisclosure agreement) or nonconfidentially (i.e., no confidentiality and nondisclosure agreement), a toy concept to a potential user (i.e., individual or entity looking for new toy concepts) (e.g., toy manufacturer, agent, marketing company, movie studio, etc.) for review and consideration. The originator logs onto a web site (e.g., central controller 200) and inputs identifying information and qualifications, attaches a text file, inputs free-form text, and/or uploads an audio, video or graphics file comprising the fully disclosed complete toy concept, creates a nondisclosing synopsis of the toy concept, and clicks the "submit" icon available on the web site. The originator is then asked by the system to agree to the terms of a submission agreement. Originator agrees to the terms of the submission agreement and the fully disclosed toy concept is stored in a secure database. The nondisclosing synopsis is made available to an intended and identifiable user, or to a plurality of potential users, via the World Wide Web. A user may scroll through nondisclosing synopses of available toy concepts by category or may utilize the system's search engine to identify and rank relevant nondisclosing synopses of available toy concepts. If a user is interested in reviewing the entire toy concept, the user clicks on the "access" icon for the corresponding nondisclosing synopsis. The user is then asked by the system to agree to the terms of a license agreement granting the user the right to review and consider the originator's toy concept. The license may be exclusive or nonexclusive as determined by the submitting originator. If user agrees, user is granted access to the entire toy concept for consideration pursuant to the terms of the on-line license agreement. If user is interested in further analysis and/or in purchasing or otherwise acquiring the rights to the toy concept, user contacts originator to negotiate the terms of the deal (e.g., publishing agreement, option, license, purchase, development, FDI: Advertising Slogan An originator desires to submit, confidentially (i.e., pursuant to a confidentiality and nondisclosure agreement) or non-confidentially (i.e., no confidentiality and nondisclosure agreement), a proposed advertising slogan to a potential user (i.e., individual or entity looking for new advertising slogans) (e.g., advertising agencies, agent, marketing company, movie studio, consulting company, publisher, etc.) for review and consideration. The originator logs onto a web site (e.g., central controller 200) and inputs identifying information and qualifications, attaches a text file, inputs free-form text, and/or uploads an audio, video or graphics file comprising the fully disclosed complete advertising slogan, creates a nondisclosing synopsis of the advertising slogan, and clicks the "submit" icon available on the web site. The originator is then asked by the system to agree to the terms of a submission agreement. Originator agrees to the terms of the submission agreement and the fully disclosed advertising slogan is stored in a secure database. The nondisclosing synopsis is made available to an intended and identifiable user, or to a plurality of potential users, via the World Wide Web. A user may scroll through nondisclosing synopses of available advertising slogans by category or may utilize the system's search engine to identify and rank relevant nondisclosing synopses of available advertising slogans. If a user is interested in reviewing the entire advertising slogan, user clicks on the "access" icon for the corresponding nondisclosing synopsis. The user is then asked by the system to agree to the terms of a license agreement granting the user the right to review and consider the originator's advertising slogan. The license may be exclusive or nonexclusive as determined by the submitting originator. If user agrees, user is granted access to the entire advertising slogan for consideration pursuant to the terms of the on-line license agreement. If user is interested in further analysis and/or in purchasing or otherwise acquiring the rights to the advertising slogan, user contacts originator to negotiate the terms of the deal (e.g., publishing agreement, option, license, purchase, development, etc.).

FDI: Company Trade Name

An originator desires to submit, confidentially (i.e., pursuant to a confidentiality and nondisclosure agreement) or non-confidentially (i.e., no confidentiality and nondisclosure agreement), a proposed company trade name and/or logo to a potential user (i.e., individual or entity looking for new trade names and/or logos) (e.g., advertising agency, public relations firm, agent, marketing company, movie studio, etc.) for review and consideration. The originator logs onto a web site (e.g., central controller 200) and inputs identifying information and qualifications, attaches a text file, inputs free-form text, and/or uploads an audio, video or graphics file comprising the fully disclosed complete trade name and/or logo, creates a nondisclosing synopsis of the trade name and/or logo, and clicks the "submit" icon available on the web site. The originator is then asked by the system to agree to the terms of a submission agreement. Originator agrees to the terms of the submission agreement and the fully disclosed trade name and/or logo is stored in a secure database. The nondisclosing synopsis is made available to an intended and identifiable user, or to a plurality of potential users, via the World Wide Web. A user may scroll through nondisclosing synopses of available trade names and/or logos by category or may utilize the system's search engine to identify and rank relevant nondisclosing synopses of available trade names and/or logos. If a user is interested in reviewing the entire trade name and/or logo, user clicks on the "access" icon for the corresponding nondisclosing synopsis. The user is then asked by the system to agree to the terms of a license agreement granting the user the right to review and consider the originator's trade name and/or logo. The license may be exclusive or nonexclusive as determined by the submitting originator. If user agrees, user is granted access to the entire trade name and/or logo for consideration pursuant to the terms of the on-line license agreement. If user is interested in further analysis and/or in purchasing or otherwise acquiring the rights to the trade name and/or logo, user contacts originator to negotiate the terms of the deal (e.g., publishing agreement, option, license, purchase, development, etc.).

FDI: Service Mark

An originator desires to submit, confidentially (i.e., pursuant to a confidentiality and nondisclosure agreement) or non-confidentially (i.e., no confidentiality and nondisclosure agreement), a proposed service mark to a potential user (i.e., individual or entity looking for new service marks) (e.g. advertising agency, public relations firm, agent, marketing company, movie studio, etc.) for review and consideration. The originator logs onto a web site (e.g., central controller 200) and inputs identifying information and qualifications, attaches a text file, inputs free-form text, and/or uploads an audio, video or graphics file comprising the fully disclosed complete service mark, creates a nondisclosing synopsis of the service mark, and clicks the "submit" icon available on the web site. The originator is then asked by the system to agree to the terms of a submission agreement. Originator agrees to the terms of the submission agreement and the fully disclosed service mark is stored in a secure database. The nondisclosing synopsis is made available to an intended and identifiable user, or to a plurality of potential users, via the World Wide Web. A user may scroll through nondisclosing synopses of available service marks by category or may utilize the system's search engine to identify and rank relevant nondisclosing synopses of available service marks. If a user is interested in reviewing the entire service mark, the user clicks on the "access" icon for the corresponding nondisclosing synopsis. The user is then asked by the system to agree to the terms of a license agreement granting the user the right to review and consider the originator's service mark. The license may be exclusive or nonexclusive as determined by the submitting originator. If user agrees, user is granted access to the entire service mark for consideration pursuant to the terms of the on-line license agreement. If user is interested in further analysis and/or in purchasing or otherwise acquiring the rights to the service mark, user contacts originator to negotiate the terms of the deal (e.g., publishing agreement, option, license, purchase, development, etc.).

FDI: Product Trademark

An originator desires to submit, confidentially (i.e., pursuant to a confidentiality and nondisclosure agreement) or nonconfidentially (i.e., no confidentiality and nondisclosure agreement), a proposed product trademark to a potential user (i.e., individual or entity looking for new trademarks) (e.g., advertising agency, public relations firm, agent, marketing company, movie studio, etc.) for review and consideration. The originator logs onto a web site (e.g., central controller 200) and inputs identifying information and qualifications, attaches a text file, inputs free-form text, and/or uploads an audio, video or graphics file comprising the fully disclosed complete trademark, creates a nondisclosing synopsis of the trademark, and clicks the "submit" icon available on the web site. The originator is then asked by the system to agree to the terms of a submission agreement. Originator agrees to the terms of the submission agreement and the fully disclosed trademark is stored in a secure database. The nondisclosing synopsis is made available to an intended and identifiable user, or to a plurality of potential users, via the World Wide Web. A user may scroll through nondisclosing synopses of available trademarks by category or may utilize the system's search engine to identify and rank relevant nondisclosing synopses of available trademarks. If a user is interested in reviewing the entire trademark, user clicks on the "access" icon for the corresponding nondisclosing synopsis. The user is then asked by the system to agree to the terms of a license agreement granting the user the right to review and consider the originator's trademark. The license may be exclusive or nonexclusive as determined by the submitting originator. If user agrees, user is granted access to the entire trademark for consideration pursuant to the terms of the on-line license agreement. If user is interested in further analysis and/or in purchasing or otherwise acquiring the rights to the trademark, user contacts originator to negotiate the terms of the deal (e.g., publishing agreement, option, license, purchase, development, etc.).

FDI: Chemical Composition

An originator desires to submit, confidentially (i.e., pursuant to a confidentiality and nondisclosure agreement) or nonconfidentially (i.e., no confidentiality and nondisclosure agreement), a new chemical composition to a potential user (i.e., individual or entity looking for new chemical compositions) (e.g., chemical manufacturer, university, research entity, government agency, etc.) for review and consideration. The originator logs onto a web site (e.g., central controller 200) and inputs identifying information and qualifications, attaches a text file, inputs free-form text, and/or uploads an audio, video or graphics file comprising the fully disclosed complete chemical composition, creates a nondisclosing synopsis of the chemical composition, and clicks the "submit" icon available on the web site. The originator is then asked by the system to agree to the terms of a submission agreement. Originator agrees to terms of the submission agreement and the fully disclosed chemical composition is stored in a secure database. The nondisclosing synopsis is made available to an intended and identifiable user, or to a plurality of potential users, via the World Wide Web. A user may scroll through nondisclosing synopses of available chemical compositions by category or may utilize the system's search engine to identify and rank relevant nondisclosing synopses of available chemical compositions. If a user is interested in reviewing the entire chemical composition, user clicks on the "access" icon for the corresponding nondisclosing synopsis. The user is then asked by the system to agree to the terms of a license agreement granting the user the right to review and consider the originator's chemical composition. The license may be exclusive or nonexclusive as determined by the submitting originator. If user agrees, user is granted access to the entire chemical composition for consideration pursuant to the terms of the on-line license agreement. If user is interested in further analysis and/or in purchasing or otherwise acquiring the rights to the chemical composition, user contacts originator to negotiate the terms of the deal (e.g., publishing agreement, option, license, purchase, development, etc.).

FDI: Product Enhancement

An originator desires to submit, confidentially (i.e., pursuant to a confidentiality and nondisclosure agreement) or nonconfidentially (i.e., no confidentiality and nondisclosure agreement), a specification for a new product enhancement ("spec") to a potential user (i.e., individual or entity looking for new product enhancements) (e.g., software or other technology company, automobile manufacturer, university, venture capitalist, entrepreneur, etc.) for review and consideration. The originator logs onto a web site (e.g., central controller 200) and inputs identifying information and qualifications, attaches a text file, inputs free-form text, and/or uploads an audio file, video file, graphics file or software program comprising the fully disclosed complete spec, creates a nondisclosing synopsis of the spec, and clicks the "submit" icon available on the web site. The originator is then asked by the system to agree to the terms of a submission agreement. Originator agrees to the terms of the submission agreement and the fully disclosed spec is stored in a secure database. The nondisclosing synopsis is made available to an intended and identifiable user, or to a plurality of potential users, via the World Wide Web. A user may scroll through nondisclosing synopses of available specs by category or may utilize the-system's search engine to identify and rank relevant nondisclosing synopses of available specs. If a user is interested in reviewing the entire spec, user clicks on the "access" icon for the corresponding nondisclosing synopsis. The user is then asked by the system to agree to the terms of a license agreement granting the user the right to review and consider the originator's spec. The license may be exclusive or nonexclusive as determined by the submitting originator. If user agrees, user is granted access to the entire spec for consideration pursuant to the terms of the on-line license agreement. If user is interested in further analysis and/or in purchasing or otherwise acquiring the rights to the spec, user contacts originator to negotiate the terms of the deal (e.g., license, purchase, development, etc.).

FDI: Electronic Game Concept

An originator desires to submit, confidentially (i.e., pursuant to a confidentiality and nondisclosure agreement) or nonconfidentially (i.e., no confidentiality and nondisclosure agreement), a specification for a new electronic game concept ("spec") to a potential user (i.e., individual or entity looking for new electronic game concepts) (e.g., software or other technology company, video game manufacturer, university, venture capitalist, entrepreneur, etc.) for review and consideration. The originator logs onto a web site (e.g., central controller 200) and inputs identifying information and qualifications, attaches a text file, inputs free-form text, and/or uploads an audio file, video file, graphics file or software program comprising the fully disclosed complete spec, creates a nondisclosing synopsis of the spec, and clicks the "submit" icon available on the web site. The originator is then asked by the system to agree to the terms of a submission agreement. Originator agrees to the terms of the submission agreement and the fully disclosed spec is stored in a secure database. The nondisclosing synopsis is made available to an intended and identifiable user, or to a plurality of potential users, via the World Wide Web. A user may scroll through nondisclosing synopses of available specs by category or may utilize the system's search engine to identify and rank relevant nondisclosing synopses of available specs. If a user is interested in reviewing the entire spec, user clicks on the "access" icon for the corresponding nondisclosing synopsis. The user is then asked by the system to agree to the terms of a license agreement granting the user the right to review and consider the originator's spec. The license may be exclusive or nonexclusive as determined by the submitting originator. If user agrees, user is granted access to the entire spec for consideration pursuant to the terms of the on-line license agreement. If user is interested in further analysis and/or in purchasing or otherwise acquiring the rights to the spec, user contacts originator to negotiate the terms of the deal (e.g., license, purchase, development, etc.).

FDI: Grant Proposal Criteria

An originator desires to submit, confidentially (i.e., pursuant to a confidentiality and nondisclosure agreement) or nonconfidentially (i.e., no confidentiality and nondisclosure agreement), a grant proposal to a potential user (i.e., grant giver) (e.g., foundation, university, government agency, nonprofit organization, etc.) for review and consideration. The originator logs onto a web site (e.g., central controller 200) and inputs identifying information and qualifications, attaches a text file or inputs free-form text comprising the fully disclosed complete grant proposal, creates a nondisclosing synopsis of the grant proposal, and clicks the "submit" icon available on the web site. The originator is then asked by the system to agree to the terms of a submission agreement. Originator agrees to the terms of the submission agreement and the fully disclosed grant proposal is stored in a secure database. The nondisclosing synopsis is made available to an intended and identifiable user, or to a plurality of potential users, via the World Wide Web. A user may scroll through nondisclosing synopses of available grant proposals by category or may utilize the system's search engine to identify and rank relevant nondisclosing synopses of available grant proposals. If a user is interested in reviewing the entire grant proposal, user clicks on the "access" icon for the corresponding nondisclosing synopsis. The user is then asked by the system to agree to the terms of a license agreement granting the user the right to review and consider the originator's grant proposal. The license may be exclusive or nonexclusive as determined by the submitting originator. If user agrees, user is granted access to the entire grant proposal for consideration pursuant to the terms of the on-line license agreement. If user is interested in further analysis and/or in providing a grant to the submitting originator, user contacts originator to negotiate the terms of the grant.

The following examples demonstrate potential needs of users and represent the user-driven component of the present invention:

RFP: Motion Picture Screenplay

A user (i.e., movie studio, production company, Hollywood agency or agent) is seeking an original screenplay meeting defined development criteria (e.g., drama, period piece, love story, etc.). Rather than commission a screenwriter directly to write the original screenplay meeting the development criteria, the user desires to submit, confidentially or nonconfidentially, a request for proposed screenplays ("open assignment") globally to originators (e.g., screenwriters, Hollywood agents or managers, etc.) for his/her/their review and consideration. User logs onto a web site and inputs identifying information and specific development criteria, attaches a text, audio, video or graphics file or inputs free-form text comprising the fully disclosed open assignment, creates a nondisclosing synopsis of the open assignment, and clicks the "submit" icon available on, the web site. User is then asked by the system to agree to the terms of a submission agreement. User agrees to the terms of the submission agreement and the fully disclosed open assignment is stored in a secure database. The nondisclosing synopsis is made available to an intended and identifiable originator, to a plurality of originators, or globally to potential originators via the World Wide Web. An originator may scroll through nondisclosing synopses of available open assignments by category or may utilize the system's search engine to identify and rank relevant nondisclosing synopses of open assignments. If an originator is interested in reviewing the entire open assignment, originator clicks on the "access" icon for the corresponding nondisclosing synopsis. The originator is then asked by the system to agree to the terms of a license agreement granting the originator the right to review and consider the fully disclosed open assignment. The license may be exclusive or nonexclusive as determined by the soliciting user. If originator agrees, originator is granted access to the entire open assignment for consideration pursuant to the terms of the on-line license agreement. If originator is interested in further analysis, originator contacts the soliciting user for further due diligence. If user has agreed to receive proposed screenplays from originators, an originator may submit his/her/its screenplay as an FDI (fully disclosed idea) in the same manner described above. The soliciting user is then able to scroll through all NDSes submitted as proposed screenplays or may utilize the system's search engine to identify and rank relevant screenplays meeting the open assignment criteria, and access, pursuant to the terms of an on-line license agreement, only those proposed screenplays that the user determines warrant further consideration. Alternatively, proposed screenplays may be submitted directly to the soliciting user. If the soliciting user is interested in further analysis and/or in purchasing or otherwise acquiring the rights to a screenplay, soliciting user contacts the submitting originator to negotiate the terms of the deal (e.g., license, option, purchase, development, etc.).

RFP: Business Opportunity

A user (i.e., venture capital firm, angel investor, strategic partner, etc.) is seeking an original business plan or concept meeting defined investment and/or development criteria (e.g., wireless application software, business-to-business chemical marketplace, etc.). The user desires to submit, confidentially or nonconfidentially, a request for proposed business plans or concepts ("RFP") globally to originators (e.g., entrepreneurs, established companies, etc.) for his/her/their review and consideration. User logs onto a web site and inputs identifying information and specific development criteria, attaches a text, audio, video or graphics file or inputs free-form text comprising the fully disclosed RFP, creates a nondisclosing synopsis of the RFP, and clicks the "submit" icon available on the web site. User is then asked by the system to agree to the terms of a submission agreement. User agrees to terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an, originator is interested in reviewing the entire RFP, originator clicks on the "access"

icon for the corresponding nondisclosing synopsis. The originator is then asked by the system to agree to the terms of a license agreement granting originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed screenplays from originators, an originator may submit his/her/its business plan or concept as an FDI (fully disclosed idea) in the same manner described above. The soliciting user is then able to scroll through all NDSes submitted as proposed business plans or concepts or may utilize the system's search engine to identify and rank relevant business plans or concepts meeting the RFP criteria, and access, pursuant to the terms of an on-line license agreement, only those proposed business plans or concepts that the user determines warrant further consideration. Alternatively, proposed business plans or concepts may be submitted directly to the soliciting user. If the soliciting user is interested in further analysis, financing and/or in purchasing or otherwise acquiring the rights to a business plan or concept, soliciting user contacts the submitting originator to negotiate the terms of the deal (e.g., license, option, purchase, investment, development, etc.).

RFP: Application Software

A user (i.e., individual or entity looking for a specific solution) (e.g., Internet company or other business entity, entrepreneur, etc.) is seeking a software application meeting defined development criteria (e.g., wireless application software, system architecture, etc.). The user desires to submit, confidentially or nonconfidentially, a request for proposed software applications ("RFP") globally to originators (e.g., entrepreneurs, established companies, software engineers, etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to the terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed software applications from originators, an originator may submit his/her/its software application as an FDI (fully disclosed idea) in the same manner described above. The soliciting user is then able to scroll through all NDSes submitted as proposed software applications or may utilize the system's search engine to identify and rank relevant software applications meeting the RFP criteria, and access, pursuant to the terms of an on-line license agreement, only those proposed software applications that the user determines warrant further consideration. Alternatively, proposed software applications may be submitted directly to the soliciting user. If the soliciting user is interested in further analysis, financing and/or in purchasing or otherwise acquiring the rights to a software application, soliciting user contacts the submitting originator to negotiate the terms of the deal (e.g., license, option, purchase, investment, development, etc.).

RFP: Book Manuscript

A user (i.e., individual or entity looking for original book manuscripts) (e.g., publishing company, literary agent, etc.) is seeking a book manuscript meeting defined development criteria (e.g., life story, period piece, etc.). The user desires to submit, confidentially or nonconfidentially, a request for proposed book manuscripts ("RFP") globally to originators (e.g., writers, literary agents, publishers, etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to the terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed book manuscripts from originators, an originator may submit his/her/its software book manuscript as an FDI (fully disclosed idea) in the same manner described above. The soliciting user is then able to scroll through all NDSes submitted as proposed book manuscripts or may utilize the system's search engine to identify and rank relevant book manuscripts meeting the RFP criteria, and access, pursuant to the terms of an on-line license agreement, only those proposed book manuscripts that the user determines warrant further consideration. Alternatively, proposed book manuscripts may be submitted directly to the soliciting user. If the soliciting user is interested in further analysis, financing and/or in purchasing or otherwise acquiring the rights to a book manuscript, soliciting user contacts the submitting originator to negotiate the terms of the deal (e.g., license, option, purchase, investment, development, etc.).

RFP: Musical Composition

A user (i.e., individual or entity looking for original musical compositions). (e.g., publishing company, literary agent, record, company, musician, etc.) is seeking a musical composition meeting defined development criteria (e.g., rhythm, tempo, cadence, period piece, etc.). The user desires to submit, confidentially or nonconfidentially, a request for proposed musical composition ("RFP") globally to originators (e.g., songwriters, literary agents, publishers, record companies, musicians etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to the terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting the originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed musical compositions from originators, an originator may submit his/her/its software musical composition as an FDI (fully disclosed idea) in the same manner described above. The soliciting user is then able to scroll through all NDSes submitted as proposed musical compositions or may utilize the system's search engine to identify and rank relevant musical compositions meeting the RFP criteria, and access, pursuant to the terms of an on-line license agreement, only those proposed musical compositions that the user determines warrant further consideration. Alternatively, proposed musical compositions may be submitted directly to the soliciting user. If the soliciting user is interested in further analysis, financing and/or in purchasing or otherwise acquiring the rights to a musical composition, soliciting user contacts the submitting originator to negotiate the terms of the deal (e.g., license, option, purchase, investment, development, 4etc.).

RFP: Toy Concept

A user (i.e., individual or entity looking for original toy concepts) (e.g., toy developer, toy manufacturer, etc.) is seeking a toy concept meeting defined development criteria (e.g., age range, material, etc.). The user desires to submit, confidentially or nonconfidentially, a request for proposed toy concepts ("RFP") globally to originators (e.g., toy developers, toy manufacturers, inventors, etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed toy concepts from originators, an originator may submit his/her/its software toy concept as an FDI (fully disclosed idea) in the same manner described above. The soliciting user is then able to scroll through all NDSes submitted as proposed toy concepts or may utilize the system's search engine to identify and rank relevant toy concepts meeting the RFP criteria, and access, pursuant to the terms of an on-line license agreement, only those proposed toy concepts that the user determines warrant further consideration. Alternatively, proposed toy concepts may be submitted directly to the soliciting user. If the soliciting user is interested in further analysis, financing and/or in purchasing or otherwise acquiring the rights to a toy concept, soliciting user contacts the submitting originator to negotiate the terms of the deal (e.g., license, option, purchase, investment, development, etc.).

RFP: Advertising Slogan

A user (e.g., ACE Hardware) desires implementation of a new national advertising campaign. Rather than retain an advertising agency to develop the campaign, the user desires to submit a request for proposed advertising slogans directly to its consumers. The user logs onto a web site and inputs identifying information and criteria, attaches a text file comprising the fully disclosed need (e.g., description of products or services to be marketed, desired length of slogan, etc.), creates a nondisclosing synopsis of the need, and clicks on the "submit" icon available on the web site. The user is then asked by the system to agree to the terms of a submission agreement. User agrees to the terms of the submission agreement and the fully disclosed need is stored in a secure database. The nondisclosing synopsis is made available globally via the World Wide Web to a plurality of potential originators capable of proposing slogans or directly to an intended and identifiable user. If an originator is interested in reviewing the entire fully disclosed need, originator clicks on the "access" icon. The originator is then asked by the system to agree to the terms of a license agreement granting the user the right to review and consider the user's fully disclosed need. If originator agrees, originator is granted access to the entire need for consideration pursuant to the terms of the on-line license agreement. If originator is interested in proposing a solution to the user's need (e.g., a slogan such as "ACE is the place with the helpful hardware man") for use by the soliciting user, originator submits the proposed solution as an FDI (fully disclosed idea) in the manner described above. The soliciting user is then able to review all NDSes submitted as proposed solutions and to access, pursuant to an on-line license agreement, only those fully disclosed solutions which the user determines warrant further consideration. If soliciting user identifies a slogan it wishes to use, user negotiates for the right to use the originator's proposed slogan. Terms are negotiated, payment is submitted to originator, and user is granted the right to use originator's slogan according to the terms of a negotiated agreement.

RFP: Company Trade Name

A user (i.e., individual or entity looking for original company trade names) (e.g., advertising agency, new business entity, existing company, etc.) is seeking a trade name meeting defined development criteria (e.g., descriptive, domain name, etc.). The user desires to submit, confidentially or nonconfidentially, a request for proposed trade names ("RFP") globally to originators (e.g., individuals, advertising agencies, marketing professionals, etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to the terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting the originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed trade names from originators, an originator may submit his/her/its software trade name as an FDI (fully disclosed idea) in the same manner described above. The soliciting user is then able to scroll through all NDSes submitted as proposed trade names or may utilize the system's search engine to identify and rank relevant trade names meeting the RFP criteria, and access, pursuant to the terms of an on-line license agreement, only those proposed trade names that the user determines warrant further consideration. Alternatively, proposed trade names may be submitted directly to the soliciting user. If the soliciting user is interested in further analysis, financing and/or in purchasing or otherwise acquiring the rights to a trade name, soliciting user contacts the submitting originator to negotiate the terms of the deal (e.g., license, option, purchase, investment, development, etc.).

RFP: Service Mark

A user (i.e., individual or entity looking for original service marks) (e.g., advertising agency, new business entity, existing company, etc.) is seeking a service mark meeting defined development criteria (e.g., descriptive, domain name, etc.). The user desires to submit, confidentially or nonconfidentially, a request for proposed service marks ("RFP") globally to a plurality of originators or directly to one or more intended and identifiable originators (e.g., individuals, advertising agencies, marketing professionals, etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to the terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting the originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed service marks from originators, an originator may submit his/her/its service mark as an FDI (fully disclosed idea) in the same manner described above. The soliciting user is then able to scroll through all NDSes submitted as proposed service marks or may utilize the system's search engine to identify and rank relevant service marks meeting the RFP criteria, and access, pursuant to the terms of an on-line license agreement, only those proposed service marks that the user determines warrant further consideration. Alternatively, proposed service marks may be submitted directly to the soliciting user. If the soliciting user is interested in further analysis, financing and/or in purchasing or otherwise acquiring the rights to a service mark, soliciting user contacts the submitting originator to negotiate the terms of the deal (e.g., license, option, purchase, investment, development, etc.).

RFP: Product Trademark

A user (i.e., individual or entity looking for original product trademarks) (e.g., advertising agency, new business entity, existing company, etc.) is seeking a product trademark meeting defined development criteria (e.g., descriptive, domain name, etc.). The user desires to submit, confidentially or nonconfidentially, a request for proposed product trademarks ("RFP") globally to a plurality of originators or directly to one or more intended and identifiable originators (e.g., individuals, advertising agencies, marketing professionals, etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to the terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting the originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed product trademarks from originators, an originator may submit his/her/its product trademark as an FDI (fully disclosed idea) in the same manner described above. The soliciting user is then able to scroll through all NDSes submitted as proposed product trademarks or may utilize the system's search engine to identify and rank relevant product trademarks meeting the RFP criteria, and access, pursuant to the terms of an on-line license agreement, only those proposed product trademarks that the user determines warrant further consideration. Alternatively, proposed product trademarks may be 'submitted directly to the soliciting user. If the soliciting user is interested in further analysis, financing and/ or in purchasing or otherwise acquiring the rights to a product trademark, soliciting user contacts the submitting originator to negotiate the terms of the deal (e.g., license, option, purchase, investment, development, etc.).

RFP: Chemical Composition

A user (i.e., individual or entity looking for original chemical compositions) (e.g., chemical company, scientist, government research entity, etc.) is seeking a chemical composition meeting defined development criteria (e.g., physical properties, odorless, etc.). The user desires to submit, confidentially or nonconfidentially, a request for proposed chemical compositions ("RFP") globally to originators (e.g., scientists, university professors, chemical development companies, etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting the originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed chemical compositions from originators, an originator may submit his/her/its software chemical composition as an FDI (fully disclosed idea) in the same manner described above. The soliciting user is then able to scroll through all NDSes submitted as proposed chemical compositions or may utilize the system's search engine to identify and rank relevant chemical compositions meeting the RFP criteria, and access, pursuant to the terms of an on-line license agreement, only those proposed chemical compositions that the user determines warrant further consideration. Alternatively, proposed chemical compositions may be submitted directly to the soliciting user. If the soliciting user is interested in further analysis, financing and/or in purchasing or otherwise acquiring the rights to a chemical composition, soliciting user contacts the submitting originator to negotiate the terms of the deal (e.g., license, option, purchase, investment, development, etc.).

RFP: Product Enhancement

A user (i.e., individual or entity looking for original product enhancements) (e.g., automobile manufacturer, consulting firm, etc.) is seeking a product enhancement meeting defined development criteria (e.g., lighter weight, greater strength, etc.). The user desires to submit, confidentially or nonconfidentially, a request for proposed product enhancements ("RFP") globally to originators (e.g., research entities, inventors, scientists, etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to the terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting the originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed product enhancements from originators, an originator may submit his/her/its software product enhancement as an FDI (fully disclosed idea) in the same manner described above. The soliciting user is then able to scroll through all NDSes submitted as proposed product enhancements or may utilize the system's search engine to identify and rank relevant product enhancements meeting the RFP criteria, and access, pursuant to the terms of an on-line license agreement, only those proposed product enhancements that the user determines warrant further consideration. Alternatively, proposed product enhancements may be submitted directly to the soliciting user. If the soliciting user is interested in further analysis, financing and/or in purchasing or otherwise acquiring the rights to a product enhancement, soliciting user contacts the submitting originator to negotiate the terms of the deal (e.g., license, option, purchase, investment, development, etc.).

RFP: Electronic Game Concept

A user (i.e., individual or entity looking for original electronic game concepts) (e.g., game developer, game publisher, etc.) is seeking an electronic game concept meeting defined development criteria (e.g., character type, adventure, etc.). The user desires to submit, confidentially or nonconfidentially, a request for proposed electronic game concepts ("RFP") globally to originators (e.g., game developers, software engineers, game development companies, etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to the terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting the originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed electronic game concepts from originators, an originator may submit his/her/its software electronic game concept as an FDI (fully disclosed idea) in the same manner described above. The soliciting user is then able to scroll through all NDSes submitted as proposed electronic game concepts or may utilize the system's search engine to identify and rank relevant electronic game concepts meeting the RFP criteria, and access, pursuant to the terms of an on-line license agreement, only those proposed electronic game concepts that the user determines warrant further consideration. Alternatively, proposed electronic game concepts may be submitted directly to the soliciting user. If the soliciting user is interested in further analysis, financing and/or in purchasing or otherwise acquiring the rights to an electronic game concept, soliciting user contacts the submitting originator to negotiate the terms of the deal (e.g., license, option, purchase, investment, development, etc.).

RFP: Grant Proposal

A user (i.e., individual or entity looking for original grant proposals) (e.g., foundation, university, government agency, nonprofit organization, etc.) is seeking a grant proposal meeting defined development criteria (e.g., dollar amount of grant, medical research, community investment, etc.). The user desires to submit, confidentially or nonconfidentially, a request for proposed grant proposals ("RFP") globally to a plurality of originators or directly to one or more intended and identifiable originators (e.g., individuals, nonprofit organizations, social entrepreneurs, etc.) for his/her/their review and consideration. User logs onto a web site and inputs identifying information and specific development criteria, attaches a text, audio, video or graphics file, or inputs free-form text comprising the fully disclosed RFP, creates a nondisclosing synopsis of the RFP, and clicks the "submit" icon available on the web site. User is then asked by the system to agree to the terms of a submission agreement. User agrees to the terms of the submission agreement and the fully disclosed RFP is stored in a secure database. The nondisclosing synopsis is made available to an intended and identifiable originator, to a plurality of originators, or globally to potential originators via the World Wide Web. An originator may scroll through nondisclosing synopses of available RFPs by category or may utilize the system's search engine to identify and rank relevant nondisclosing synopses of RFPs. If an originator is interested in reviewing the entire RFP, originator clicks on the "access" icon for the corresponding nondisclosing synopsis. The originator is then asked by the system to agree to the terms of a license agreement granting the originator the right to review and consider the fully disclosed RFP. The license may be exclusive or nonexclusive as determined by the soliciting user. If originator agrees, originator is granted access to the entire RFP for consideration pursuant to the terms of the on-line license agreement. If originator is interested in further analysis, originator contacts the soliciting user for further due diligence. If user has agreed to receive proposed grant proposals from originators, an originator may submit his/her/its grant proposal as an FDI (fully disclosed idea) in the same manner described above. The soliciting user is then able to scroll through all NDSes submitted as proposed grant proposals or may utilize the system's search engine to identify and rank relevant grant proposals meeting the RFP criteria, and access, pursuant to the terms of an on-line license agreement, only those proposed grant proposals that the user determines warrant further consideration. Alternatively, proposed grant proposals may be submitted directly to the soliciting user. If the soliciting user is interested in further analysis, financing and/or in purchasing or otherwise acquiring the rights to a grant proposal, soliciting user contacts the submitting originator to negotiate the terms of the deal (e.g., license, option, purchase, investment, development, etc.).

Those skilled in the art will recognize that the present invention has many applications in all industry segments, and that the applications disclosed herein are merely representative and not exhaustive. The scope of the present invention incorporates known and anticipated applications, modifications and variations of and to the system components described herein, as would be known by those skilled in the art. The scope of this invention is defined by the following claims.

The invention claimed is:

1. A method for using a computer to facilitate and control sequential access to a two-level information database created by inputs supplied by originators comprising:

receiving and storing in the database a plurality of two-part descriptions each supplied by an originator, each two-part description including a nonconfidential first-level element in the form of a searchable and accessible basic description of an originator's idea, and a confidential second-level element in the form of a searchable, but nonaccessible detailed description of each originator's idea;

permitting users to access, search, review and select without restriction, only the nonconfidential first-level elements of the stored two-part descriptions;

subsequently providing selecting users with an option to access, search and review the confidential second-level elements of the stored two-part descriptions that correspond to the selected first-level elements by electronically submitting to each selecting user a license agreement including a confidentiality provision and other previously supplied licensing terms;

receiving and storing in the computer an acceptance of the license agreement by each selecting user; and upon receipt of license acceptance, providing accepting users with unrestricted access on a confidential basis via the computer to the confidential second-level elements of the stored two-part descriptions corresponding to the selected first-level elements.

2. The method of claim 1 wherein the license agreement is a limited duration, exclusive license, and including the further step of upon receiving license acceptance by one selecting user, subsequently restricting other users from accessing, searching, reviewing or selecting both the first-level element and the second-level element, of the two-part description selected by the licensed user for the duration of the term of the exclusive license.

3. The method of claim 1 wherein the license agreement is a limited duration, exclusive license, and including the further step of providing an originator with the option of specifying license terms which permit users to continue to access, search, review and select the nonconfidential first-level element, but not the confidential second-level element, of a selected two-part description for the duration of the license term.

4. The method of claim 3 including the further step of creating a queue of license accepting users seeking access to the selected, but license restricted second-level element.

5. The method of claim 4 including the further step of establishing a priority status for each user in the queue according to the time of license acceptance, with an earlier license acceptance time having priority over a later license acceptance time.

6. The method of claim 3 including the further step of permitting users to search and rank by relevancy without restriction the second-level elements of the database without permitting visual access to the second-level elements.

7. The method of claim 1 including the further step of enabling each originator to review the identity of each license requesting user and to either accept or reject the license request by each user.

* * * * *